(12) United States Patent
Nishi et al.

(10) Patent No.: US 12,078,719 B2
(45) Date of Patent: Sep. 3, 2024

(54) THREE-DIMENSIONAL OBJECT DETECTION DEVICE

(71) Applicant: DENSO CORPORATION, Kariya (JP)

(72) Inventors: Takafumi Nishi, Nisshin (JP); Masayoshi Satake, Nisshin (JP); Yu Koyama, Nisshin (JP); Masayoshi Ooishi, Kariya (JP); Masaya Takatsuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 17/936,515

(22) Filed: Sep. 29, 2022

(65) Prior Publication Data

US 2023/0013319 A1    Jan. 19, 2023

Related U.S. Application Data

(63) Continuation of application No. PCT/JP2021/012937, filed on Mar. 26, 2021.

(30) Foreign Application Priority Data

Apr. 2, 2020 (JP) .................................. 2020-066785

(51) Int. Cl.
*G01S 15/931*    (2020.01)

(52) U.S. Cl.
CPC ....... *G01S 15/931* (2013.01); *G01S 2015/932* (2013.01)

(58) Field of Classification Search
CPC ......... G08G 1/16; G01S 3/808; G01S 15/876; G01S 15/931; G01S 2015/932; G01S 15/93; G01S 15/89; G01S 15/88; G01S 15/87; G01S 15/86; G01S 15/66; G01S 15/02; G01S 15/003; G01S 13/00; G01S 11/00; G01S 7/00; G01S 7/003; G01S 15/58;

(Continued)

(56) References Cited

U.S. PATENT DOCUMENTS 6,289,282 B1 * 9/2001 Hassler ................. G01S 13/931
                                                                      701/96
10,162,055 B2 * 12/2018 Schumann ............... G01S 15/87
(Continued)

FOREIGN PATENT DOCUMENTS

JP          2012-146025 A        8/2012

*Primary Examiner* — Daniel L Murphy
*Assistant Examiner* — Amie M Ndure
(74) *Attorney, Agent, or Firm* — MASCHOFF BRENNAN

(57) ABSTRACT

An object detection device that detects a corner of an object includes: a transmitter that transmits a search wave; receivers that receive a reflected wave reflected off the corner. The device determines a first path length of the search wave from the transmitter to a first receiver, and uses the positions of the transmitter and the first receiver as focal points to find a first ellipse whose distances from the transmitter and the first receiver add up to the first path length. The device determines a second path length of the search wave from the transmitter to a second receiver, and uses the positions of the transmitter and the second receiver as focal points to find a second ellipse whose distances from the transmitter and the second receiver add up to the second path length. The device finds an intersection point between the first and second ellipses as the corner.

23 Claims, 21 Drawing Sheets

(58) Field of Classification Search
CPC . G01S 7/282; G01S 7/285; G01S 7/28; G01S 13/89; G01S 13/93; G01S 19/13; G01S 15/34; G01S 15/325; G01S 15/00; G01S 13/937; G01S 13/42; G01S 1/70; B64U 80/84; B64U 2201/00; B64U 2201/10; B64U 2201/20; B64U 2201/104
See application file for complete search history.

(56) References Cited

U.S. PATENT DOCUMENTS

| | | | |
|---|---|---|---|
| 10,436,899 B2 * | 10/2019 | Fukuman | G01S 15/931 |
| 2003/0151541 A1 * | 8/2003 | Oswald | B60R 21/01538 |
| | | | 342/72 |
| 2005/0054928 A1 * | 3/2005 | Cerofolini | G01S 7/52039 |
| | | | 600/443 |
| 2007/0153255 A1 * | 7/2007 | Ishii | G01S 13/345 |
| | | | 356/28 |
| 2012/0062396 A1 * | 3/2012 | Inoue | B62D 15/027 |
| | | | 340/932.2 |
| 2015/0054670 A1 * | 2/2015 | Wang | A61B 5/0816 |
| | | | 342/21 |
| 2016/0063861 A1 * | 3/2016 | Lee | G08G 1/14 |
| | | | 340/932.2 |
| 2018/0074177 A1 * | 3/2018 | Rudoy | G01S 15/89 |
| 2022/0155440 A1 * | 5/2022 | Kruse | G01S 15/8977 |

\* cited by examiner

THREE-DIMENSIONAL OBJECT DETECTION DEVICE

CROSS-REFERENCE TO RELATED APPLICATION

The present application is a continuation application of International Application No. PCT/JP2021/012937, filed on Mar. 26, 2021, which claims priority to Japanese Patent Application No. 2020-066785, filed in Japan on Apr. 2, 2020. The contents of these applications are incorporated herein by reference in their entirety.

BACKGROUND

1. Technical Field

The present disclosure relates to a three-dimensional object detection device.

2. Related Art

Conventionally, a vehicle obstacle detector has been proposed that, when the host vehicle passes by a parked vehicle, uses an ultrasonic sonar mounted on the host vehicle to detect a corner of the parked vehicle. Specifically, the control device of the vehicle obstacle detector causes the ultrasonic sonar to repeatedly transmit ultrasonic waves toward the parked vehicle, and repeatedly receive reflected waves of the transmitted ultrasonic waves that have been reflected off the parked vehicle to calculate the distance between this ultrasonic sonar and the parked vehicle every time a reflected wave is received.

In this case, when the host vehicle passes by the parked vehicle, the control device repeatedly obtains the distance between the parked vehicle and the ultrasonic sonar each time a reflected wave is received. Therefore, the control device finds the corner of the parked vehicle based on this distance calculated each time a reflected wave is received.

SUMMARY

The present disclosure provides a three-dimensional object detection device. As one aspect of the present disclosure, a three-dimensional object detection device that detects a corner of a three-dimensional object to be detected includes at least a transmitter, first and second receivers, first and second path-length calculators, first and second ellipse calculators, and a corner calculator. The transmitter transmits a search wave. The first and second receivers receive a reflected wave reflected off the corner. The first path-length calculator determines a first path length of the search wave from the transmitter to the first receiver. The first ellipse calculator uses the positions of the transmitter and the first receiver as focal points to find a first ellipse whose distances from the transmitter and the first receiver add up to the first path length. The second path-length calculator determines a second path length of the search wave from the transmitter to the second receiver. The second ellipse calculator uses the positions of the transmitter and the second receiver as focal points to find a second ellipse whose distances from the transmitter and the second receiver add up to the second path length. The corner calculator finds an intersection point between the first and second ellipses as the corner.

DETAILED DESCRIPTION OF THE PREFERRED EMBODIMENTS

Figure 1:
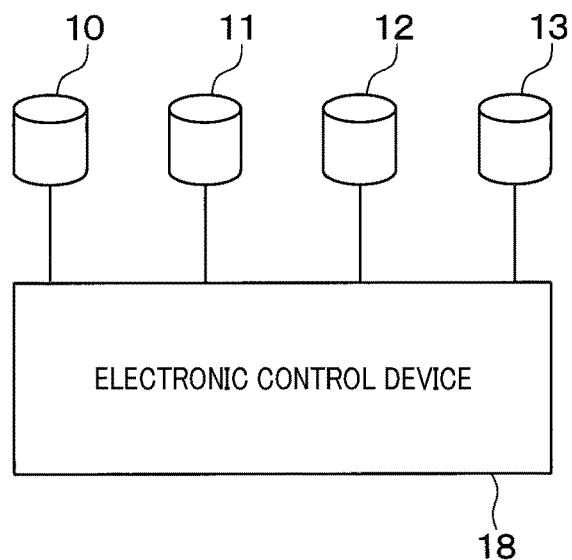
FIG. 1 is a block diagram showing the general electrical configuration of a vehicle three-dimensional object detection device according to a first embodiment.

For example, JP 2012-146025 A discloses a vehicle obstacle detector that, when the host vehicle passes by a parked vehicle, uses an ultrasonic sonar mounted on the host vehicle to detect a corner of the parked vehicle.

According to a study conducted by the inventors, as described above, when the host vehicle passes by a parked vehicle, the control device of the vehicle obstacle detector of JP 2012-146025 A can find a corner of the parked vehicle based on the distance repeatedly calculated every time a reflected wave is received.

However, when the host vehicle is stopped, even if ultrasonic waves are repeatedly transmitted from the ultrasonic sonar toward the parked vehicle, the control device would determine the distance between the same part of the parked vehicle that is not a corner thereof and the ultrasonic sonar every time a reflected wave is received. Therefore, the control device cannot find a corner of the parked vehicle based on the distance calculated each time a reflected wave is received.

In addition, when the host vehicle backs up straight and approaches a parked vehicle, an ultrasonic sonar located in the rear part of the host vehicle may not be able to find a corner of the parked vehicle.

This is because, as with the case where the host vehicle is stopped, the control device repeatedly obtains the distance between the same part of the parked vehicle that is not a corner thereof and the ultrasonic sonar every time a reflected wave is received.

In other words, when the host vehicle mounted the vehicle obstacle detector is stopped or when the host vehicle mounted the vehicle obstacle detector approaches the parked vehicle (that is, the object to be detected), the ultrasonic sonar may not be able to find a corner of the parked vehicle.

An object of the present disclosure is to provide a three-dimensional object detection device that detects a corner of a three-dimensional object to be detected even when a vehicle mounted the three-dimensional object detection device is stopped or approaches the object to be detected.

According to one aspect of the present disclosure, a three-dimensional object detection device that detects a corner of a three-dimensional object to be detected includes:
- a transmitter that transmits a search wave;
- a first receiver that receives a reflected wave that is part of the search wave from the transmitter reflected off the corner as a spherical wave;
- a second receiver that is located at a position different from a position of the first receiver and receives the reflected wave;
- a first path-length calculator that determines a first path length, which is a length of a path along which the search wave propagates after being transmitted from the transmitter until the reflected wave is received by the first receiver;
- a first ellipse calculator that uses a position of the transmitter and the position of the first receiver as focal points to find a first ellipse defined by a set of points whose distances from the transmitter and the first receiver add up to the first path length;
- a second path-length calculator that determines a second path length, which is a length of a path along which the search wave propagates after being transmitted from the transmitter until the reflected wave is received by the second receiver;
- a second ellipse calculator that uses a position of the transmitter and the position of the second receiver as focal points to find a second ellipse defined by a set of points whose distances from the transmitter and the second receiver add up to the second path length; and
- a corner calculator that finds an intersection point between the first and second ellipses as the corner.

This makes it possible to provide a three-dimensional object detection device that detects a corner of a three-dimensional object even when a vehicle mounted the three-dimensional object detection device is stopped or approaches the object to be detected.

According to another aspect of the present disclosure, a three-dimensional object detection device that detects a three-dimensional object to be detected having a first corner and a second corner includes:
- a transmitter that transmits a search wave;
- a first receiver that receives a reflected wave that is part of the search wave from the transmitter reflected off the first or second corner as a spherical wave;
- a second receiver that is located at a position different from a position of the first receiver and receives the reflected wave;
- a first path-length calculator that determines a first path length, which is a length of a path along which the search wave propagates after being transmitted from the transmitter until a second wave of the reflected wave is received by the first receiver;
- a first ellipse calculator that uses a position of the transmitter and the position of the first receiver as focal points to find a first ellipse defined by a set of points whose distances from the transmitter and the first receiver add up to the first path length;
- a second path-length calculator that determines a second path length, which is a length of a path along which the search wave propagates after being transmitted from the transmitter until the second wave of the reflected wave is received by the second receiver;
- a second ellipse calculator that uses a position of the transmitter and the position of the second receiver as focal points to find a second ellipse defined by a set of points whose distances from the transmitter and the second receiver add up to the second path length; and
- a corner calculator that finds an intersection point between the first and second ellipses as a farther corner, the farther corner being the one of the first and second corners located farther from the first and second receivers.

This makes it possible to provide a three-dimensional object detection device that detects the farther corner of a three-dimensional object even when a vehicle mounted the three-dimensional object detection device is stopped or approaches the object to be detected.

The reference signs in parentheses attached to the components or the like indicate examples of the correspondence between the components or the like and the specific components described in relation to the embodiments described below.

Embodiments of the present disclosure will be described below with reference to the drawings. In the following embodiments, to simplify the explanation, parts of an embodiment that are the same as or equivalent to parts of another embodiment are assigned with the same reference signs.

First Embodiment

FIG. 1 shows the configuration of a vehicle three-dimensional object detection device 1 according to the present embodiment. In the following, for convenience of explanation, the vehicle on which the three-dimensional object detection device 1 is mounted is assumed to be the host vehicle.

The vehicle three-dimensional object detection device 1 according to the present embodiment is a device for detecting a three-dimensional object 2 to be detected outside the host vehicle. The three-dimensional object 2 of the present embodiment is assumed to be a rectangular column that becomes an obstacle when parking the host vehicle. The rectangular column stands in a parking lot and has an axis extending in the vertical direction.

For convenience of explanation, the vertical direction is defined as a Z direction, the direction orthogonal to the Z direction and in which the three-dimensional object 2 and the host vehicle can be connected is defined as a Y direction, and the direction orthogonal to both the Z and Y directions is defined as an X direction.

Figure 3:
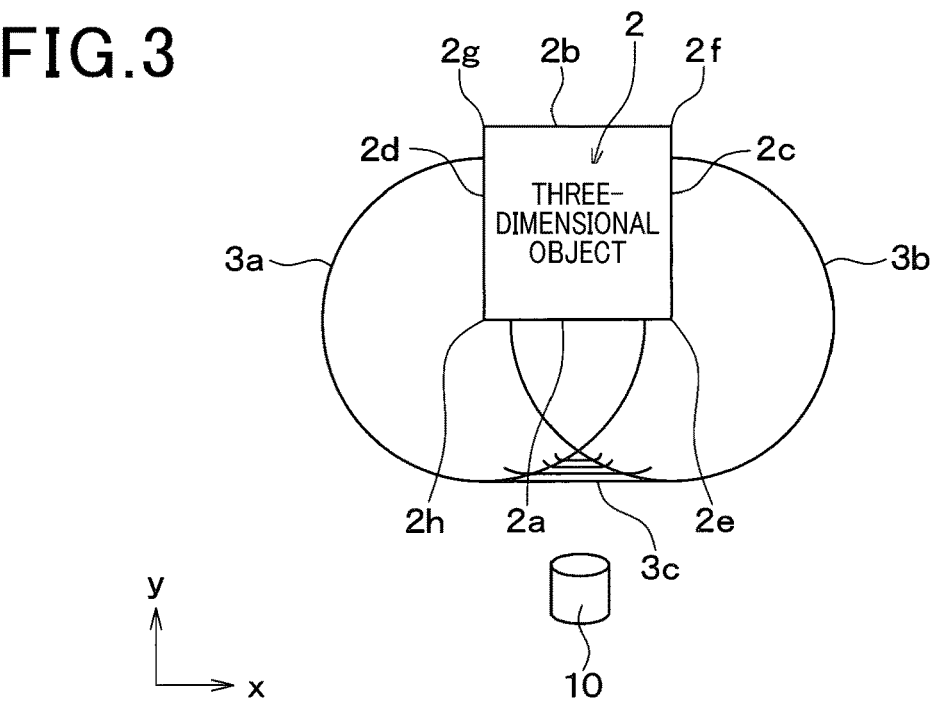
FIG. 3 is a schematic diagram for assisting the explanation of plane waves and spherical waves that are parts of ultrasonic waves from an ultrasonic sonar shown in FIG. 1 reflected off the three-dimensional object to be detected.

The three-dimensional object 2 in FIG. 3 has a rectangular cross section in the horizontal plane, and includes side faces 2*a*, 2*b*, 2*c*, and 2*d* and corners 2*e*, 2*f*, 2*g*, and 2*h*.

The side face 2*a* is on the host vehicle side of the three-dimensional object 2 in the Y direction. The side face 2*b* is on the side of the three-dimensional object 2 opposite to the host vehicle in the Y direction. The side faces 2*a* and 2*b* are side faces extending in the X and Z directions.

The side face 2*c* is on one side of the three-dimensional object 2 in the X direction with respect to the side faces 2*a* and 2*b*. The side face 2*d* is on the other side of the three-dimensional object 2 in the X direction with respect to the side faces 2*a* and 2*b*. The side faces 2*c* and 2*d* are side faces extending in the Y and Z directions.

A corner 2*e* is a first corner formed at the intersection between the side faces 2*a* and 2*c*. The corner 2*e* is on one side of the side face 2*a* in the X direction. The corner 2*f* is formed at the intersection between the side faces 2*b* and 2*c*. The corner 2*f* is on one side of the side face 2*b* in the X direction.

The corner 2*g* is formed at the intersection between the side faces 2*b* and 2*d*. The corner 2*g* is on the other side of the side face 2*b* in the X direction. A corner 2*h* is a second corner formed at the intersection between the side faces 2*a* and 2*d*. The corner 2*h* is on the other side of the side face 2*a* in the X direction.

As shown in FIG. 1, the vehicle three-dimensional object detection device 1 includes ultrasonic sonars 10, 11, 12, and 13 and an electronic control device 18. The ultrasonic sonars 10, 11, 12, and 13 are attached to the front bumper, rear bumper, side mirrors, or the like of the host vehicle as search devices facing the outside of the vehicle.

The ultrasonic sonars 10, 11, 12, and 13 of this embodiment are arranged in a line at regular intervals. That is, the ultrasonic sonars 10, 11, 12, and 13 are placed at different positions.

The ultrasonic sonars 10, 11, 12, and 13 each have a transmitter that transmits ultrasonic waves as search waves toward the outside of the vehicle, and a receiver that receives the reflected waves reflected off the three-dimensional object 2 as described later and outputs reception signals to the electronic control device 18. For convenience of explanation, the ultrasonic sonars 10, 11, 12, and 13 are also referred to as ultrasonic sonars 10 to 13.

The electronic control device 18 includes a microprocessor, a memory, and the like. The electronic control device 18 executes a three-dimensional object detection process for detecting the three-dimensional object 2 according to a program stored in the memory in advance. That is, the electronic control device 18 is configured to allow a microprocessor to read a program from a memory for execution of the program to thereby accomplish various functions. The memory is a non-transitory physical storage medium.

By executing the three-dimensional object detection process, the electronic control device 18 causes the ultrasonic sonar 10 to transmit ultrasonic waves, and, based on the reception signals output from the ultrasonic sonars 11, 12, and 13 when they receive the reflected waves, the three-dimensional object 2 is detected.

Figure 2:
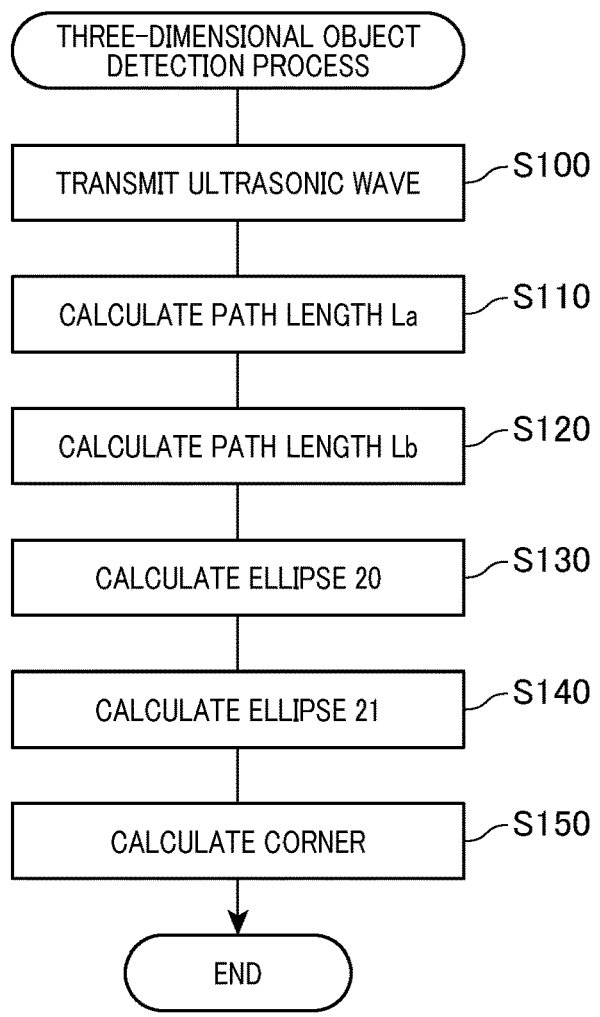
FIG. 2 is a flowchart showing a three-dimensional detection process carried out in a microprocessor of an electronic control device shown in FIG. 1.

Next, how the vehicle three-dimensional object detection device 1 according the present embodiment operates will be described with reference to FIGS. 2, 3, 4, and 5. FIG. 2 is a flowchart showing the three-dimensional object detection process carried out in the electronic control device 18.

The electronic control device 18 executes the three-dimensional object detection process according to the flowchart in FIG. 2.

First, in step S100, the electronic control device 18 causes the ultrasonic sonar 10 as a transmitter to transmit an ultrasonic wave toward the three-dimensional object 2. The transmitted ultrasonic wave then propagates toward the three-dimensional object 2.

As shown in FIG. 3, part of the ultrasonic wave from the ultrasonic sonar 10 that has reached the side face 2*a* of the three-dimensional object 2 is reflected as a plane wave 3*c*. The plane wave 3*c* is an ultrasonic wave whose wavefront is perpendicular to the traveling direction (for example, the wavefront is parallel to the X direction). The plane wave 3*c* is propagated toward the ultrasonic sonar 10.

Ultrasonic waves from the ultrasonic sonar 10 that have reached the corner 2*h* of the three-dimensional object 2 are reflected as a spherical wave 3*a* shown in FIG. 3. The spherical wave 3*a* is an ultrasonic wave that forms a spherical wavefront whose center is at the corner 2*h*.

On the other hand, ultrasonic waves from the ultrasonic sonar 10 that have reached the corner 2*e* of the three-dimensional object 2 are reflected as a spherical wave 3*b* shown in FIG. 3. The spherical wave 3*b* is an ultrasonic wave that forms a spherical wavefront whose center is at the corner 2*e*.

Figure 4:
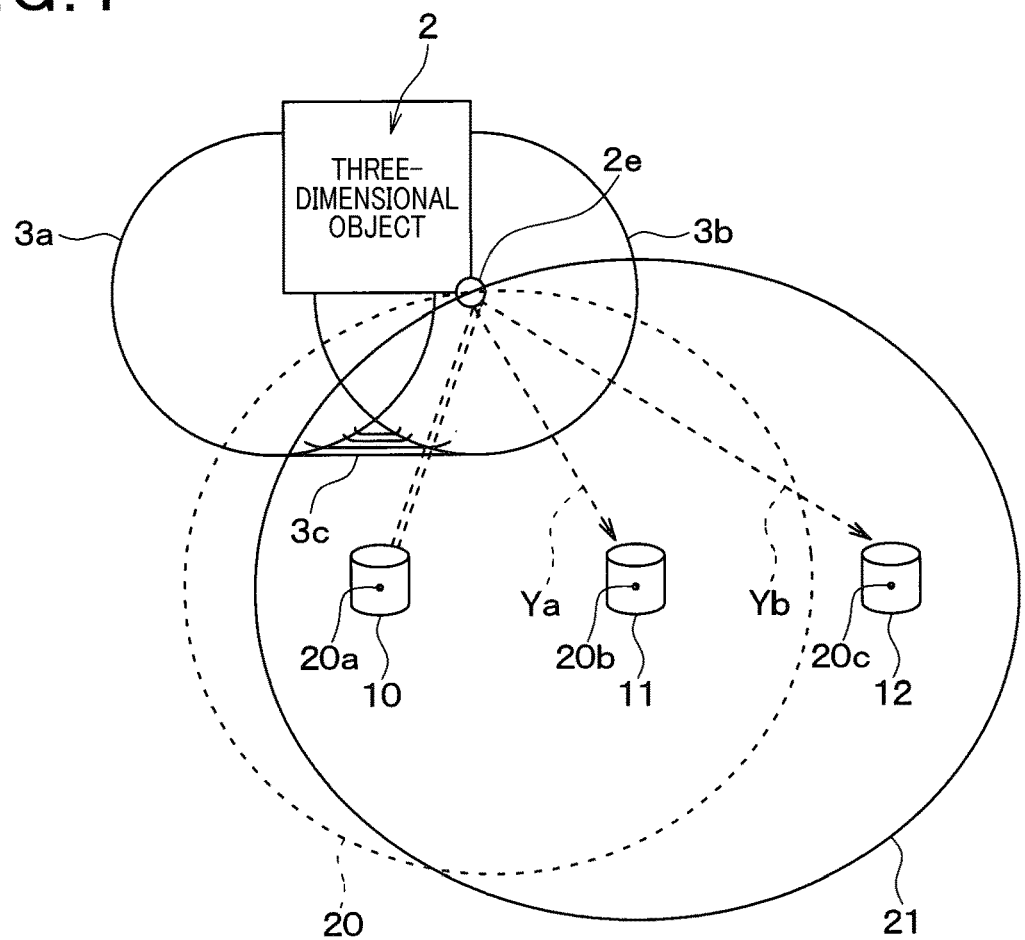
FIG. 4 is a diagram for assisting the explanation of how two receiving sonars receive a spherical wave that is part of the ultrasonic wave from the transmitting sonar shown in FIG. 1 reflected off a three-dimensional object, and the explanation of the principle of finding a corner of the three-dimensional object using ellipses that are each found for a corresponding receiving sonar.

The spherical wave 3*b* is propagated toward the ultrasonic sonars 11 and 12 as indicated by arrows Ya and Yb in FIG. 4. The spherical wave 3*b* is then received by the ultrasonic sonars 11 and 12 as receivers for detection. Following this, the ultrasonic sonars 11 and 12 each output a reception signal to the electronic control device 18.

This allows the electronic control device 18 to determine that the ultrasonic sonar 11 has received the spherical wave 3*b* as a reflected wave when the electronic control device 18 receives the reception signal from the ultrasonic sonar 11. When the electronic control device 18 receives the reception signal from the ultrasonic sonar 12, it determines that the ultrasonic sonar 12 has received the spherical wave 3*b* as a reflected wave.

Next, in step S110 (that is, a first path-length calculator), the electronic control device 18 determines a path length La (that is, a first path-length), which is the length of the path along which an ultrasonic wave propagates after being transmitted from the ultrasonic sonar 10 until the reflected wave is received by the ultrasonic sonar 11.

Specifically, the electronic control device 18 obtains a propagation time Ta for which the ultrasonic wave propagates after being transmitted from the ultrasonic sonar 10 until the reflected wave is received by the ultrasonic sonar 11. Then, the electronic control device 18 calculates the path length La by multiplying the propagation time Ta by the speed of sound Sc as shown in Eq. 1-1 below.

$$La = Ta \times Sc \qquad \text{Eq. 1-1}$$

Next, in step S120 (that is, a second path-length calculator), the electronic control device 18 determines a path length Lb (that is, a second path-length), which is the length of the path along which the ultrasonic propagates after being transmitted from the ultrasonic sonar 10 until the reflected wave is received by the ultrasonic sonar 12.

Specifically, the electronic control device 18 obtains a propagation time Tb for which the ultrasonic wave propagates after being transmitted from the ultrasonic sonar 10 until the reflected wave is received by the ultrasonic sonar 12. Then, the electronic control device 18 obtains the path length Lb by multiplying the propagation time Tb by the speed of sound Sc as shown in Eq. 1-2 below.

$$Lb = Tb \times Sc \qquad \text{Eq. 1-2}$$

In the subsequent step S130, the electronic control device 18 uses the positions of the ultrasonic sonars 10 and 11 as focal points 20a and 20b to find an ellipse 20 defined by a set of points whose distances from the ultrasonic sonars 10 and 11 add up to the path length La.

In the subsequent step S140, the electronic control device 18 uses the positions of the ultrasonic sonars 10 and 12 as focal points 20a and 20c to find an ellipse 21 defined by a set of points whose distances from the ultrasonic sonars 10 and 12 add up to the path length Lb.

In this way, the electronic control device 18 obtains the ellipse 20 in step S130 (that is, the first ellipse calculator) and the ellipse 21 in step S140 (that is, the second ellipse calculator).

Next, in step S150 (that is, a corner calculator), the electronic control device 18 finds the intersection point between the ellipse (that is, the first ellipse) 20 and the ellipse (that is, the second ellipse) 21 as the corner 2e of the three-dimensional object 2.

Figure 5:
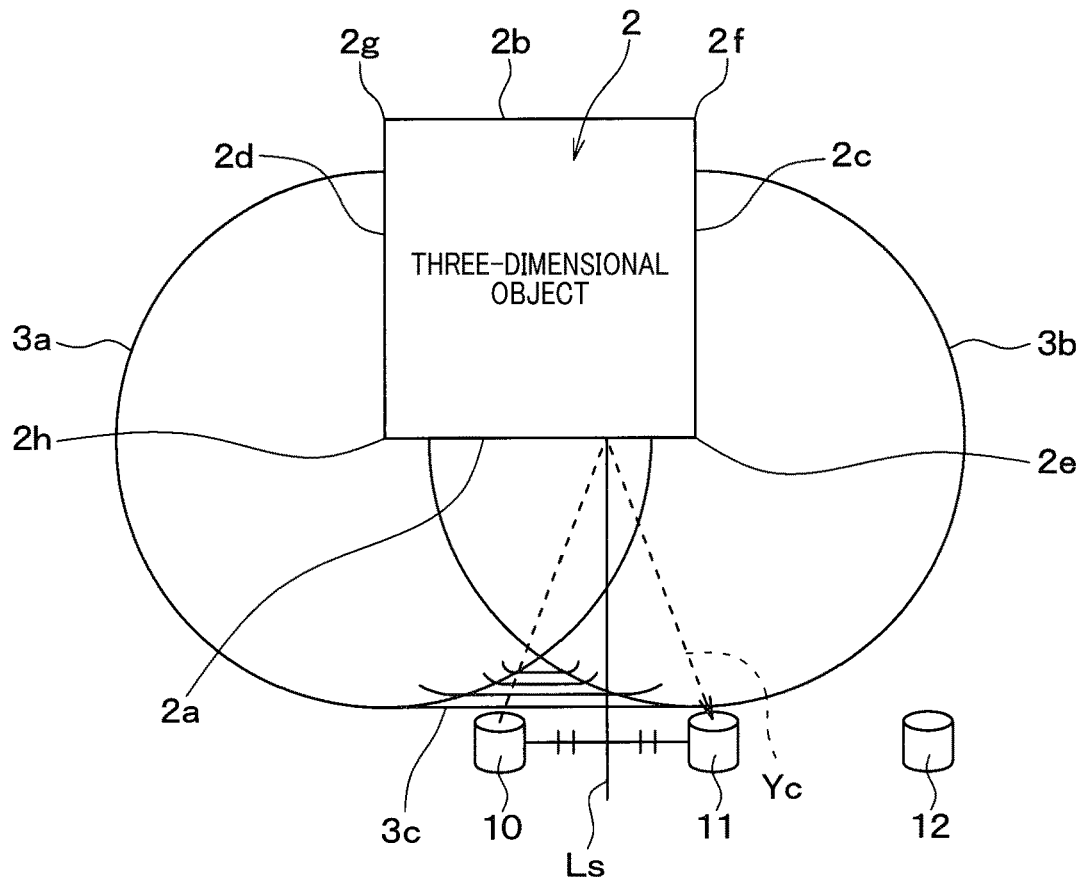
FIG. 5 is a diagram for assisting the explanation of how receiving sonars receive a plane wave that is part of an ultrasonic wave from the transmitting sonar in FIG. 1 reflected off a side face of the three-dimensional object.

As shown in FIG. 5, part of an ultrasonic wave from the ultrasonic sonar 10 reflected off the side face 2a of the three-dimensional object 2 is propagated as a plane wave toward the ultrasonic sonar 11 as indicated by an arrow Yc.

In this case, the point on the path along which an ultrasonic wave transmitted from the ultrasonic sonar 10 is propagated to the ultrasonic sonar 11 that intersects a bisector Ls of the line segment connecting the positions of the ultrasonic sonars 10 and 11 (that is, the side face 2a) is the reflection point.

Therefore, the corner 2e of the three-dimensional object 2 cannot be detected. This makes it important that the ultrasonic sonar 11 determines whether a plane wave or a spherical wave has been received.

In this regard, when a reflected wave as a spherical wave is received by the ultrasonic sonars 11 and 12, the corner 2e is on the ellipse 20 with focal points 20a and 20b at the positions of the ultrasonic sonars 10 and 11.

In this case, the corner 2e is located on the ellipse 21 with focal points 20a and 20c at the positions of the ultrasonic sonars 10 and 12. Therefore, the intersection point of the ellipses 20 and 21 can be determined to be the corner 2e.

For example, when there are two intersection points between the ellipses 20 and 21, the intersection point located on the three-dimensional object 2 side with respect to the ultrasonic sonar 10 is determined to be the corner 2e.

According to the present embodiment described above, the vehicle three-dimensional object detection device 1 detects a corner 2e of the three-dimensional object 2 to be detected.

Specifically, the vehicle three-dimensional object detection device 1 includes the ultrasonic sonar 10 and the ultrasonic sonar 11 that receives the reflected wave that is the part of the search wave from the ultrasonic sonar 10 reflected off the corner 2e as a spherical wave. The vehicle three-dimensional object detection device 1 includes the ultrasonic sonar 12 that receives the reflected wave reflected off the corner 2e as a spherical wave.

The electronic control device 18 determines the path length La, which is the length of the path along which a search wave propagates after being transmitted from the ultrasonic sonar 10 until the reflected wave is received by the ultrasonic sonar 11.

The electronic control device 18 uses the positions of the ultrasonic sonars 10 and 11 as the focal points 20a and 20b to find the ellipse 20 defined by a set of points whose distances from the ultrasonic sonars 10 and 11 add up to the path length La.

The electronic control device 18 uses the positions of the ultrasonic sonars 10 and 12 as the focal points 20a and 20c to find the ellipse 21 defined by a set of points whose distances from the ultrasonic sonars 10 and 12 add up to the path length Lb. The electronic control device 18 detects the intersection point of the ellipses 20 and 21 as the corner 2e.

The above configuration makes it possible to provide a vehicle three-dimensional object detection device 1 that detects a corner 2e of a three-dimensional object 2 even when the vehicle three-dimensional object detection device 1 itself is stopped (the host vehicle mounted the vehicle three-dimensional object device 1 is stopped) or the vehicle three-dimensional object detection device 1 itself approaches the three-dimensional object 2 (the host vehicle mounted the vehicle three-dimensional object device 1 approaches the three-dimensional object 2).

Second Embodiment

In the first embodiment described above, an example in which the ultrasonic sonar 10 as a transmitting sonar transmits ultrasonic waves has been described. The second embodiment that, instead of this, selects from the ultrasonic sonars 10, 11, 12, and 13 the ultrasonic sonar that transmits ultrasonic waves will be described with reference to FIGS. 6, 7, 8, 9, and 10.

Figure 6:
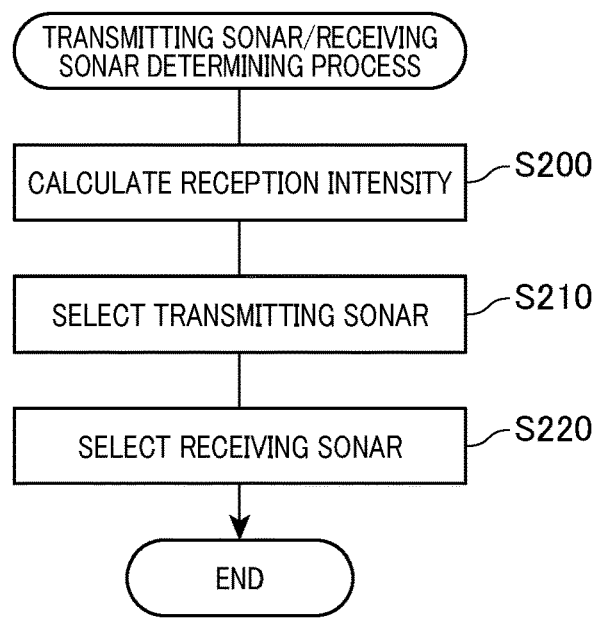
FIG. 6 is a flowchart showing in detail a transmitting sonar/receiving sonar determining process carried out in a microprocessor of an electronic control device of a vehicle three-dimensional object detection device according to a second embodiment.

FIG. 6 is a flowchart of a transmitting sonar/receiving sonar determining process. The transmitting sonar/receiving sonar determining process is a process for determining which of the ultrasonic sonars 10, 11, 12, and 13 transmits an ultrasonic wave and which of them receives a spherical wave as a reflected wave.

The electronic control device 18 executes the transmitting sonar/receiving sonar determining process prior to the three-dimensional object detection process. The electronic control device 18 executes the transmitting sonar/receiving sonar determining process according to the flowchart of FIG. 6.

First, in step S200, the electronic control device 18 causes the ultrasonic sonars 10, 11, 12, and 13 (that is, a plurality of search devices) to transmit ultrasonic waves using time division. At this time, the electronic control device 18 serves as a reception intensity detector that determines, for each of the ultrasonic sonars 10, 11, 12, and 13, the reception intensity at which the reflected wave that is the ultrasonic wave transmitted by itself and reflected off the three-dimensional object 2 has been received by the ultrasonic sonar 10, 11, 12, or 13.

Specifically, the electronic control device 18 detects a reception intensity Va at which the reflected wave which is part of the ultrasonic wave transmitted from the ultrasonic sonar 10 and reflected off the three-dimensional object 2 has been received by the ultrasonic sonar 10.

Likewise, the electronic control device 18 detects a reception intensity Vb at which the reflected wave which is part of the ultrasonic wave transmitted from the ultrasonic sonar 11 and reflected off the three-dimensional object 2 has been received by the ultrasonic sonar 11. The electronic control device 18 detects a reception intensity Vc at which the reflected wave which is part of the ultrasonic wave from the ultrasonic sonar 12 reflected off the three-dimensional object 2 has been received by the ultrasonic sonar 12. The electronic control device 18 detects a reception intensity Vd at which the reflected wave which is part of the ultrasonic wave from the ultrasonic sonar 13 reflected off the three-dimensional object 2 has been received by the ultrasonic sonar 13.

When the reflected wave received by the ultrasonic sonars 10, 11, 12, and 13 is a spherical wave, the reception intensity is lower than when a plane wave is received as the reflected wave.

Therefore, in step S210 (that is, a transmitter determining unit), the electronic control device 18 determines a maximum reception intensity Vmax, which is the highest among the reception intensities Va, Vb, Vc, and Vd at which reflected waves have been received by the ultrasonic sonars 10, 11, 12, and 13.

In addition, in step S210, the electronic control device 18 selects the ultrasonic sonar (i.e., a first search device) that has the maximum reception intensity Vmax among the ultrasonic sonars 10, 11, 12, and 13 as the transmitting sonar.

That is, the electronic control device 18 selects, as the transmitting sonar, the ultrasonic sonar that tends to receive, as the reflected wave, a plane wave from the side face 2a of the three-dimensional object 2 the most among the ultrasonic sonars 10, 11, 12, and 13.

In other words, it is possible to prevent the ultrasonic sonar that is affected by the plane wave as the reflected wave the most among the ultrasonic sonars 10, 11, 12, and 13 from being used as a receiving sonar, which is described later.

Figure 7:
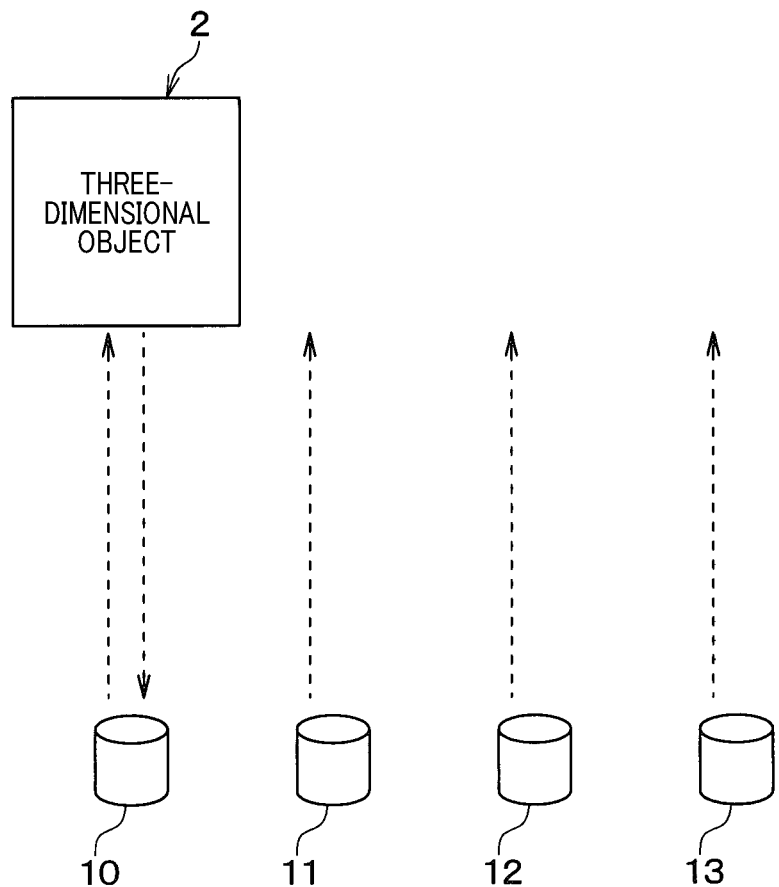
FIG. 7 is a diagram for assisting the explanation of how the four sonars of the vehicle three-dimensional object detection device according to the second embodiment sequentially transmit ultrasonic waves and each receive the reflected wave that is the part of the ultrasonic wave from itself reflected off the three-dimensional object.

For example, when the reception intensity Va is the maximum reception intensity Vmax, as shown in FIG. 7, the ultrasonic sonar 10 is selected as the transmitting sonar from the ultrasonic sonars 10, 11, 12, and 13.

The ultrasonic sonars 11, 12, and 13 among the ultrasonic sonars 10, 11, 12, and 13 other than the ultrasonic sonar 10 are selected as non-transmitting sonars.

Next, in step S220, the electronic control device 18 selects an ultrasonic sonar from the ultrasonic sonars 10, 11, 12, and 13 that receives a spherical wave as the reflected wave in the three-dimensional object detection process. The ultrasonic sonar that receives a spherical wave as the reflected wave will also be referred to as a receiving sonar hereinafter.

Specifically, the electronic control device 18 selects the ultrasonic sonar (i.e., a second search device) that is closest to the transmitting sonar among the ultrasonic sonars 10, 11, 12, and 13 as a non-receiving sonar. This makes it possible to prevent the ultrasonic sonar closest to the transmitting sonar among the ultrasonic sonars 10, 11, 12, and 13 from being selected as a receiving sonar.

Further, the electronic control device 18 selects the ultrasonic sonars among the ultrasonic sonars 10, 11, 12, and 13 that are not the selected non-receiving sonar or the transmitting sonar as the receiving sonars (i.e., first and second receivers).

This makes it possible to prevent an ultrasonic sonar that receives a plane wave that is part of the ultrasonic wave transmitted from the transmitting sonar and reflected off the side face 2a of the three-dimensional object 2 from being selected as the receiving sonar.

For example, when the reception intensity Va is the maximum reception intensity Vmax, the electronic control device 18 selects the ultrasonic sonar 10 as the transmitting sonar. The electronic control device 18 selects the ultrasonic sonar 11 as the non-receiving sonar among the ultrasonic sonars 10, 11, 12, and 13 when it is closest to the ultrasonic sonar 10.

Figure 8:
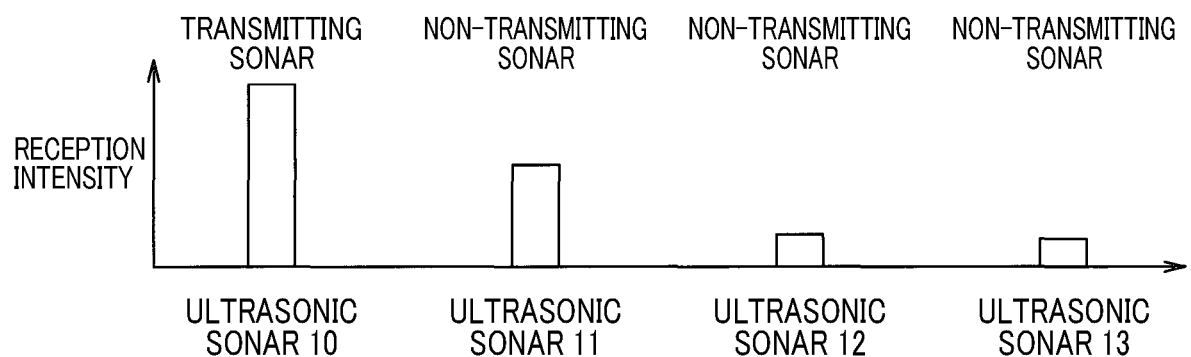
FIG. 8 is a diagram for assisting the explanation of the principle of selecting the transmitting sonar from the four ultrasonic sonars of the vehicle three-dimensional object detection device according to the second embodiment.
Figure 9:
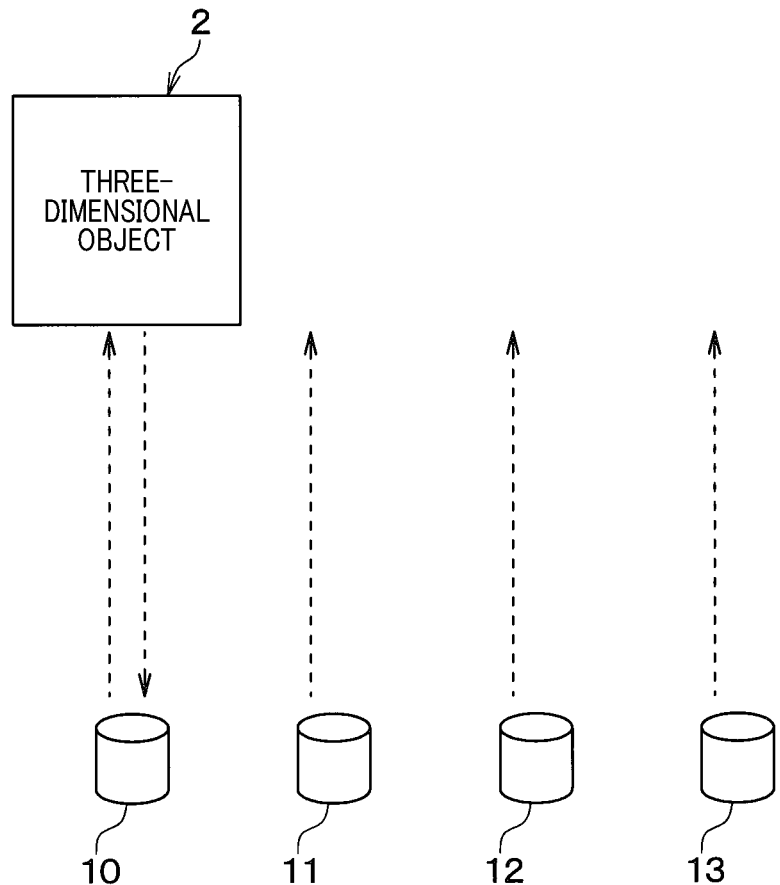
FIG. 9 is a diagram for assisting the explanation of how the four sonars of the vehicle three-dimensional object detection device according to the second embodiment sequentially transmit ultrasonic waves and each receive the reflected wave that is the part of the ultrasonic wave from itself reflected off the three-dimensional object.
Figure 10:
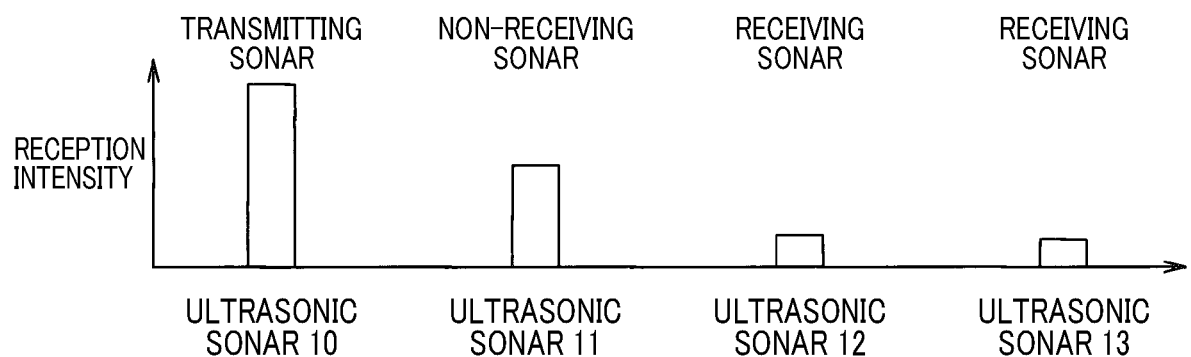
FIG. 10 is a diagram for assisting the explanation of the principle of selecting receiving sonars from the four sonars of the vehicle three-dimensional object detection device according to the second embodiment.

As shown in FIG. 8, the electronic control device 18 selects the ultrasonic sonars 12 and 13 among the ultrasonic sonars 10, 11, 12, and 13 other than the ultrasonic sonars 10 and 11 as the receiving sonars (i.e., the first and second receiving sonars for detection).

As described above, the electronic control device 18 executes the transmitting sonar/receiving sonar determining process to select the transmitting sonar and receiving sonar from the ultrasonic sonars 10, 11, 12, and 13.

Third Embodiment

In the above second embodiment, an example is described in which the ultrasonic sonar closest to the transmitting sonar among the ultrasonic sonars 10, 11, 12, and 13 is selected as the non-receiving sonar.

Figure 11:
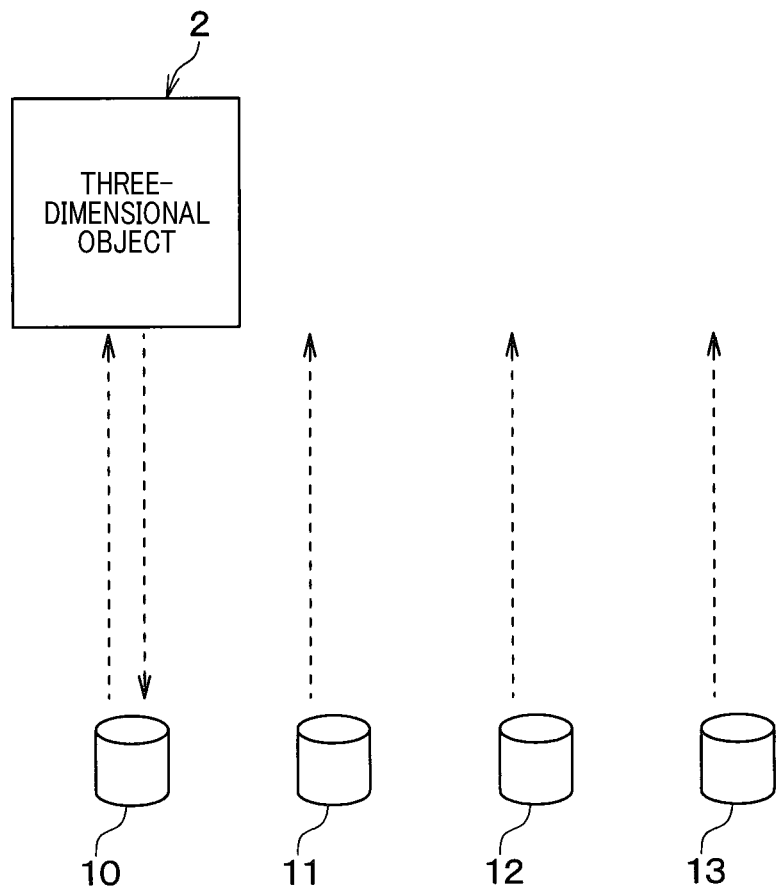
FIG. 11 is a diagram for assisting the explanation of how the four sonars of a vehicle three-dimensional object detection device according to a third embodiment sequentially transmit ultrasonic waves and each receive the reflected wave that is the part of the ultrasonic wave from itself reflected off the three-dimensional object.

The third embodiment, which instead selects even the ultrasonic sonar closest to the transmitting sonar among the ultrasonic sonars 10, 11, 12, and 13 as a receiving sonar, will be described with reference to FIGS. 11 and 12.

The electronic control device 18 of the present embodiment selects the ultrasonic sonar that has the maximum reception intensity Vmax among the ultrasonic sonars 10, 11, 12, and 13 as the transmitting sonar, and the ultrasonic sonars among the ultrasonic sonars 10, 11, 12, and 13 other than the transmitting sonar as the receiving sonars.

Figure 12:
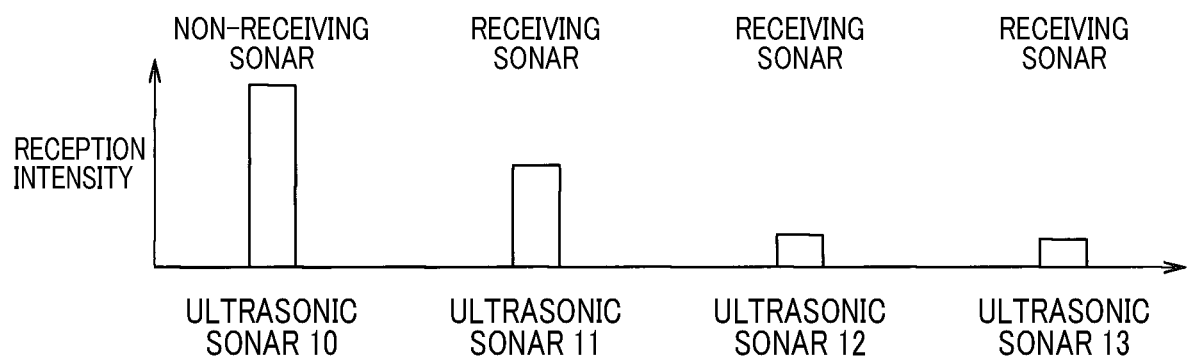
FIG. 12 is a diagram showing the reception intensity of each of the four ultrasonic sonars to assist the explanation of the principle of choosing the transmitting sonar and receiving sonars from the four ultrasonic sonars of the vehicle three-dimensional object detection device according to the third embodiment.

For example, when it is assumed that the ultrasonic sonar 10 is the transmitting sonar, as shown in FIG. 12, the electronic control device 18 selects the ultrasonic sonars 11, 12, and 13 among the ultrasonic sonars 10, 11, 12, and 13 other than the ultrasonic sonar 10 as the receiving sonars.

In this case, as with the first embodiment, the electronic control device 18 determines the path length La, which is the length of the path along which an ultrasonic wave propagates after being transmitted from the ultrasonic sonar 10 until the reflected wave is received by the ultrasonic sonar 11.

The electronic control device 18 determines the path length Lb, which is the length of the path along which an ultrasonic wave propagates after being transmitted from the ultrasonic sonar 10 until the reflected wave is received by the ultrasonic sonar 12. The electronic control device 18 determines the path length Lc, which is the length of the path along which an ultrasonic wave propagates after being transmitted from the ultrasonic sonar 10 until the reflected wave is received by the ultrasonic sonar 13.

The electronic control device 18 uses the positions of the ultrasonic sonars 10 and 11 as focal points 20a and 20b to find an ellipse 20 defined by a set of points whose distances from the ultrasonic sonars 10 and 11 add up to the path length La.

The electronic control device 18 uses the positions of the ultrasonic sonars 10 and 12 as focal points 20a and 20c to find an ellipse 21 defined by a set of points whose distances from the ultrasonic sonars 10 and 12 add up to the path length Lb.

The electronic control device 18 uses the positions of the ultrasonic sonars 10 and 13 as focal points 20a and 20d to find an ellipse 22 defined by a set of points whose distances from the ultrasonic sonars 10 and 13 add up to the path length Lc.

Further, the electronic control device 18 finds the intersection point of the ellipses 20, 21, and 22 as the corner 2e of the three-dimensional object 2.

Fourth Embodiment

In the above third embodiment, an example is described in which three ultrasonic sonars serve as receiving sonars.

The fourth embodiment, which instead causes the ultrasonic sonar among the three ultrasonic sonars that has received a plane wave to be a non-receiving sonar, will be described with reference to FIGS. 13 and 14.

Figure 13:
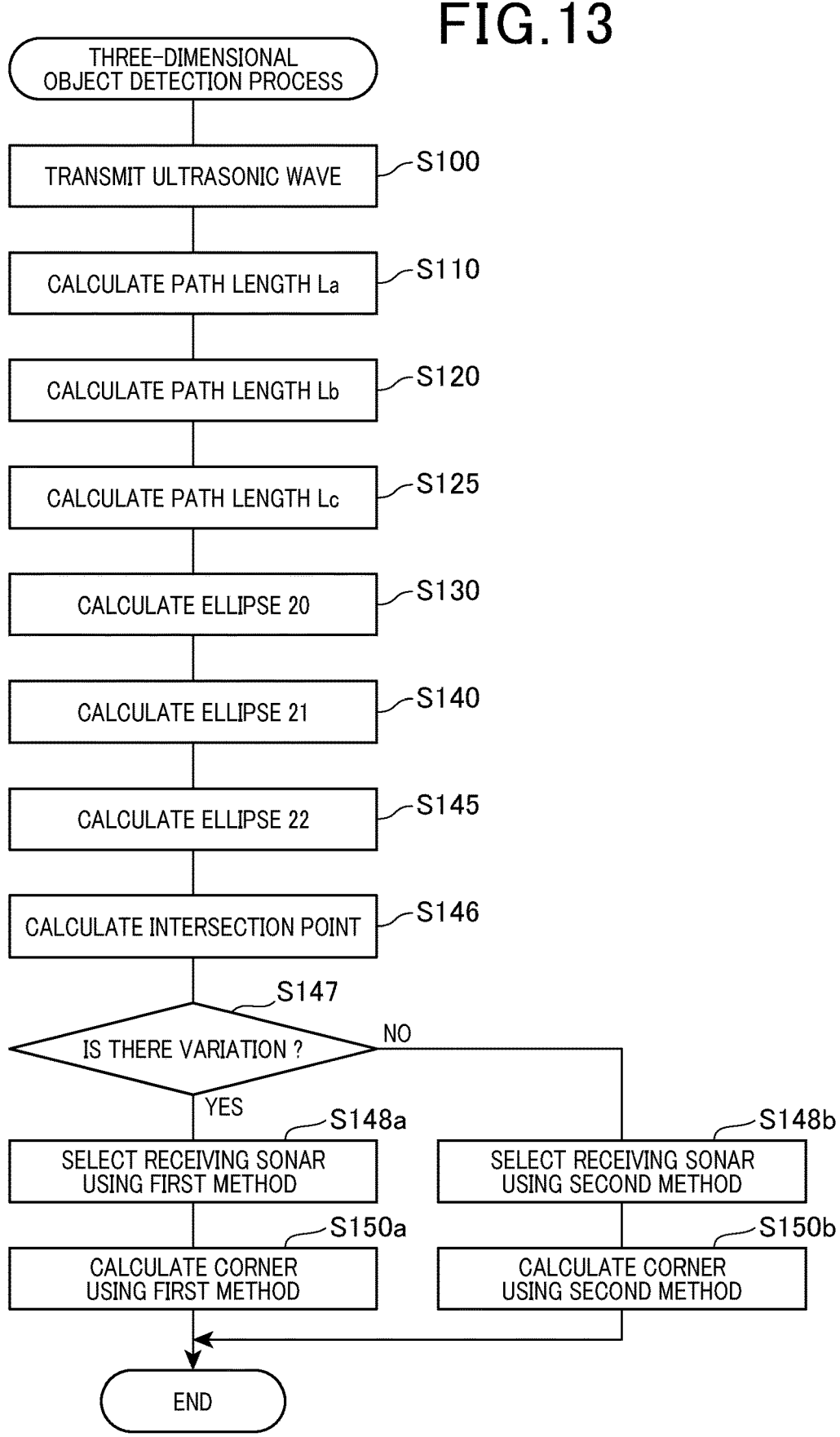
FIG. 13 is a flowchart showing in detail a three-dimensional detection process carried out in a microprocessor of an electronic control device of a vehicle three-dimensional object detection device according to a fourth embodiment.

FIG. 13 is a flowchart showing the three-dimensional object detection process carried out in the electronic control device 18 of the present embodiment. In FIG. 13, a reference sign that is also used in FIG. 2 indicates the same step, and the description thereof is omitted. The electronic control device 18 executes the three-dimensional object detection process according to the flowchart of FIG. 13.

First, in step S100, the electronic control device 18 causes the ultrasonic sonar 10 as a transmitter to transmit ultrasonic waves toward the three-dimensional object 2. The transmitted ultrasonic waves then propagate toward the three-dimensional object 2.

Figure 14:
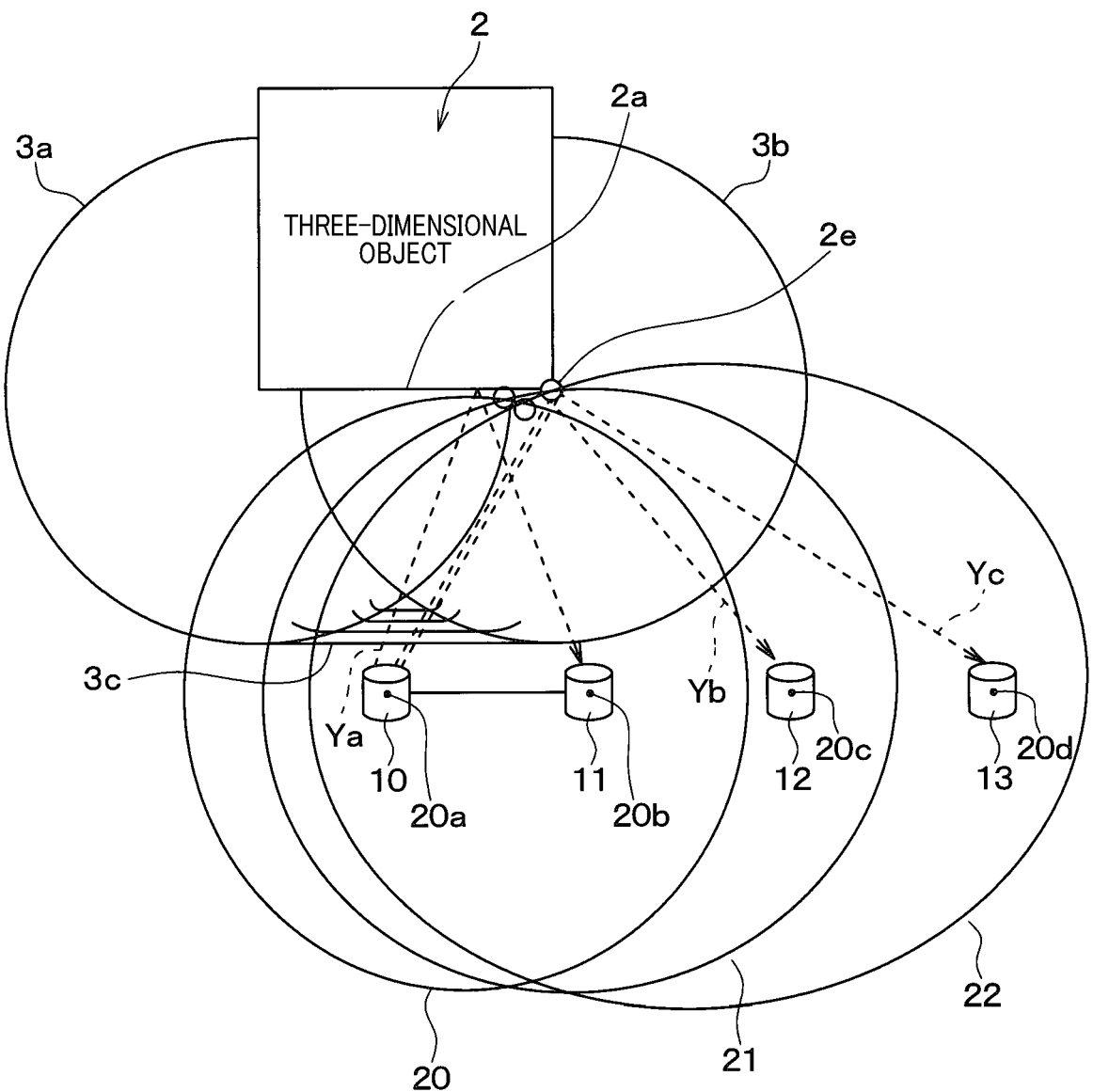
FIG. 14 is a diagram for assisting the explanation of the principle of finding, in the three-dimensional detection process of the fourth embodiment, a corner of a three-dimensional object using ellipses each corresponding to a different receiving sonar and having focal points located at the transmitting sonar and the receiving sonar.

As shown in FIG. 14, parts of an ultrasonic wave propagated from the ultrasonic sonar 10 that have reached the three-dimensional object 2 will be reflected. The reflected waves are propagated toward the ultrasonic sonars 11, 12, and 13 as indicated by arrows Ya, Yb, and Yc.

The reflected waves are then received by the ultrasonic sonars 11, 12, and 13. Following this, the ultrasonic sonars 11, 12, and 13 each output a reception signal to the electronic control device 18.

Next, in step S110, the electronic control device 18 determines the path length La (that is, the first path-length), which is the length of the path along which an ultrasonic wave propagates after being transmitted from the ultrasonic sonar 10 until the reflected wave is received by the ultrasonic sonar 11 (that is, the first receiver).

Next, in step S120, the electronic control device 18 determines the path length Lb (that is, the second path-length), which is the length of the path along which the ultrasonic propagates after being transmitted from the ultrasonic sonar 10 until the reflected wave is received by the ultrasonic sonar 12 (that is, the second receiver).

Since the calculation of the path lengths La and Lb is the same as that carried out in the first embodiment, the description thereof will be omitted.

Next, in step S125 (that is, a third path-length calculator), the electronic control device 18 determines a path length Lc (that is, a third path-length), which is the length of the path along which an ultrasonic wave propagates after being transmitted from the ultrasonic sonar 10 until the reflected wave is received by the ultrasonic sonar 13.

Specifically, the electronic control device 18 obtains a propagation time Tc for which the ultrasonic wave propagates after being transmitted from the ultrasonic sonar 10 until the reflected wave is received by the ultrasonic sonar 13 (that is, a third receiver). Then, the electronic control device 18 obtains the path length Lc by multiplying the propagation time Tc by the speed of sound Sc as shown in Eq. 4-1 below.

$$Lc = Tc \times Sc \qquad \text{Eq. 4-1}$$

In the subsequent step S130, the electronic control device 18 uses the positions of the ultrasonic sonars 10 and 11 as focal points 20a and 20b to find an ellipse 20 defined by a set of points whose distances from the ultrasonic sonars 10 and 11 add up to the path length La.

In the subsequent step S140, the electronic control device 18 uses the positions of the ultrasonic sonars 10 and 12 as focal points 20a and 20c to find an ellipse 21 defined by a set of points whose distances from the ultrasonic sonars 10 and 12 add up to the path length Lb.

In the subsequent step S145, the electronic control device 18 uses the positions of the ultrasonic sonars 10 and 13 as focal points 20a and 20d to find an ellipse 22 defined by a set of points whose distances from the ultrasonic sonars 10 and 13 add up to the path length Lc.

The electronic control device 18 thus obtains the ellipse 20 as the first ellipse, the ellipse 21 as the second ellipse, and the ellipse 22 as the third ellipse through steps S130, S140, and S145. Step S145 corresponds to a third ellipse calculator.

Next, in step S146 (that is, an intersection point calculator), the electronic control device 18 calculates the coordinates of the intersection point of the ellipse 20 (that is, the first ellipse), the ellipse 21 (that is, the second ellipse) and the ellipse 22 (that is, the third ellipse).

The intersection point between the ellipses 20 and 21 is referred to as an intersection point 24a, and the intersection point between the ellipses 21 and 22 intersect is referred to as an intersection point 24b. The intersection point between the ellipses 20 and 22 is referred to as an intersection point 24c.

Next, in step S147 (that is, an intersection point decision unit), the electronic control device 18 determines whether there is variation in the coordinates of the intersection points 24a, 24b, and 24c where ellipses 20, 21, and 22 intersect.

As shown in FIG. 14, when the coordinates of the intersection points 24a, 24b, and 24c do not match, the electronic control device 18 determines that there is variation in the positions of the intersection points 24a, 24b, and 24c, and determines that the answer is YES in step S147.

In this case, in the subsequent step S148a (that is, a selector), the electronic control device 18 selects an ultrasonic sonar from the ultrasonic sonars 10, 11, 12, and 13 that serves as a receiving sonar receiving a spherical wave as the reflected wave.

As with the above second embodiment, the ultrasonic sonar that is affected by a plane wave the most among the ultrasonic sonars 10, 11, 12, and 13 serves as the transmitting sonar. In this case, not only the transmitting sonar but also the ultrasonic sonar closest to the transmitting sonar (that is, the ultrasonic sonar 10) among the ultrasonic sonars 11, 12, and 13 is likely to receive a plane wave as the reflected wave from the three-dimensional object 2.

In light of this, in the present embodiment, the electronic control device 18 selects the ultrasonic sonar closest to the transmitting sonar (that is, the ultrasonic sonar 10) among the ultrasonic sonars 11, 12, and 13 as a non-receiving sonar. Further, the electronic control device 18 selects the ultrasonic sonars among the ultrasonic sonars 10, 11, 12, and 13 that are not the selected non-receiving sonar or transmitting sonar as the receiving sonars.

This makes it possible to prevent an ultrasonic sonar that receives a plane wave that is the part of the ultrasonic wave transmitted from the transmitting sonar and reflected off the side face 2a of the three-dimensional object 2 from being selected as the receiving sonar. In other words, it is possible to prevent finding a corner using a receiving sonar that is susceptible to the influence of the plane wave.

For example, when the ultrasonic sonar 10 is the transmitting sonar, and the ultrasonic sonar 11 is the closest thereto among the ultrasonic sonars 10, 11, 12, and 13, the electronic control device 18 selects the ultrasonic sonar 11 as the non-receiving sonar.

Therefore, the electronic control device 18 selects the ultrasonic sonars 12 and 13 among the ultrasonic sonars 10, 11, 12, and 13 other than the ultrasonic sonars 10 and 11 as the receiving sonars (i.e., the first and second receiving sonars for detection).

Next, in step S150a (that is, a second corner calculator), the electronic control device 18 finds the corner 2e of the three-dimensional object 2 based on the positions of the transmitting sonar and the two receiving sonars.

Specifically, the electronic control device 18 obtains the two ellipses among the ellipses 20, 21, and 22 corresponding to the two receiving sonars, and obtains the intersection point of the obtained two ellipses as the corner 2e of the three-dimensional object 2.

For example, when the ultrasonic sonar 10 is the transmitting sonar and the ultrasonic sonar 11 is the non-receiving sonar, the ultrasonic sonars 12 and 13 are the receiving sonars. The electronic control device 18 obtains the two ellipses 21 and 22 among the ellipses 20, 21, and 22 corresponding to the ultrasound sonars 12 and 13 as receiving sonars, and obtains the intersection point of the obtained two ellipses 21 and 22 as the corner 2e of the three-dimensional object 2.

On the other hand, when the coordinates of the intersection points 24a, 24b, and 24c match, the electronic control device 18 determines that there is no variation in the positions of the intersection points 24a, 24b, and 24c, and determines that the answer is NO in step S147.

Then, in the subsequent step S148b, the electronic control device 18 selects the ultrasonic sonars 10, 11, 12, and 13 as the receiving sonars receiving a spherical wave as the reflected wave.

Next, in step S150b (that is, a first corner calculator), the electronic control device 18 determines that the intersection point 24a, 24b, or 24c is the corner 2e of the three-dimensional object 2.

According to the present embodiment described above, the electronic control device 18 obtains the intersection points 24a, 24b, 24c where ellipses 20, 21, and 22 intersect. When there is variation in the positions of the intersection points 24a, 24b, and 24c, the electronic control device 18 selects the ultrasonic sonar closest to the transmitting sonar among the ultrasonic sonars 10, 11, 12, and 13 as the non-receiving sonar.

The electronic control device 18 selects the ultrasonic sonars among the ultrasonic sonars 10, 11, 12, and 13 other than the selected non-receiving sonar and transmitting sonar as the two receiving sonars. The electronic control device 18 obtains the two ellipses among the ellipses 20, 21, and 22 corresponding to the two receiving sonars, and obtains the intersection point of the obtained two ellipses as the corner 2e of the three-dimensional object 2.

On the other hand, when there is no variation in the positions of the intersection points 24a, 24b, and 24c, the electronic control device 18 selects the three ultrasonic sonars among the ultrasonic sonars 10, 11, 12, and 13 that are not the transmitting sonar as the receiving sonars. The electronic control device 18 finds the intersection point of the ellipses 20, 21, and 22 as the corner 2e of the three-dimensional object 2.

The above configuration makes it possible to provide a vehicle three-dimensional object detection device 1 that detects a corner 2e of a three-dimensional object 2 even when the host vehicle mounted the vehicle three-dimensional object detection device 1 is stopped or approaches the three-dimensional object 2.

Fifth Embodiment

In the above fourth embodiment, an example is described in which, when there is variation in the positions of the intersection points 24a, 24b, and 24c, the ultrasonic sonar closest to the transmitting sonar among the ultrasonic sonars 11, 12, and 13 is selected as the non-receiving sonar.

This fifth embodiment, which instead selects the non-receiving sonar based on the reception intensity at which the reflected wave is received by each of the ultrasonic sonars 10, 11, 12, and 13, will be described with reference to FIGS. 15, 16, and 17.

Figure 15:
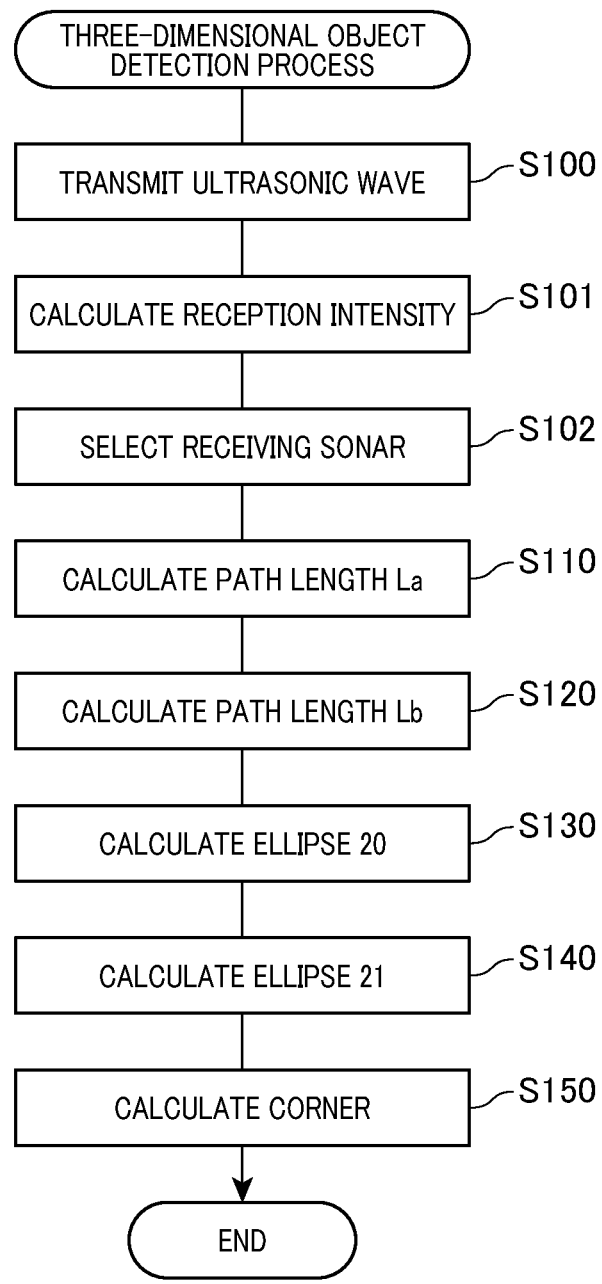
FIG. 15 is a flowchart showing in detail a three-dimensional detection process carried out in a microprocessor of an electronic control device of a vehicle three-dimensional object detection device according to a fifth embodiment.
Figure 16:
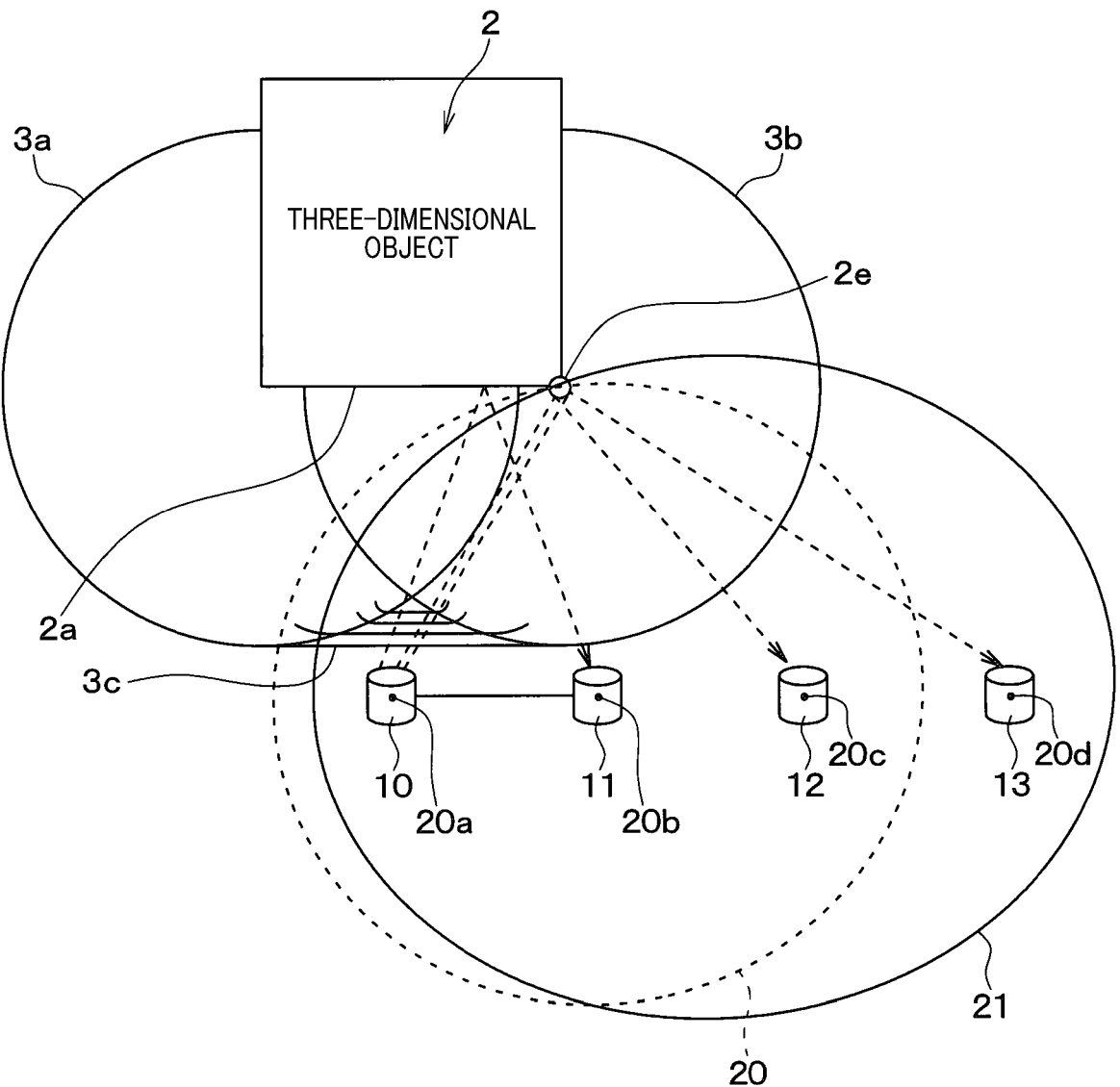
FIG. 16 is a diagram for assisting the explanation of how one receiving sonar receives a plane wave that is part of the ultrasonic wave from the transmitting sonar reflected off a three-dimensional object, and two receiving sonars receive spherical waves that are parts of the ultrasonic wave from the transmitting sonar reflected off the three-dimensional object according to the fifth embodiment.

FIG. 15 is a flowchart showing the three-dimensional object detection process carried out in the electronic control device 18 of the present embodiment. In FIG. 15, a reference sign that is also used in FIG. 2 indicates the same step, and the description thereof is omitted. The electronic control device 18 executes the three-dimensional object detection process according to the flowchart of FIG. 15.

First, in step S100, the electronic control device 18 causes the ultrasonic sonar 10 as a transmitter to transmit an ultrasonic wave toward the three-dimensional object 2. The transmitted ultrasonic wave then propagates toward the three-dimensional object 2.

This propagated ultrasonic wave is reflected off the three-dimensional object 2 and the reflected wave is propagated toward the ultrasonic sonars 10, 11, 12 and 13. The reflected wave as the plane wave, which is the part of the ultrasonic wave from the ultrasonic sonar 10 reflected off the side face 2a of the three-dimensional object 2, is received by each of the ultrasonic sonars 10, 11, 12, and 13.

On the other hand, the reflected wave as a spherical wave that is the part of the ultrasonic wave transmitted from the ultrasonic sonar 10 and reflected off the corner 2e of the three-dimensional object 2 is received by each of the ultrasonic sonars 10, 11, 12, and 13. Note that FIG. 16 shows an example in which the plane wave reflected off the side face 2a is received by the ultrasonic sonars 10 and 11, and the spherical wave reflected off the corner 2e is received by the ultrasonic sonars 12 and 13.

When an ultrasonic wave is transmitted from the ultrasonic sonar 10, the reception intensity of the plane wave received by the ultrasonic sonars 10, 11, 12, and 13 is larger than that of the spherical wave received by them.

Therefore, in the present embodiment, in step S101 (that is, a reception intensity detector), the electronic control device 18 determines the reception intensity at which the reflected wave is received by each of the ultrasonic sonars 10, 11, 12, and 13 when the ultrasonic sonar 10 transmits an ultrasonic wave. Then, the electronic control device 18 selects the receiving sonar from the ultrasonic sonars 11, 12, and 13 according to the obtained reception intensity levels.

Figure 17:
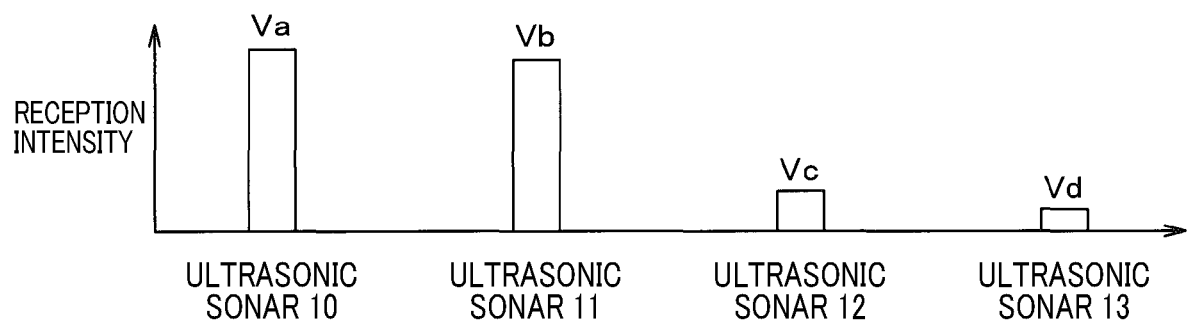
FIG. 17 is a diagram showing the reception intensity of each of the four ultrasonic sonars to assist the explanation of the three-dimensional detection process according to the fifth embodiment.

Here, as shown in FIG. 17, the reception intensity of the reflected wave received by the ultrasonic sonar 10 is referred to as the reception intensity Va, and the reception intensity of the reflected wave received by the ultrasonic sonar 11 is referred to as the reception intensity Vb. The reception intensity of the reflected wave received by the ultrasonic sonar 12 is referred to as the reception intensity Vc, and the reception intensity of the reflected wave received by the ultrasonic sonar 13 is referred to as the reception intensity Vd.

Subsequently, in step S102 (that is, the receiver determining unit), an ultrasonic sonar among the ultrasonic sonars 11, 12, and 13 that detects a reception intensity that differs from the reception intensity Va by a threshold value or more is selected as a receiving sonar by the electronic control device 18.

For example, the electronic control device 18 obtains (Va−Vb), which is a difference ΔVb between the reception intensities Va and Vb, and determines whether the obtained (Va−Vb) is equal to or greater than the threshold value.

The electronic control device 18 uses the ultrasonic sonar 11 as a receiving sonar when (Va−Vb) is equal to or greater than the threshold value, and uses the ultrasonic sonar 11 as a non-receiving sonar when (Va−Vb) is smaller than the threshold value.

For example, the electronic control device 18 determines whether (Va−Vc), which is a difference ΔVc between the reception intensities Va and Vc, is equal to or greater than the threshold value.

The electronic control device 18 uses the ultrasonic sonar 12 as a receiving sonar when (Va−Vc) is equal to or greater than the threshold value, and uses the ultrasonic sonar 12 as a non-receiving sonar when (Va−Vc) is smaller than the threshold value.

For example, the electronic control device 18 determines whether (Va−Vd), which is a difference ΔVd between the reception intensities Va and Vd, is equal to or greater than the threshold value.

The electronic control device 18 uses the ultrasonic sonar 13 as a receiving sonar when (Va−Vd) is equal to or greater than the threshold value, and uses the ultrasonic sonar 13 as a non-receiving sonar when (Va−Vd) is smaller than the threshold value.

In this way, the electronic control device 18 selects two or more receiving sonars from the ultrasonic sonars 11, 12, and 13 according to the reception intensities Va, Vb, Vc, and Vd. For convenience of explanation, the selected two or more receiving sonars are hereinafter referred to as a first receiving sonar and a second receiving sonar.

Next, in step S110, the electronic control device 18 determines the path length La, which is the length of the path along which an ultrasonic wave propagates after being transmitted from the ultrasonic sonar 10 until the reflected wave is received by the first receiving sonar.

Next, in step S120, the electronic control device 18 determines the path length Lb, which is the length of the path along which the ultrasonic propagates after being transmitted from the ultrasonic sonar 10 until the reflected wave is received by the second receiving sonar.

In the subsequent step S130, the electronic control device 18 uses the positions of the ultrasonic sonar 10 and the first receiving sonar as focal points to find the first ellipse defined by a set of points whose distances from the ultrasonic sonar 10 and the first receiving sonar add up to the path length La.

In the subsequent step S140, the electronic control device 18 uses the positions of the ultrasonic sonars 10 and the second receiving sonar as focal points to find the second ellipse defined by a set of points whose distances from the ultrasonic sonar 10 and the second receiving sonar add up to the path length Lb.

Then, in step S150, the electronic control device 18 finds the intersection point between the first and second ellipses as the corner 2e of the three-dimensional object 2.

The above configuration makes it possible to provide a vehicle three-dimensional object detection device 1 that detects a corner 2e of a three-dimensional object 2 even when the host vehicle mounted the vehicle three-dimensional object detection device 1 is stopped or approaches the three-dimensional object 2.

Sixth Embodiment

In the above-described first to fifth embodiments, examples are described in which parts of an ultrasonic wave from the ultrasonic sonar 10 that are reflected off the three-dimensional object 2 form reflected waves including a plane wave and a spherical wave.

When the cross section of the three-dimensional object 2 has a complicated shape, the reflected wave reflected off the three-dimensional object 2 may propagate in a direction other than toward the ultrasonic sonars 10, 11, 12, and 13 and may not be received by them.

When there are a plurality of three-dimensional objects 2, ultrasonic waves transmitted from the ultrasonic sonars 10, 11, 12, and 13 may be reflected off the three-dimensional objects 2 as plane waves, and the ultrasonic sonars 10, 11, 12 and 13 may receive the plane waves.

In such a case, the electronic control device 18 cannot detect the corners 2e of the three-dimensional objects 2.

Figure 18:
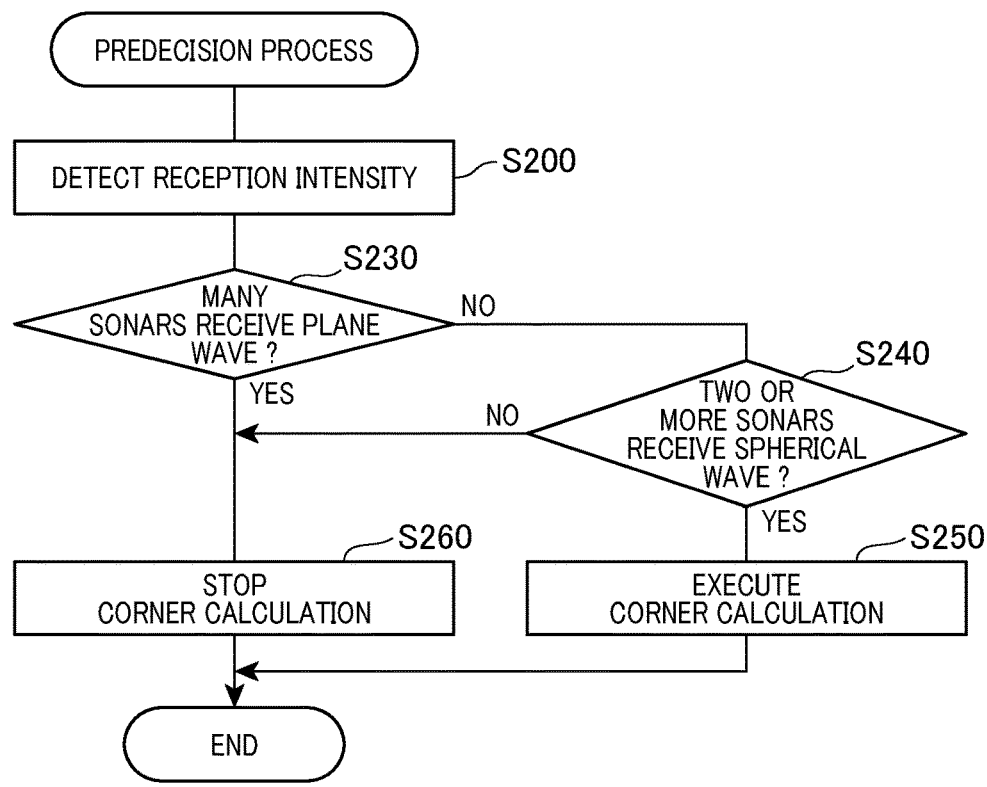
FIG. 18 is a flowchart showing in detail a preliminary process carried out in a microprocessor of an electronic control device of a vehicle three-dimensional object detection device according to a sixth embodiment.
Figure 19:
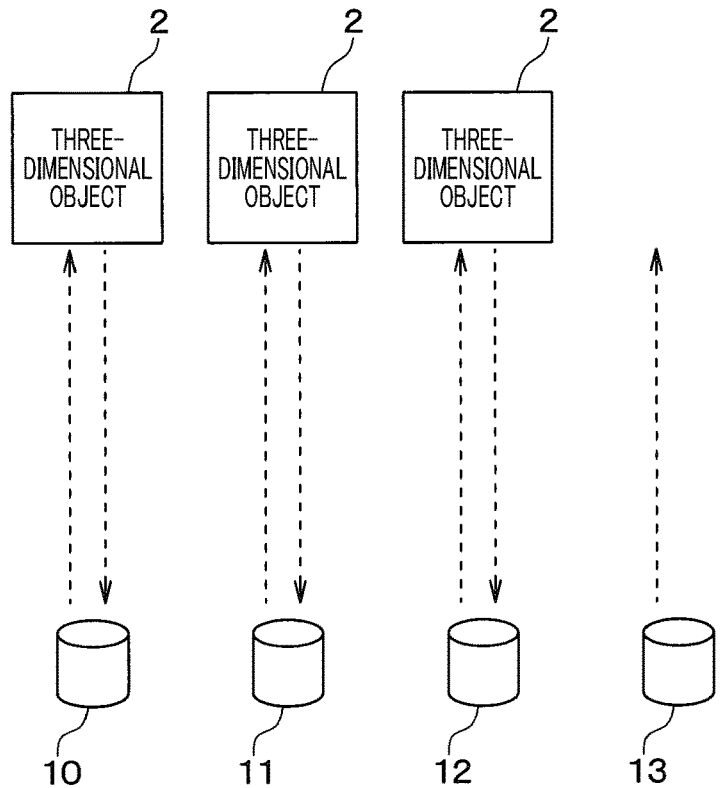
FIG. 19 is a diagram for assisting the explanation of the preliminary process in FIG. 18, and, to that end, assists the explanation of how four sonars sequentially transmit ultrasonic waves and each receive the reflected wave that is the part of the ultrasonic wave from itself reflected off the three-dimensional object.
Figure 20:
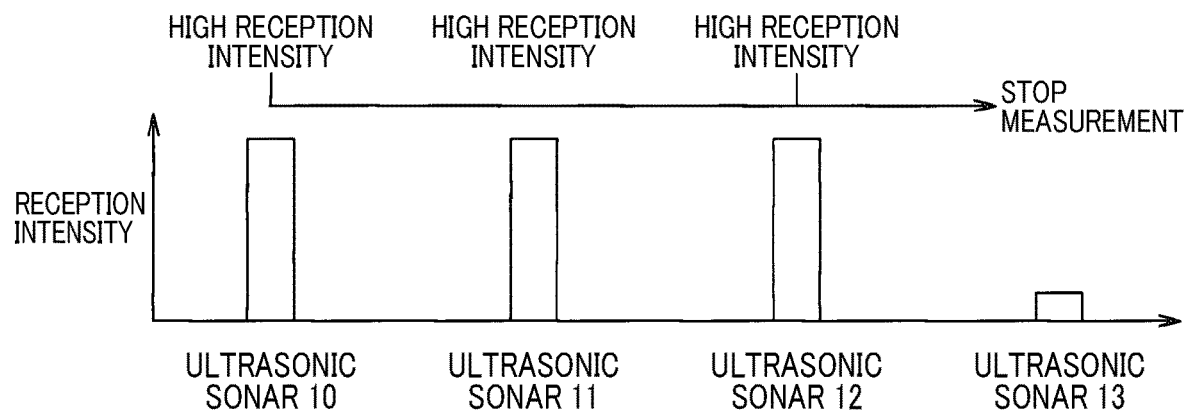
FIG. 20 is a diagram showing the reception intensities of the reflected waves received by the four ultrasonic sonars in order to assist the explanation of the preliminary process in FIG. 18.

Therefore, in a sixth embodiment, a preliminary process for determining in advance whether the three-dimensional object 2 is an object whose corner 2e should be detected will be described with reference to FIGS. 18, 19, and 20. FIG. 18 is a flowchart of showing the preliminary process in detail.

The electronic control device 18 executes the preliminary process prior to the three-dimensional object detection process. The electronic control device 18 executes the preliminary process according to the flowchart of FIG. 18.

First, in step S200, the electronic control device 18 causes the ultrasonic sonars 10, 11, 12, and 13 to sequentially transmit ultrasonic waves using time division.

At this time, the electronic control device 18 detects the reception intensity Va at which the reflected wave that is part of the ultrasonic wave from the ultrasonic sonar 10 reflected off a three-dimensional object 2 is received by the ultrasonic sonar 10. The electronic control device 18 detects the reception intensity Vb at which the reflected wave that is part of the ultrasonic wave from the ultrasonic sonar 11 reflected off a three-dimensional object 2 is received by the ultrasonic sonar 11.

The electronic control device 18 detects the reception intensity Vc at which the reflected wave that is part of the ultrasonic wave from the ultrasonic sonar 12 reflected off a three-dimensional object 2 is received by the ultrasonic sonar 12. The electronic control device 18 detects the reception intensity Vd at which the reflected wave that is part of the ultrasonic wave from the ultrasonic sonar 13 reflected off a three-dimensional object 2 is received by the ultrasonic sonar 13.

In this way, for each of the ultrasonic sonars 10, 11, 12, and 13, the electronic control device 18 detects the reception intensity when the ultrasonic sonar 10, 11, 12, or 13 receives an ultrasonic wave transmitted by itself.

Next, in step S230 (that is, a first search device decision unit), the electronic control device 18 determines whether the number of ultrasonic sonars among the ultrasonic sonars 10, 11, 12, and 13 that have a reception intensity equal to or greater than a threshold value Vx (that is, a first threshold value) is equal to or more than a predetermined number Ka.

The threshold value Vx is a reception intensity for determining whether the reflected wave received by the ultrasonic sonar 10, 11, 12, or 13 is a plane wave. The predetermined number Ka is a reference value for determining whether there is more than one ultrasonic sonar among the ultrasonic sonars 10, 11, 12, and 13 that has not received a plane wave. The predetermined number Ka is a value determined in advance according to the total number of ultrasonic sonars used, and it is no less than three. Since the total number of ultrasonic sonars is four in this embodiment, the predetermined number Ka is three.

When the number of ultrasonic sonars among the ultrasonic sonars 10, 11, 12, and 13 that have a reception intensity equal to or greater than the threshold value Vx is the predetermined number Ka or more, the electronic control device 18 determines that the answer is YES in step S230.

In other words, it is determined that there is no more than one ultrasonic sonar among the ultrasonic sonars 10, 11, 12, and 13 that has not received a plane wave. For example, as shown in FIGS. 19 and 20, when three ultrasonic sonars 10, 11, 12 among the ultrasonic sonars 10, 11, 12, 13 receive a plane wave, the ultrasonic sonar 13 is the only ultrasonic sonar that has not received a plane wave.

Therefore, even when the ultrasonic sonar 13 receives a spherical wave, the electronic control device 18 cannot find the corner 2e of the three-dimensional object 2. In this case, the electronic control device 18 stops executing the three-dimensional object detection process in step S260 (that is, a corner detection processing stopper). As a result, the electronic control device 18 stops finding the corner 2e of the three-dimensional object 2.

On the other hand, when the number of ultrasonic sonars among the ultrasonic sonars 10, 11, 12, and 13 that have a reception intensity equal to or greater than the threshold value Vx is smaller than the predetermined number Ka in step S230, the electronic control device 18 determines that the answer is NO.

In this case, it is determined that there is more than one ultrasonic sonar among the ultrasonic sonars 10, 11, 12, and 13 that has not received a plane wave.

Following this, in step S240 (that is, a second search device decision unit), the electronic control device 18 determines whether the number of ultrasonic sonars among the ultrasonic sonars 10, 11, 12, and 13 that have a reception intensity smaller than the threshold value Vx and equal to or greater than a threshold value Vy is two or more.

The threshold Vy is a second threshold value that is a reference value for receptions intensities below the threshold value Vx. The threshold value Vy is a reference value for determining whether the reflected wave received by the ultrasonic sonar 10, 11, 12, or 13 is a spherical wave.

For example, when the number of ultrasonic sonars among the ultrasonic sonars 10, 11, 12, and 13 that have a reception intensity smaller than the threshold value Vx and equal to or greater than the threshold value Vy is two or more, the electronic control device 18 determines that the answer is YES in step S230.

In other words, the electronic control device 18 determines that there is more than one ultrasonic sonar among the ultrasonic sonars 10, 11, 12, and 13 that has received a spherical wave.

In this case, the electronic control device 18 determines in step S250 that the three-dimensional object detection process can be carried out. The electronic control device 18 then carries out the three-dimensional object detection process as in the first embodiment. That is, the electronic control device 18 executes the procedures of steps S100, S110, S120, S130, S140, and S150 shown in FIG. 2. Therefore, the electronic control device 18 finds the intersection point of the ellipses 20 and 21 as the corner 2e.

On the other hand, when the number of ultrasonic sonars among the ultrasonic sonars 10, 11, 12, and 13 that have a reception intensity smaller than the threshold value Vx and equal to or greater than the threshold value Vy is less than two, the electronic control device 18 determines that the answer is NO in step S230.

In other words, the electronic control device 18 determines that there is no more than one ultrasonic sonar among the ultrasonic sonars 10, 11, 12, and 13 that has received a spherical wave.

In this case, the electronic control device 18 stops carrying out the three-dimensional object detection process in step S260. In other words, the electronic control device 18 stops finding the corner 2e of the three-dimensional object 2.

According to the present embodiment described above, the electronic control device 18 causes each of the ultrasonic sonars 10, 11, 12, and 13 to transmit an ultrasonic wave and receive the ultrasonic wave transmitted by itself, and obtains the reception intensities Va, Vb, Vc, and Vd. The electronic control device 18 determines whether a corner 2e of the three-dimensional object 2 can be found based on the reception intensities Va, Vb, Vc, and Vd.

Since the execution of the three-dimensional object detection process is prohibited when the electronic control device 18 determines that a corner 2e of the three-dimensional object 2 cannot be found, it is possible to prevent the three-dimensional object detection process from being executed unnecessarily.

Seventh Embodiment

In this seventh embodiment, a specific example is described in which the vehicle three-dimensional object detection device 1 of any one of the first to sixth embodiments is mounted on a vehicle.

In the vehicle three-dimensional object detection device 1, the ultrasonic sonars 10 to 13 are placed at different parts of the vehicle. A corner 2e can be effectively found when the ultrasonic sonars 10 to 13 are close to the three-dimensional object 2. Further, the vehicle three-dimensional object detection device 1 is particularly effective when the ultrasonic sonars 10, 11, 12, and 13 have a high detected distance accuracy.

Figure 21:
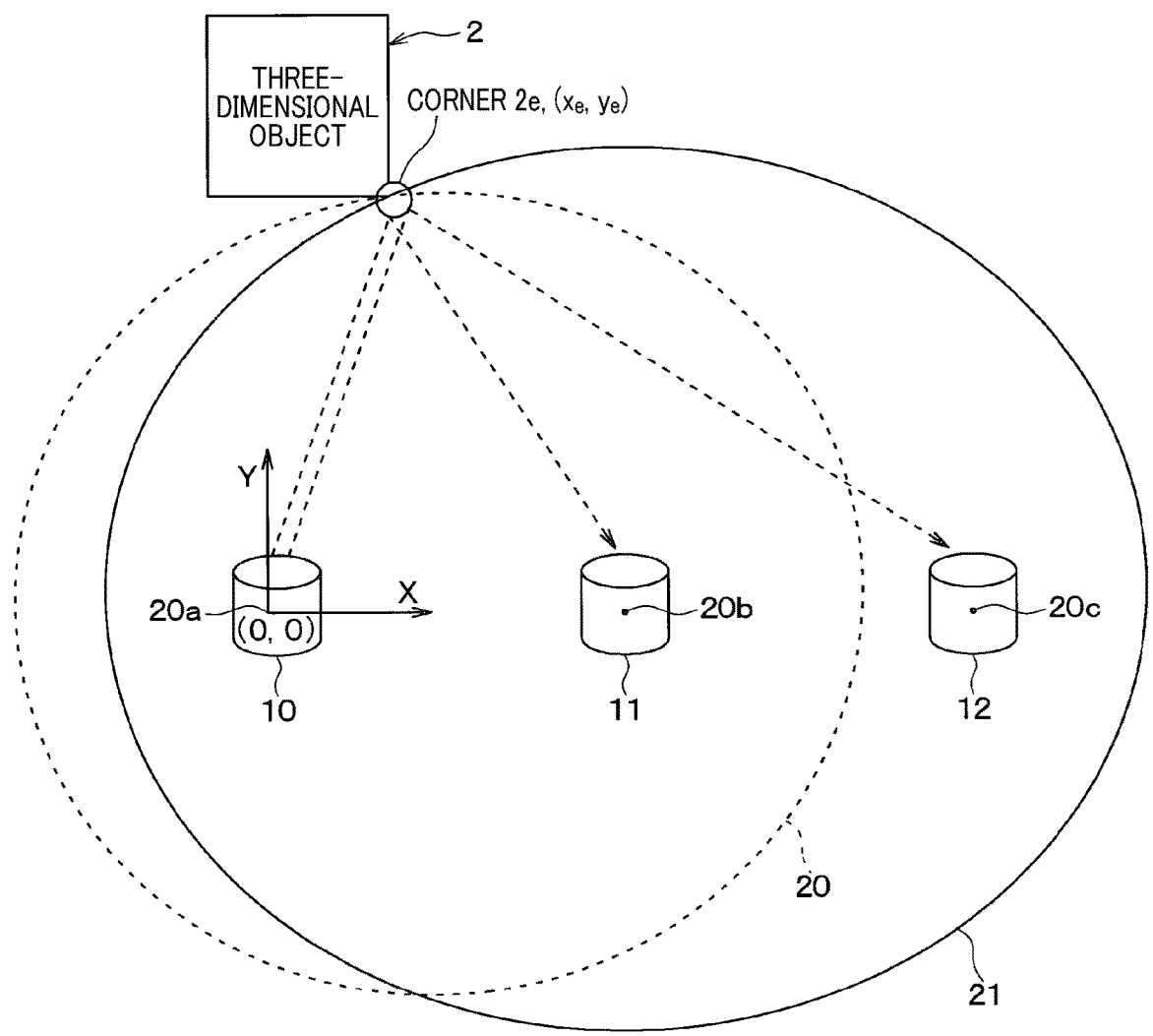
FIG. 21 is a diagram for assisting the explanation of the specific mounting conditions of four ultrasonic sonars according to the seventh embodiment, and it shows how three receiving sonars receive a spherical wave that is part of an ultrasonic wave from one transmitting sonar reflected off a corner of a three-dimensional object.

For example, for convenience of explanation, it is assumed that the ultrasonic sonar 10 is the transmitting sonar and the ultrasonic sonars 11 and 12 are the receiving sonars. As shown in FIG. 21, XY coordinates are set with the Y direction being the direction in which the ultrasonic sonar 10 and the three-dimensional object 2 are connected, and the X direction being the direction perpendicular to the Y direction and the vertical direction.

Let the origin (0, 0) be the coordinates of the position of the ultrasonic sonar 10, (R1x, 0) be the coordinates of the position of the ultrasonic sonar 11, (R2x, 0) be the coordinates of the position of the ultrasonic sonar 12, and (Xe, Ye) be the coordinates of the corner 2e of the three-dimensional object 2. Assuming that the ultrasonic sonars 10, 11, 12, and 13 have a distance measurement error of $\Delta L$, the following Eqs. 7-1, 7-2, 7-3, 7-4, 7-5, and 7-6 hold.

The measurement error $\Delta L$ is an error that is generated when the ultrasonic sonar 10 and one of the ultrasonic sonars 11, 12, and 13 are used to measure the propagation distance of an ultrasonic wave.

$$\frac{(x-R1x)^2}{a1^2} + \frac{y^2}{b1^2} = 1 \quad \text{[Eq. 7-1]}$$

$$\frac{(x-R2x)^2}{a2^2} + \frac{y^2}{b2^2} = 1 \quad \text{[Eq. 7-2]}$$

$$2a1 = \sqrt{x_e^2 + y_e^2} + \sqrt{(x_e - R1x)^2 + y_e^2} + \Delta L \quad \text{[Eq. 7-3]}$$

$$a1^2 - b1^2 = \left(\frac{R1x}{2}\right)^2 \quad \text{[Eq. 7-4]}$$

$$2a2 = \sqrt{x_e^2 + y_e^2} + \sqrt{(x_e - R2x)^2 + y_e^2} + \Delta L \quad \text{[Eq. 7-5]}$$

$$a2^2 - b2^2 = \left(\frac{R2x}{2}\right)^2 \quad \text{[Eq. 7-6]}$$

An ellipse with focal points at the positions of the ultrasonic sonars 10 and 11 is referred to as the ellipse 20. An ellipse with focal points at the positions of the ultrasonic sonars 10 and 12 is referred to as the ellipse 21. The major and minor radii of the ellipse 20 are denoted by a1 and b1, respectively. The major and minor radii of the ellipse 21 are denoted by a2 and b2, respectively.

The two ellipses 20 and 21 intersect at the corner 2e of the three-dimensional object 2. The theoretical coordinates (x, y) of the intersection of the two ellipses 20 and 21 are obtained from the pair of simultaneous equations (7-1) and (7-2).

The distance between the ultrasonic sonar 10 and the three-dimensional object 2 is referred to as a distance KQ. A combination of the positions of the ultrasonic sonars 10, 11, and 12, the distance KQ, and the measurement error ΔL is considered effective when a measurement error Ga between the theoretical coordinates (x, y) of the intersection point and the actual coordinates (xe, ye) of the corner 2e is equal to or smaller than a design tolerance.

Specifically, a case is considered where the ultrasonic sonars 10, 11, and 12 are arranged in a line at regular intervals on the vehicle.

The inventors found that a measurement error Ga of 10 cm or less can be achieved when each of the adjacent pairs formed by the ultrasonic sonars 10, 11, and 12 has an interval of 500 mm and the distance KQ is within 2 m, even when the measurement error ΔL is taken into consideration.

The measurement error ΔL is an error that is generated when two of the ultrasonic sonars 10, 11, and 12 are used to measure the distances between the object to be detected and the two ultrasonic sonars.

Specifically, the ultrasonic sonar 10 transmits an ultrasonic wave, and a reflected wave that is part of the transmitted ultrasonic wave reflected off the object to be detected is received by the ultrasonic sonar 11. At this time, the distances between the ultrasonic sonars 10 and 11 and the object to be detected are measured.

In addition, the ultrasonic sonar 10 transmits an ultrasonic wave, and a reflected wave that is part of the transmitted ultrasonic wave reflected off the object to be detected is received by the ultrasonic sonar 12. At this time, the distances between the ultrasonic sonars 10 and 12 and the object to be detected are measured.

The measurement error ΔL is the error generated when the ultrasonic sonars 10 and 11 or 10 and 12 are used in this way to measure the distances between the object to be detected and the two ultrasonic sonars.

In this embodiment, the measurement error ΔL is set at +3 cm. That is, the measurement error ΔL is set at 3 cm or less.

In other words, in order for the measurement error Ga to be equal to or smaller than the design tolerance, the interval between each of the adjacent ultrasonic sonar pairs formed by the ultrasonic sonars 10, 11, and 12 is set at 500 mm, and the measurement error ΔL of the ultrasonic sonars 10, 11, and 12 is set at 3 cm or less.

Eighth Embodiment

In the first to seventh embodiments described above, an example in which the corner 2e of the three-dimensional object 2 is calculated has been described. Alternatively, in this eighth embodiment described with reference to FIGS. 22, 23, and 24, the corner 2h of the three-dimensional object 2 is calculated.

Figure 22:
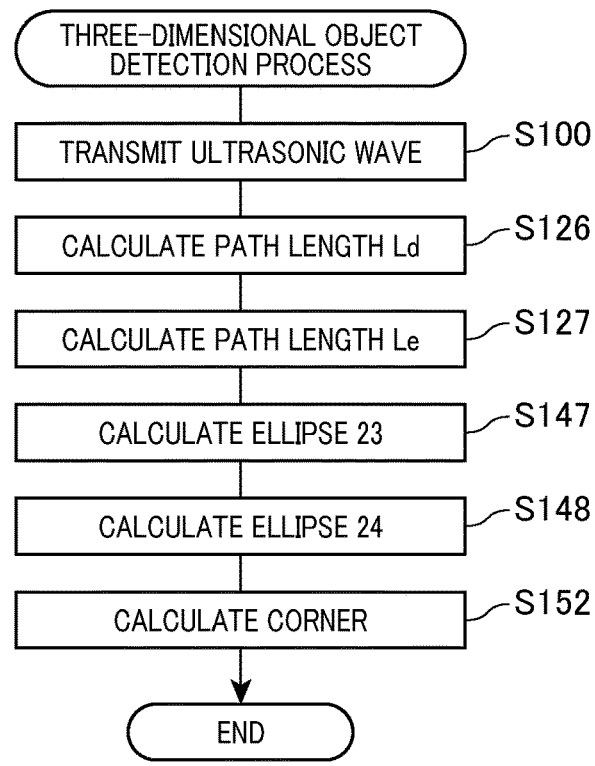
FIG. 22 is a flowchart showing in detail a three-dimensional object detection process carried out in a microprocessor of an electronic control device of a vehicle three-dimensional object detection device according to an eighth embodiment.

FIG. 22 is a flowchart showing the three-dimensional object detection process carried out in the electronic control device 18.

The electronic control device 18 executes the three-dimensional object detection process according to the flowchart of FIG. 22.

First, in step S100, the electronic control device 18 causes the ultrasonic sonar 10 as a transmitter to transmit an ultrasonic wave towards the three-dimensional object 2. The transmitted ultrasonic wave then propagates towards the three-dimensional object 2.

Figure 23:
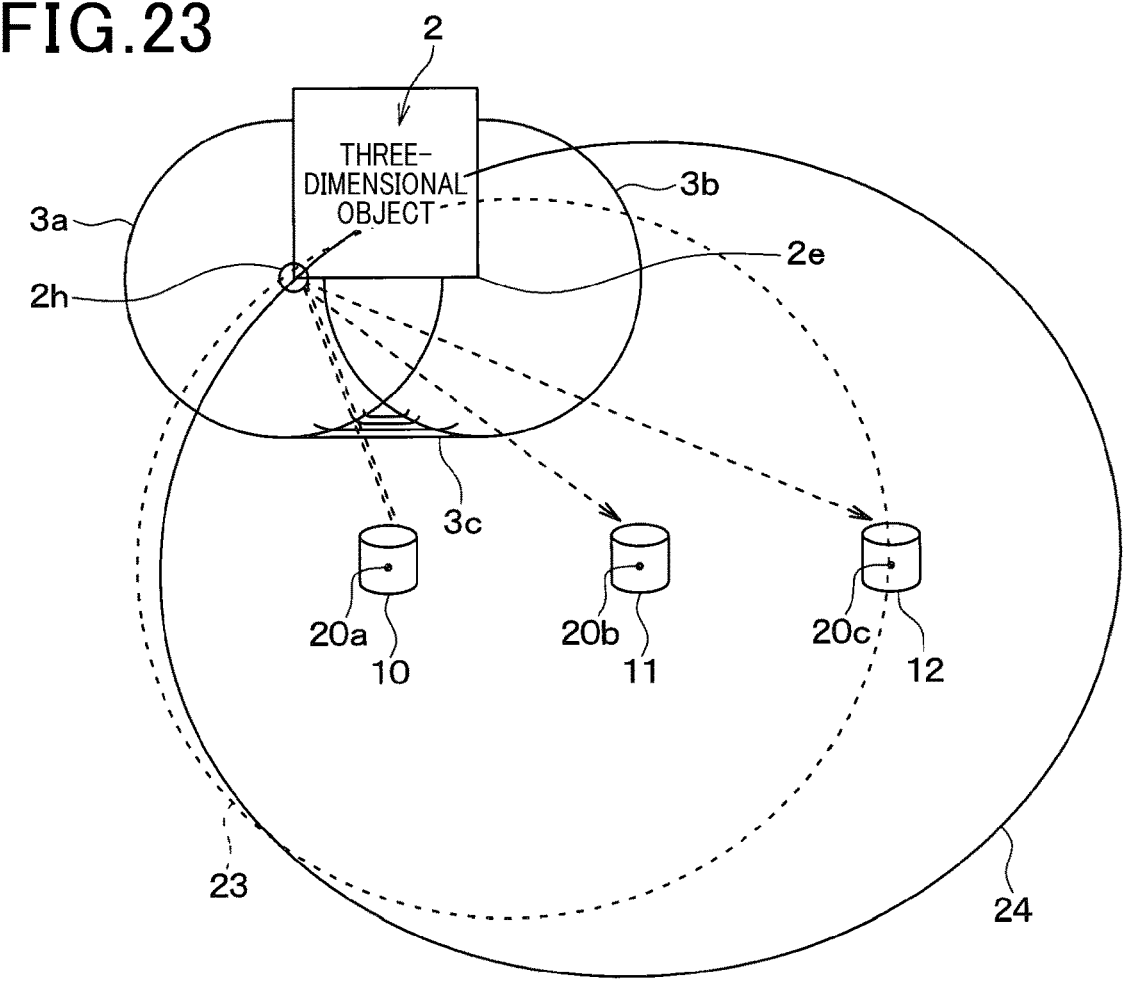
FIG. 23 is a diagram for assisting the explanation of the three-dimensional object detection process in FIG. 22, and, to that end, assists the explanation of how three receiving sonars receive a spherical wave that is part of an ultrasonic wave from one transmitting sonar reflected off the farther corner of a three-dimensional object.

As shown in FIG. 23, the part of the ultrasonic wave from the ultrasonic sonar 10 that has reached the corner 2e of the three-dimensional object 2 is reflected as a sphere wave 3b. The part of the ultrasonic wave from the ultrasonic sonar 10 that has reached the corner 2h of the three-dimensional object 2 is reflected as a spherical wave 3a.

The spherical wave 3a is an ultrasonic wave that forms a spherical wavefront whose center is at the corner 2h of the three-dimensional object 2. The spherical wave 3b is an ultrasonic wave that forms a spherical wavefront whose center is at the corner 2e of the three-dimensional object 2.

In this embodiment, the corner 2h is located farther from the ultrasonic sonars 10, 11 and 12 than the corner 2e is. Therefore, the spherical wave 3b is received by the ultrasonic sonars 11 and 12 as a first wave of the reflected wave. The spherical wave 3a is received by the ultrasonic sonars 11 and 12 as a second wave of the reflected wave.

In order to obtain the coordinates of the corner 2h of the three-dimensional object 2, the electronic control device 18 needs to accurately identify the reflected wave received by the ultrasonic sonars 11 and 12 as the spherical wave 3a.

In other words, in order to obtain the coordinates of the corner 2h of the three-dimensional object 2, the electronic control device 18 needs to find the path lengths Ld and Le of reflected wave propagated from the ultrasonic sonar 10 to the ultrasonic sonars 11 and 12 via the corner 2h.

To this end, in this embodiment, in steps S126 and S127, the electronic control device 18 determines the path lengths Ld and Le, which are the lengths of the paths along which ultrasonic waves propagate from the ultrasonic sonar 10 to the ultrasonic sonars 11 and 12 via the corner 2h.

The ultrasonic sonar 11 outputs a reception signal Rc to the electronic control device 18 when it receives the second wave of the reflected wave as the spherical wave 3a instead of the first wave of the reflected wave. When the electronic control device 18 receives the reception signal Rc, it determines that the ultrasonic sonar 11 has received the second wave of the reflected wave as the sphere wave 3a.

The ultrasonic sonar 12 outputs a reception signal Rd to the electronic control device 18 when it receives the second wave of the reflected wave as the spherical wave 3a instead of the first wave of the reflected wave. When the electronic control device 18 receives the reception signal Rd, it determines that the ultrasonic sonar 12 has received the second wave of the reflected wave as the sphere wave 3a.

Then, the electronic control device 18 determines the path length Ld (i.e., a fourth path length), which is the length of the path along which an ultrasonic wave propagates after being transmitted from the ultrasonic sonar 10 until the second wave of the reflected wave is received by the ultrasonic sonar 11 via the corner 2h of the three-dimensional object 2.

Specifically, the electronic control device 18 obtains a propagation time Td for which the ultrasonic wave propagates after being transmitted from the ultrasonic sonar 10 until the second wave of the reflected wave is received by the ultrasonic sonar 11. Then, the electronic control device 18 obtains the path length Ld by multiplying the propagation time Td by the speed of sound Sc as shown in Eq. 8-1 below.

$$Ld = Td \times Sc \qquad \text{Eq. 8-1}$$

After that, the electronic control device 18 determines the path length Le (i.e., a fourth path length), which is the length of the path along which an ultrasonic wave propagates after being transmitted from the ultrasonic sonar 10 until the second wave of the reflected wave is received by the ultrasonic sonar 12 via the corner 2h of the three-dimensional object 2.

Specifically, the electronic control device 18 obtains a propagation time Te for which the ultrasonic wave propagates after being transmitted from the ultrasonic sonar 10 until the second wave of the reflected wave is received by the ultrasonic sonar 12. Then, the electronic control device 18 obtains the path length Le by multiplying the propagation time Te by the speed of sound Sc as shown in Eq. 8-2 below.

$$Le = Te \times Sc \qquad \text{Eq. 8-2}$$

In the subsequent step S147, the electronic control device 18 uses the positions of the ultrasonic sonars 10 and 11 as focal points 20a and 20b to find an ellipse 23 defined by a set of points whose distances from the ultrasonic sonars 10 and 11 add up to the path length Ld.

In the subsequent step S148, the electronic control device 18 uses the positions of the ultrasonic sonars 10 and 12 as focal points 20a and 20c to find an ellipse 24 defined by a set of points whose distances from the ultrasonic sonars 10 and 12 add up to the path length Le.

In step S152, as shown in FIG. 23, the electronic control device 18 finds the intersection point between the ellipses 23 and 24 as the corner 2h of the three-dimensional object 2.

That is, the electronic control device 18 can find the corner 2h that is the one of the corners 2h and 2e of the three-dimensional object 2 farther from the ultrasonic sonars 11 and 12.

Figure 24:
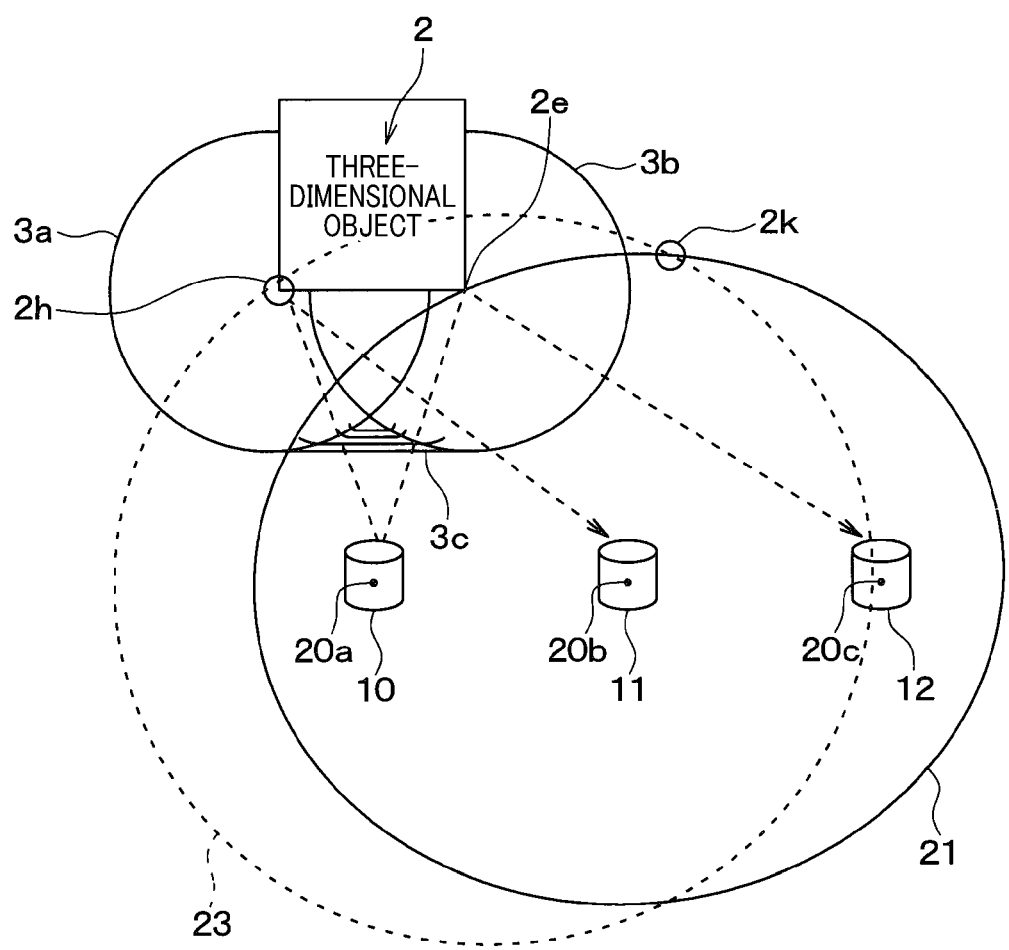
FIG. 24 is a diagram for assisting the explanation of the three-dimensional object detection processing in FIG. 22, and, to that end, assists the explanation of how one receiving sonar receives a spherical wave reflected off the farther corner of a three-dimensional object, and the other receiving sonar receives a spherical wave reflected off the closer corner.

A case is considered where the electronic control device 18 obtains the path length Lb an ultrasonic wave travels after being transmitted from the ultrasonic sonar 10 until the first wave of the reflected wave is received by the ultrasonic sonar 12, and obtains the ellipse 21 based on the path length Lb. As shown in FIG. 24, even if the electronic control device 18 finds an intersection point 2k between the ellipses 23 and 21, the intersection point 2k does not match the corner 2h.

Therefore, the corner 2h of the three-dimensional object 2 cannot be calculated. This makes it important to determine whether the ultrasonic sonar 11 has received the spherical wave 3a or the spherical wave 3b.

In this regard, when the ultrasonic sonars 11 and 12 receive the second wave of the reflected wave, the electronic control device 18 determines that the ultrasonic sonars 11 and 12 have received the spherical wave 3a from the corner 2h of the three-dimensional object 2. This makes it possible to accurately determine that the ultrasonic sonars 11 and 12 have received the spherical wave 3a from the corner 2h of the three-dimensional object 2.

When there are two intersection points between the ellipses 23 and 24, the intersection point located on the three-dimensional object 2 side with respect to the ultrasonic sonar 10 is determined to be the corner 2h.

According to the present embodiment described above, the electronic control device 18 determines the path length Ld, which is the length of the path along which a search wave propagates after being transmitted from the ultrasonic sonar 10 until the second wave of the reflected wave is received by the ultrasonic sonar 11.

The electronic control device 18 determines the path length Le, which is the length of the path along which a search wave propagates after being transmitted from the ultrasonic sonar 10 until the second wave of the reflected wave is received by the ultrasonic sonar 12.

The electronic control device 18 uses the positions of the ultrasonic sonars 10 and 11 as the focal points 20a and 20b to find the ellipse 23 defined by a set of points whose distances from the ultrasonic sonars 10 and 11 add up to the path length Ld.

The electronic control device 18 uses the positions of the ultrasonic sonars 10 and 12 as the focal points 20a and 20c to find the ellipse 24 defined by a set of points whose distances from the ultrasonic sonars 10 and 12 add up to the path length Le. The electronic control device 18 finds the intersection point of the ellipses 23 and 24 as the corner 2h.

The above configuration makes it possible to provide a vehicle three-dimensional object detection device 1 that detects a corner 2h of a three-dimensional object 2 even when the host vehicle mounted the vehicle three-dimensional object detection device 1 is stopped or approaches the three-dimensional object 2.

Ninth Embodiment

In this ninth embodiment, an example in which the corners 2e and 2h are found by combining the first and eighth embodiments will be described with reference to FIGS. 25 and 26.

Figure 25:
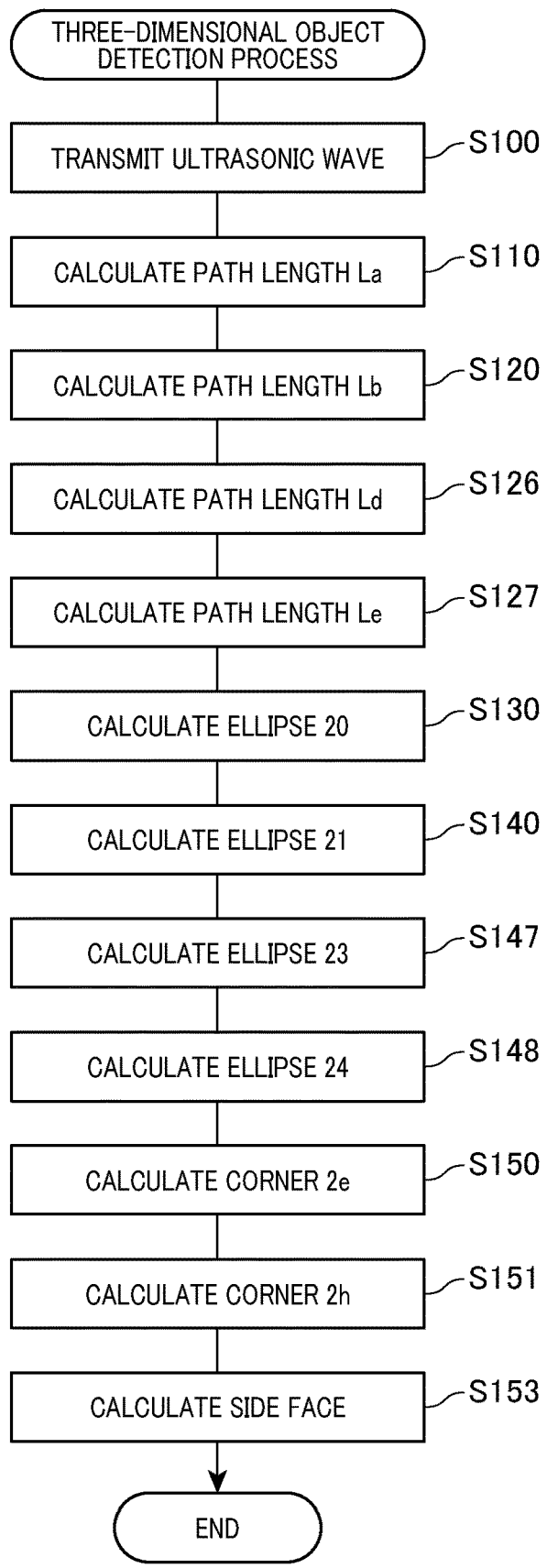
FIG. 25 is a flowchart showing in detail a three-dimensional object detection process carried out in a microprocessor of an electronic control device of a vehicle three-dimensional object detection device according to a ninth embodiment.

FIG. 25 is a flowchart showing the three-dimensional object detection process carried out in the electronic control device 18. The flowchart in FIG. 25 is a combination of the flowcharts shown in FIGS. 2 and 22. In FIG. 25, a reference sign that is also used in FIGS. 2 and/or 22 indicates the same step, and the description thereof is omitted.

The electronic control device 18 executes the three-dimensional object detection process according to the flowchart of FIG. 25.

First, in step S100, the electronic control device 18 causes the ultrasonic sonar 10 to transmit an ultrasonic wave toward the three-dimensional object 2. The transmitted ultrasonic wave then propagates toward the three-dimensional object 2.

Figure 26:
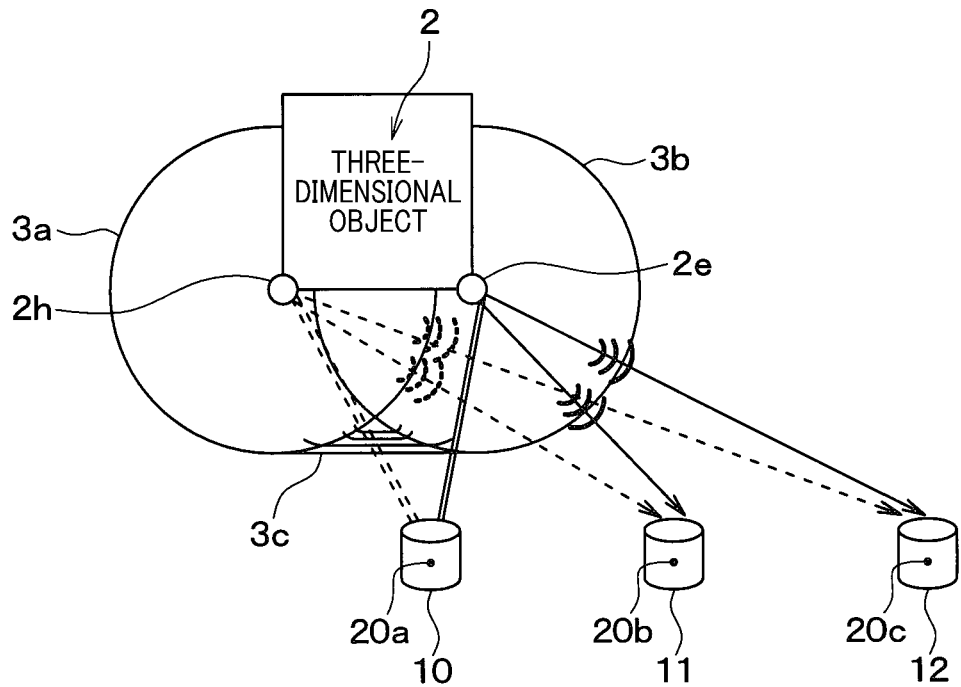
FIG. 26 is a diagram for assisting the explanation of the three-dimensional object detection process in FIG. 25, and, to that, assists the explanation of how two receiving sonars receive first and second waves of the reflected wave that is part of an ultrasonic wave from the transmitting sonar reflected off one of the corners of a three-dimensional object.

As shown in FIG. 26, the part of the ultrasonic wave from the ultrasonic sonar 10 that has reached the corner 2e of the three-dimensional object 2 is reflected as a sphere wave 3b. The part of the ultrasonic wave from the ultrasonic sonar 10 that has reached the corner 2h of the three-dimensional object 2 is reflected as a spherical wave 3a.

In this embodiment, the spherical wave 3b is received by the ultrasonic sonars 11 and 12 as the first wave of the reflected wave. The spherical wave 3a is received by the ultrasonic sonars 11 and 12 as the second wave of the reflected wave.

Then, in step S110, the electronic control device 18 determines the path length La, which is the length of the path along which an ultrasonic wave propagates after being transmitted from the ultrasonic sonar 10 until the first wave of the reflected wave is received by the ultrasonic sonar 11 via the corner 2e of the three-dimensional object 2.

In step S120, the electronic control device 18 determines the path length Lb, which is the length of the path along which an ultrasonic wave propagates after being transmitted from the ultrasonic sonar 10 until the first wave of the reflected wave is received by the ultrasonic sonar 12 via the corner 2e of the three-dimensional object 2.

Then, in step S126, the electronic control device 18 determines the path length Ld, which is the length of the path along which an ultrasonic wave propagates after being transmitted from the ultrasonic sonar 10 until the second wave of the reflected wave is received by the ultrasonic sonar 11 via the corner 2h of the three-dimensional object 2.

In step S127, the electronic control device 18 determines the path length Le, which is the length of the path along which an ultrasonic wave propagates after being transmitted from the ultrasonic sonar 10 until the second wave of the reflected wave is received by the ultrasonic sonar 12 via the corner 2h of the three-dimensional object 2.

Step S126 in FIG. 25 corresponds to the first path-length calculator, and step S127 in FIG. 25 corresponds to the second path-length calculator. Step S110 in FIG. 25 corresponds to a third path-length calculator, and step S120 in FIG. 25 corresponds to a fourth path-length calculator.

In the subsequent step S130, the electronic control device 18 uses the positions of the ultrasonic sonars 10 and 11 as focal points 20a and 20b to find an ellipse 20 defined by a set of points whose distances from the ultrasonic sonars 10 and 11 add up to the path length La.

In the subsequent step S140, the electronic control device 18 uses the positions of the ultrasonic sonars 10 and 12 as focal points 20a and 20c to find an ellipse 21 defined by a set of points whose distances from the ultrasonic sonars 10 and 12 add up to the path length Lb. Step S140 in FIG. 25 corresponds to a fourth ellipse calculator.

In the subsequent step S147, the electronic control device 18 uses the positions of the ultrasonic sonars 10 and 11 as focal points 20a and 20b to find an ellipse 23 defined by a set of points whose distances from the ultrasonic sonars 10 and 11 add up to the path length Ld.

In the subsequent step S148, the electronic control device 18 uses the positions of the ultrasonic sonars 10 and 12 as focal points 20a and 20c to find an ellipse 24 defined by a set of points whose distances from the ultrasonic sonars 10 and 12 add up to the path length Le.

In step S150, the electronic control device 18 finds the intersection point between the ellipses 20 and 21 as the corner 2e of the three-dimensional object 2.

That is, the electronic control device 18 can find the corner 2e that is the one of the corners 2e and 2h of the three-dimensional object 2 closer to the ultrasonic sonars 11 and 12.

In step S151, the electronic control device 18 finds the intersection point between the ellipses 23 and 24 as the corner 2h of the three-dimensional object 2.

That is, the electronic control device 18 can find the corner 2h that is the one of the corners 2e and 2h of the three-dimensional object 2 farther from the ultrasonic sonars 11 and 12.

Next, in step S153 (that is, a face calculator), as shown in FIG. 26, the electronic control device 18 finds the side face 2a connecting the corners 2e and 2h of the three-dimensional object 2.

That is, the electronic control device 18 can find the side face 2a connecting the closer corner 2e and the farther corner 2h.

According to the present embodiment described above, the electronic control device 18 uses the positions of the ultrasonic sonars 10 and 11 as focal points 20a and 20b to find an ellipse 20 defined by a set of points whose distances from the ultrasonic sonars 10 and 11 add up to the path length La.

The electronic control device 18 uses the positions of the ultrasonic sonars 10 and 12 as focal points 20a and 20c to find an ellipse 21 defined by a set of points whose distances from the ultrasonic sonars 10 and 12 add up to the path length Lb.

The electronic control device 18 uses the positions of the ultrasonic sonars 10 and 11 as focal points 20a and 20b to find an ellipse 22 defined by a set of points whose distances from the ultrasonic sonars 10 and 11 add up to the path length Lc.

The electronic control device 18 uses the positions of the ultrasonic sonars 10 and 12 as focal points 20a and 20c to find an ellipse 23 defined by a set of points whose distances from the ultrasonic sonars 10 and 12 add up to the path length Ld.

The electronic control device 18 finds the intersection point of the ellipses 20 and 21 as the corner 2e of the three-dimensional object 2. The electronic control device 18 finds the intersection point of the ellipses 23 and 24 as the corner 2h of the three-dimensional object 2. The electronic control device 18 finds the side face 2a connecting the corners 2e and 2h of the three-dimensional object 2.

The side face 2a of the three-dimensional object 2 can thus be found using the spherical waves 3a and 3b received by the ultrasonic sonars 11 and 12.

Tenth Embodiment

In the above first embodiment, an example is described in which three or more ultrasonic sonars are used to find the corner 2e (or corner 2h) of the three-dimensional object 2.

Instead of this, the tenth embodiment, which will be described with reference to FIG. 27, finds the corner 2e (or corner 2h) of the three-dimensional object 2 using two ultrasonic sonars.

In the vehicle three-dimensional object detection device 1 of the present embodiment, one of the two ultrasonic sonars is a transceiver forming a receiving sonar and a transmitting sonar, and the other ultrasonic sonar forms a receiving sonar.

When an ultrasonic sonar as a receiving sonar is located at a position at which the distance from the corner 2e of the three-dimensional object 2 is the same as the distance from the corner 2h of the three-dimensional object 2, the receiving sonar cannot distinguish a reflected wave from the corner 2e of the three-dimensional object 2 from a reflective wave from the corner 2h of the three-dimensional object 2.

Figure 27:
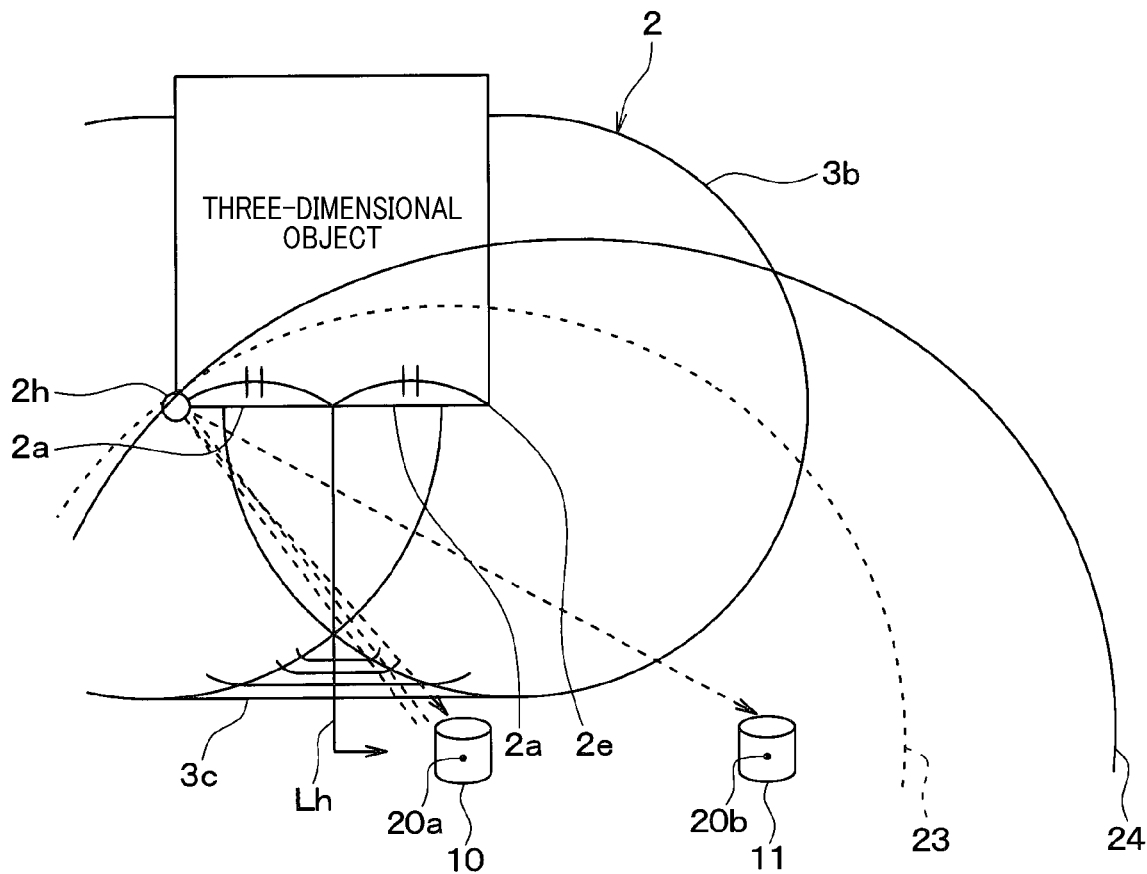
FIG. 27 is a diagram for assisting the explanation of how one sonar may combine a transmitting sonar and a receiving sonar in the vehicle three-dimensional object detection device according to a 10th embodiment when the transmitting sonar is offset from the bisector of a side face of a three-dimensional object.

As shown in FIG. 27, the two ultrasonic sonars as receiving sonars need to be offset from a bisector Lh that bisects the line segment connecting the corners 2e and 2h of the three-dimensional object 2.

In the following, assuming that the ultrasonic sonar 10 is the transceiver forming a receiving sonar and the transmitting sonar, and the ultrasonic sonar 11 forms the receiving sonar, a first specific example in which the corner 2e of the three-dimensional object 2 is found and a second specific example in which the corner 2h of the three-dimensional object 2 is found will be described with reference to FIGS. 2, 22, and 27.

In this embodiment, the one of the corners 2e and 2h of the three-dimensional object 2 closer to the ultrasonic sonars 10 and 11 is referred to as the corner 2e. The one of the corners 2e and 2h of the three-dimensional object 2 farther from the ultrasonic sonars 10 and 11 is referred to as the corner 2h.

First Specific Example

The electronic control device 18 executes the three-dimensional object detection process according to the flow-chart of FIG. 2.

First, in step S100, the electronic control device 18 causes the ultrasonic sonar 10 as a transmitter to transmit an ultrasonic wave toward the three-dimensional object 2. The transmitted ultrasonic wave then propagates toward the three-dimensional object 2. The part of the ultrasonic wave from the ultrasonic sonar 10 that has reached the corner 2e of the three-dimensional object 2 is reflected as a spherical wave 3a.

The ultrasonic sonar 10 outputs a reception signal Ra to the electronic control device 18 when it receives the spherical wave 3b as the first wave of the reflected wave. The ultrasonic sonar 11 outputs a reception signal Rb to the electronic control device 18 when it receives the spherical wave 3b as the first wave of the reflected wave.

Then, in step S110, the electronic control device 18 determines the path length La, which is the length of the path along which an ultrasonic wave propagates after being transmitted from the ultrasonic sonar 10 until the first wave of the reflected wave is received by the ultrasonic sonar 10.

In step S120, the electronic control device 18 determines the path length Lb, which is the length of the path along which an ultrasonic wave propagates after being transmitted from the ultrasonic sonar 10 until the first wave of the reflected wave is received by the ultrasonic sonar 11.

In the subsequent step S130, the electronic control device 18 finds a circle 20 centered at the position of the ultrasonic sonar 10 and having a diameter equal to the path length La.

In the subsequent step S140, the electronic control device 18 uses the positions of the ultrasonic sonars 10 and 11 as focal points 20a and 20b to find an ellipse 21 defined by a set of points whose distances from the ultrasonic sonars 10 and 11 add up to the path length Lb.

In step S150, the electronic control device 18 finds the intersection point between the circle 20 and the ellipse 21 as the corner 2e of the three-dimensional object 2.

Second Specific Example

The electronic control device 18 executes the three-dimensional object detection process according to the flow-chart of FIG. 22.

First, in step S100, the electronic control device 18 causes the ultrasonic sonar 10 as a transmitter to transmit an ultrasonic wave toward the three-dimensional object 2. The transmitted ultrasonic wave then propagates toward the three-dimensional object 2.

This propagated ultrasonic wave is reflected off the corner 2h of the three-dimensional object 2, and the reflected wave is received by the ultrasonic sonars 10 and 11. After that, the ultrasonic sonar 11 outputs a reception signal Rc to the electronic control device 18 when it receives the spherical wave 3a as the second wave of the reflected wave instead of the first wave of the reflected wave. When the ultrasonic sonar 11 receives the reception signal Rc, the electronic control device 18 determines that the ultrasonic sonar 11 has received the second wave of the reflected wave as the sphere wave 3a.

The ultrasonic sonar 11 outputs a reception signal Rd to the electronic control device 18 when it receives the spherical wave 3a as the second wave of the reflected wave instead of the first wave of the reflected wave. When the electronic control device 18 receives the reception signal Rd, it determines that the ultrasonic sonar 11 has received the second wave of the reflected wave as the sphere wave 3a.

Then, the electronic control device 18 determines the path length Ld, which is the length of the path along which an ultrasonic wave propagates after being transmitted from the ultrasonic sonar 10 until the second wave of the reflected wave is received by the ultrasonic sonar 10.

The electronic control device 18 determines the path length Le, which is the length of the path along which an ultrasonic wave propagates after being transmitted from the ultrasonic sonar 10 until the second wave of the reflected wave is received by the ultrasonic sonar 11.

In the subsequent step S147, the electronic control device 18 finds a circle 23 centered at the position of the ultrasonic sonar 10 and having a diameter equal to the path length Ld.

In the subsequent step S148, the electronic control device 18 uses the positions of the ultrasonic sonars 10 and 11 as focal points 20a and 20b to find an ellipse 24 defined by a set of points whose distances from the ultrasonic sonars 10 and 11 add up to the path length Le.

In step S152, the electronic control device 18 finds the intersection point between the circle 23 and the ellipse 24 as the corner 2h of the three-dimensional object 2.

According to the present embodiment described above, in the vehicle three-dimensional object detection device 1, each of the ultrasonic sonars 10 and 11 is positioned so that the distances from the corner 2e of the three-dimensional object 2 and the corner 2h of the three-dimensional object 2 are different.

The ultrasonic sonar 10 forms a receiving sonar and a transmitting sonar, and the ultrasonic sonar 11 forms a receiving sonar. In this case, the ultrasonic sonars 10 and 11 can find the corners 2e and 2h of the three-dimensional object 2.

Eleventh Embodiment

In the eleventh embodiment, a specific example of the ultrasonic wave transmitted from ultrasonic sonar 10 as the transmitting sonar of any one of the first to tenth embodiments will be described with reference to FIGS. 28 and 29.

Figure 28:
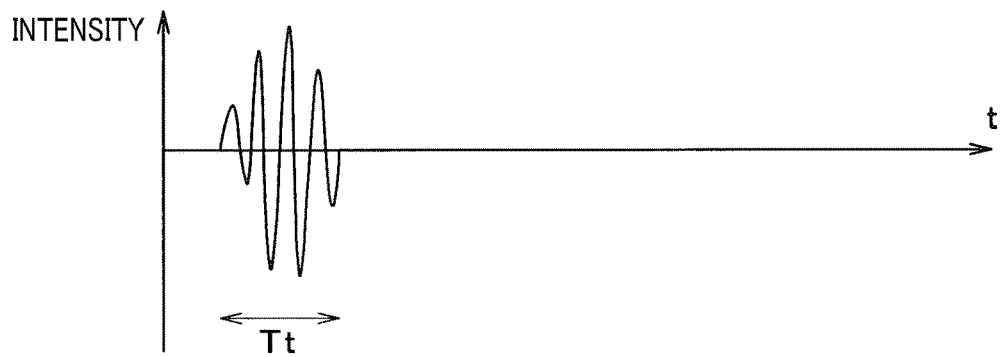
FIG. 28 is a diagram showing, as an ultrasonic wave transmitted from one ultrasonic sonar as a transmitting sonar in a vehicle three-dimensional object detection device according to an 11th embodiment, a waveform whose intensity changes continuously during a predetermined period.

As shown in FIG. 28, the ultrasonic wave transmitted from the ultrasonic sonar 10 may be an ultrasonic wave whose intensity changes continuously over a transmission period Tt.

Figure 29:
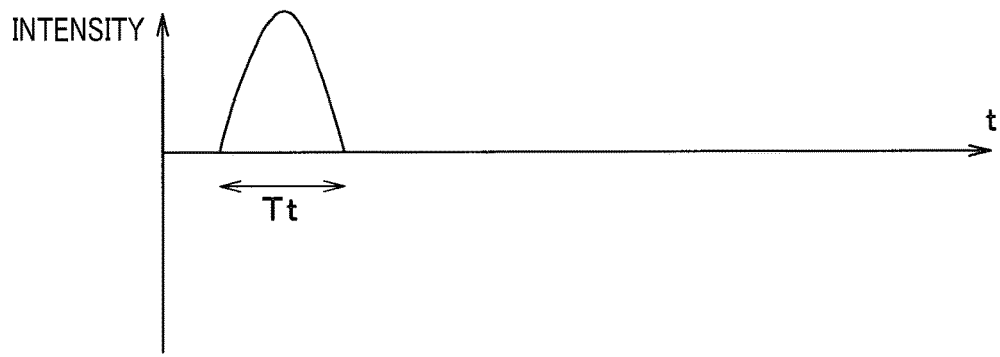
FIG. 29 is a diagram showing a pulsed waveform as an ultrasonic wave transmitted from one ultrasonic sonar as a transmitting sonar in a modification of the vehicle three-dimensional object detection device according to the 11th embodiment.

Alternatively, as shown in FIG. 29, the ultrasonic wave transmitted from the ultrasonic sonar 10 may be an ultrasonic wave whose intensity changes pulse-wise with time. More specifically, the ultrasonic wave transmitted from the ultrasonic sonar 10 may be an ultrasonic wave having an impulse shape. An impulse shape is a waveform showing an ultrasonic wave having an extremely short transmission period Tt.

Twelfth Embodiment

Figure 30:
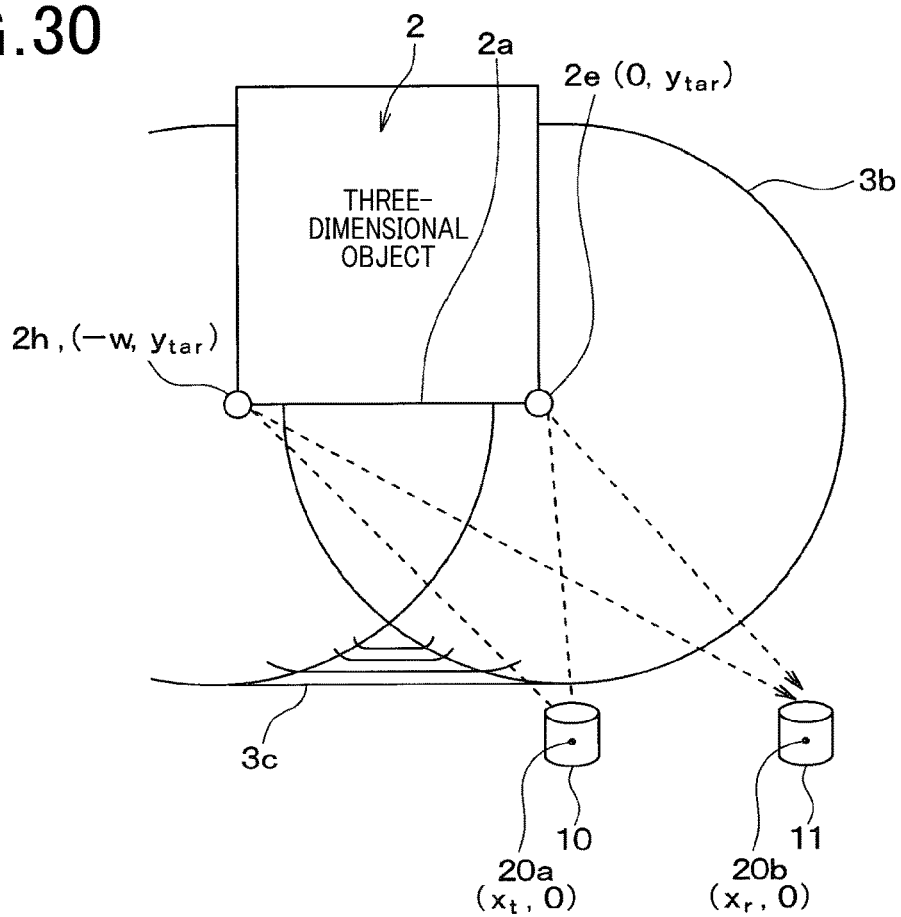
FIG. 30 is a diagram for assisting the explanation of the conditions for receiving, with one receiving sonar and using time division, first and second waves of the reflected wave that are parts of an ultrasonic wave from a transmitting sonar reflected off one of the corners of a three-dimensional object in a vehicle three-dimensional object detection device according to a 12th embodiment.
Figure 31:
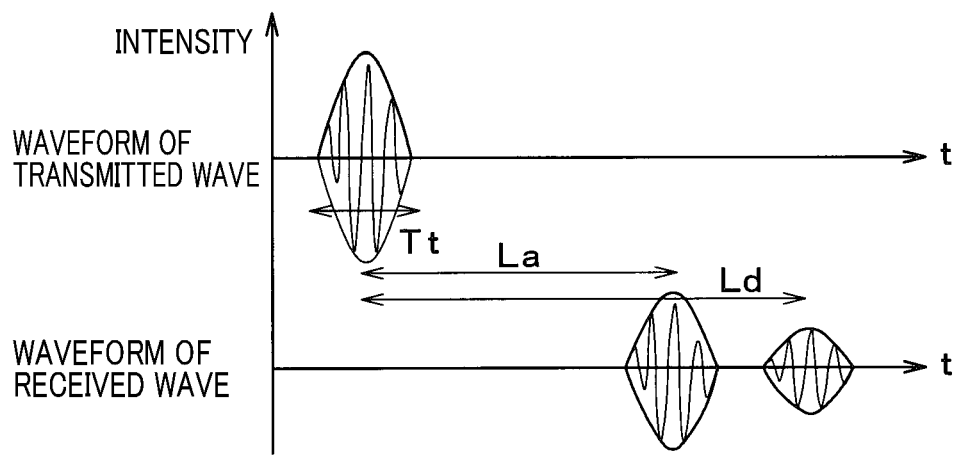
FIG. 31 is a diagram for assisting the explanation of the first and second waves of the reflected wave that is the part of the ultrasonic wave from the transmitting sonar reflected off a corner of the three-dimensional object in the vehicle three-dimensional object detection device according to the 12th embodiment.

In the twelfth embodiment, a specific example of the transmission period Tt for which the ultrasonic wave is continuously transmitted from the transmitting sonar of any one of the eighth to eleventh embodiments will be described with reference to FIGS. 30 and 31.

For convenience of explanation, it is assumed that the ultrasonic sonar 10 is the transmitting sonar and the ultrasonic sonars 11 and 12 are the receiving sonars.

First, when the ultrasonic wave transmitted from the ultrasonic sonar 10 is propagated to the corners 2e and 2h of the three-dimensional object 2, the reflected waves that are the parts of the ultrasonic wave reflected off the corners 2e and 2h of the three-dimensional object 2 are received by the ultrasonic sonars 11 and 12 as sphere waves 3a and 3b.

The path length La, which is the length of the path along which an ultrasonic wave propagates after being transmitted from the ultrasonic sonar 10 until it is received by the ultrasonic sonar 11 via the corner 2e of the three-dimensional object 2, is represented by the following Eq. 12-1.

$$La = \sqrt{xt^2 + y_{tar}^2} + \sqrt{xr^2 + y_{tar}^2}$$ [Eq. 12-1]

The path length Ld, which is the length of the path along which an ultrasonic wave propagates after being transmitted from the ultrasonic sonar 10 until it is received by the ultrasonic sonar 11 via the corner 2h of the three-dimensional object 2, is represented by the following Eq. 12-2.

$$Ld = \sqrt{(x_t+w)^2 + y_{tar}^2} + \sqrt{(x_r+w)^2 + y_{tar}^2}$$ [Eq. 12-2]

Let (0, ytar) be the XY coordinates of the position of the corner 2e of the three-dimensional object 2, and (−W, ytar) be the XY coordinates of the position of the corner 2h of the three-dimensional object 2. Let (Xt, 0) be the XY coordinates of the position of the ultrasonic sonar 10, and (Xr, 0) be the XY coordinates of the position of the ultrasonic sonar 11. Let Sc be the speed of the ultrasonic wave.

In order to obtain the path lengths La and Ld, the electronic control device 18 needs to identify if the reflected wave received by the ultrasonic sonar 11 is the spherical wave 3a or the spherical wave 3b.

To achieve this, the spherical waves 3a and 3b need to be received by the ultrasonic sonar 11 at different time points. That is, the spherical waves 3a and 3b need to be received independently by the ultrasonic sonar 11.

Therefore, as shown in the following Eq. 12-3, the difference obtained by subtracting the path length La from the path length Ld (that is, Ld−La) must be larger than Sc×Tt. That is, in order for the spherical waves 3a and 3b to be received separately by the ultrasonic sonar 11, Ld−La>Sc×Tt must hold.

$$Ld - La \geq Sc \times Tt$$ [Eq. 12-3]

In other words, the transmission period Tt is set so that the spherical waves 3a and 3b are received separately by the ultrasonic sonar 11.

Similarly, in order for the electronic control device 18 to find the path lengths Lb and Le, the spherical waves 3a and 3b need to be received by the ultrasonic sonar 12 at different timings. That is, the spherical waves 3a and 3b need to be received independently by the ultrasonic sonar 12.

Therefore, the difference obtained by subtracting the path length Lb from the path length Le (that is, Le−Lb) must be larger than Sc×Tt. That is, in order for the spherical waves 3a and 3b to be received separately by the ultrasonic sonar 12, Le−Lb>Sc×Tt must hold.

In other words, the transmission period Tt is set so that the spherical waves 3a and 3b are received separately by the ultrasonic sonar 12.

As described above, in this embodiment, in order for the electronic control device 18 to find the path lengths La, Lb, Ld, and Le, the transmission period Tt is set so that the spherical waves 3a and 3b are separately received by the ultrasonic sonars 11 and 12.

In this case, the transmission period Tt is set so that the value obtained by multiplying the transmission period Tt by the speed of sound Sc (that is, Tt×Sc) is sufficiently smaller than the width dimension of the side face 2a of the three-dimensional object 2 and the path lengths La, Lb, Ld, and Le.

Thirteenth Embodiment

In the thirteenth embodiment, a specific example in which whether the ultrasonic sonars 11 and 12 have received the second wave of the reflected wave (that is, the spherical wave 3a) is determined in the eleventh or twelfth embodiment will be described with reference to FIGS. 32 and 33.

Figure 32:
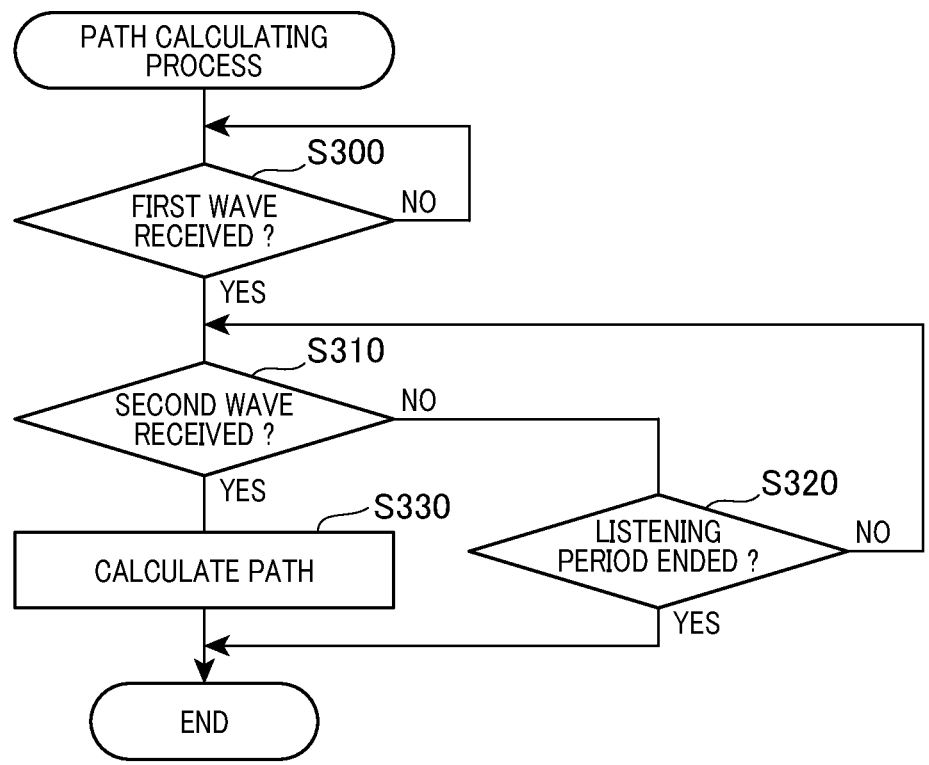
FIG. 32 is a flowchart showing in detail a path calculating process carried out in a microprocessor of an electronic control device of a vehicle three-dimensional object detection device according to a 13th embodiment.

FIG. 32 shows a path calculation process for receiving the spherical waves 3a and 3b with the ultrasonic sonar 11 and obtaining the path lengths La and Ld. The path calculation process corresponds to the process of calculating the path lengths La and Ld in steps S110 and S126 of FIG. 25. The electronic control device 18 executes the path calculation process according to the flowchart of FIG. 32.

For convenience of explanation, it is assumed that the ultrasonic sonar 10 is the transmitting sonar and the ultrasonic sonar 11 is the receiving sonar.

First, when parts of the ultrasonic wave transmitted from the ultrasonic sonar 10 are reflected off the corners 2h and 2e of the three-dimensional object 2, the reflected waves (i.e., the sphere waves 3a and 3b) are propagated toward the ultrasonic sonars 11 and 12.

First, in step S300, the electronic control device 18 detects the reception intensity of the ultrasonic wave received by the ultrasonic sonar 11 and determines whether the reception intensity is equal to or greater than a threshold value Ua. As a result, whether the ultrasonic sonar 11 has received the first wave of the reflected wave (that is, the spherical wave 3b) is determined.

At this time, when the reception intensity is lower than the threshold value Ua, the electronic control device 18 determines that the ultrasonic sonar 11 has not received the first wave of the reflected wave (that is, the spherical wave 3b) and determines that the answer is NO in step S300.

The electronic control device 18 then executes the first wave reception decision procedure of step S300 again. Therefore, the electronic control device 18 repeatedly determines that the answer is NO in step S300 as long as the reception intensity is lower than the threshold value Ua.

After that, when the reception intensity of the ultrasonic wave received by the ultrasonic sonar 11 becomes equal to or greater than the threshold value Ua, the electronic control device 18 determines that the ultrasonic sonar 11 has received the first wave of the reflected wave (that is, the spherical wave 3b) and determines that the answer is YES in step S300.

Then, in step S310 (that is, a first reception determination unit for detection), the electronic control device 18 detects the reception intensity of the ultrasonic wave received by the ultrasonic sonar 11 and determines whether the reception intensity is equal to or greater than a threshold value Ub.

As a result, the electronic control device 18 determines whether the second wave of the reflected wave (that is, the spherical wave 3a) has been received. This makes it possible to accurately determine whether the ultrasonic sonar 11 has received the second wave of the reflected wave.

When the reception intensity of the reflected wave received by the ultrasonic sonar 11 is lower than the threshold value Ub, the electronic control device 18 determines that the ultrasonic sonar 11 has not received the second wave of the reflected wave (that is, the spherical wave 3a) and determines that the answer is NO.

Along with this, the electronic control device 18 determines in step S320 (that is, a first period end decision unit) whether a listening period Tu for listening for the second wave of the reflected wave has ended.

The listening period Tu is a period for which the ultrasonic sonar 11 listens for the second wave of the reflected wave after the ultrasonic sonar 11 has received the first wave of the reflected wave (that is, the spherical wave 3b). The listening period Tu is a predetermined period of time for preventing the ultrasonic sonar 11 from receiving reflected waves (that is, noise) other than the spherical wave 3a.

For convenience of explanation, the time elapsed since the ultrasonic sonar 11 received the first wave of the reflected wave is hereinafter referred to as a reception elapsed time.

When the reception elapsed time is shorter than the listening period Tu, the electronic control device 18 determines that the listening period Tu has not ended, and determines that the answer is NO in step S320. The electronic control device 18 then executes the second wave reception decision procedure of step S310 again. Therefore, the electronic control device 18 repeatedly determines that the answer is NO in steps S310 and S320 as long as the reception intensity is lower than the threshold value Ub and the reception elapsed time is shorter than the listening period Tu.

After that, when the reception intensity becomes equal to or greater than the threshold value Ub and the reception elapsed time is shorter than the listening period Tu, the electronic control device 18 determines that the second wave of the reflected wave (that is, the spherical wave 3a) has been received and determines that the answer is YES in step S310.

Next, in step S330 (that is, a first calculator for detection), the electronic control device 18 determines the path length La (i.e., Ta×Sc) based on the propagation time Ta from when the ultrasonic sonar 10 transmits the ultrasonic wave to when the ultrasonic sonar 11 receives the first reflected wave.

In addition, the electronic control device 18 determines the path length Ld (i.e., Td×Sc) based on the propagation time Td from when the ultrasonic sonar 10 transmits the ultrasonic wave to when the ultrasonic sonar 11 receives the second wave of the reflected wave. The electronic control device 18 can thus determine the path lengths La and Ld.

When the reception intensity is below the threshold value Ub and the reception elapsed time exceeds the listening period Tu, the electronic control device 18 determines that the listening period Tu has ended, and determines that the answer is NO in step S320. In this case, the electronic control device 18 ends the path calculation process without calculating the path lengths La and Ld.

Figure 33:
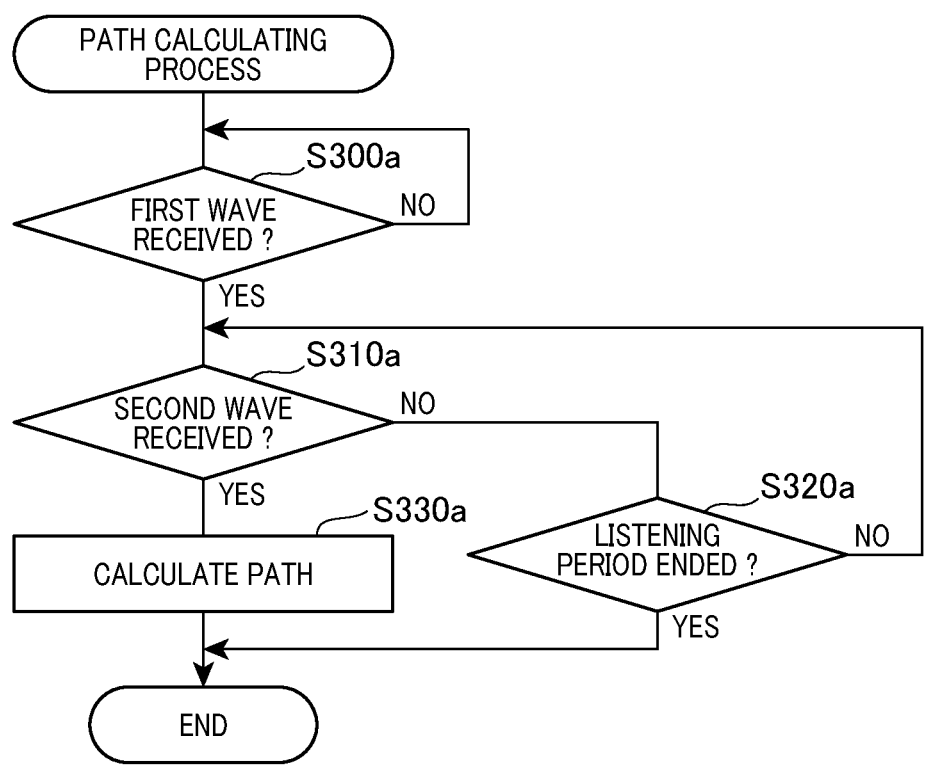
FIG. 33 is a flowchart showing in detail the path calculating process carried out in the microprocessor of the electronic control device of the vehicle three-dimensional object detection device according to the 13th embodiment.

Similarly, the electronic control device 18 executes the path calculation process according to the flowchart of FIG. 33 to determine the path lengths Lb and Le. For convenience of explanation, it is assumed that the ultrasonic sonar 10 is the transmitting sonar and the ultrasonic sonar 12 is the receiving sonar.

First, when parts of the ultrasonic wave transmitted from the ultrasonic sonar 10 are reflected off the corners 2h and 2e of the three-dimensional object 2, the reflected waves (i.e., the sphere waves 3a and 3b) are propagated toward the ultrasonic sonar 12.

First, in step S300a, the electronic control device 18 detects the reception intensity of the ultrasonic wave received by the ultrasonic sonar 12 and determines whether the reception intensity is equal to or greater than a threshold value Ua.

As a result, whether the ultrasonic sonar 12 has received the first wave of the reflected wave (that is, the spherical wave 3b) is determined.

At this time, when the reception intensity is lower than the threshold value Ua, the electronic control device 18 determines that the ultrasonic sonar 12 has not received the first wave of the reflected wave (that is, the spherical wave 3b) and determines that the answer is NO in step S300a. The electronic control device 18 then executes the first wave reception decision procedure of step S300a again. Therefore, the electronic control device 18 repeatedly determines that the answer is NO in step S300a as long as the reception intensity is lower than the threshold value Ua.

After that, when the reception intensity of the ultrasonic wave received by the ultrasonic sonar 12 becomes equal to or greater than the threshold value Ua, the electronic control device 18 determines that the ultrasonic sonar 12 has received the first wave of the reflected wave (that is, the spherical wave 3b) and determines that the answer is YES in step S300a.

Then, in step S310a (that is, a second reception determination unit for detection), the electronic control device 18 detects the reception intensity of the ultrasonic wave received by the ultrasonic sonar 12, and determines whether the second wave of the reflected wave (that is, the spherical wave 3a) has been received by determining whether the reception intensity is equal to or greater than the threshold value Ub.

This makes it possible to accurately determine whether the ultrasonic sonar 12 has received the second wave of the reflected wave.

When the reception intensity of the reflected wave received by the ultrasonic sonar 12 is lower than the threshold value Ub, the electronic control device 18 determines that the ultrasonic sonar 12 has not received the second wave of the reflected wave (that is, the spherical wave 3a) and determines that the answer is NO.

Along with this, the electronic control device 18 determines in step S320a (that is, a second period end decision unit) whether a listening period Tu for listening for the second wave of the reflected wave has ended.

The listening period Tu is a period during which the ultrasonic sonar 12 listens for the second wave of the reflected wave after the ultrasonic sonar 12 has received the first wave of the reflected wave (that is, the spherical wave 3b). The listening period Tu is a predetermined period of time for preventing the ultrasonic sonar 12 from receiving reflected waves (that is, noise) other than the spherical wave 3a.

For convenience of explanation, the time elapsed since the ultrasonic sonar 12 received the first wave of the reflected wave is hereinafter referred to as a reception elapsed time.

When the reception elapsed time is shorter than the listening period Tu, the electronic control device 18 determines that the listening period Tu has not ended, and determines that the answer is NO in step S320a. The electronic control device 18 then executes the second wave reception decision procedure of step S310a again. Therefore, the electronic control device 18 repeatedly determines that the answer is NO in steps S310*a* and S320*a* as long as the reception intensity is lower than the threshold value Ub and the reception elapsed time is shorter than the listening period Tu.

After that, when the reception intensity becomes equal to or greater than the threshold value Ub and the reception elapsed time is shorter than the listening period Tu, the electronic control device 18 determines that the second wave of the reflected wave (that is, the spherical wave 3*a*) has been received and determines that the answer is YES in step S310*a*.

Next, in step S330*a* (that is, a second calculator for detection), the electronic control device 18 determines the path length Lb (i.e., Tb×Sc) based on the propagation time Tb from when the ultrasonic sonar 10 transmits the ultrasonic wave to when the ultrasonic sonar 12 receives the first wave of the reflected wave.

In addition, the electronic control device 18 determines the path length Le (i.e., Te×Sc) based on the propagation time Te from when the ultrasonic sonar 10 transmits the ultrasonic wave to when the ultrasonic sonar 11 receives the second wave of the reflected wave. The electronic control device 18 can thus determine the path lengths Lb and Le.

When the reception intensity is below the threshold value Ub and the reception elapsed time exceeds the listening period Tu, the electronic control device 18 determines that the listening period Tu has ended, and determines that the answer is NO in step S320*a*. In this case, the electronic control device 18 ends the path calculation process without calculating the path lengths Lb and Le.

According to the present embodiment described above, the electronic control device 18 can calculate the path lengths La, Lb, Ld, and Le by executing the path calculation process.

In the present embodiment, the reception intensity of the first wave of the reflected wave (that is, the spherical wave 3*b*) received by the ultrasonic sonar 11 is higher than the reception intensity of the second wave of the reflected wave (that is, the spherical wave 3*a*) received by the ultrasonic sonar 11.

The reception intensity of the first wave of the reflected wave (that is, the spherical wave 3*b*) received by the ultrasonic sonar 12 is higher than the reception intensity of the second wave of the reflected wave (that is, the spherical wave 3*a*) received by the ultrasonic sonar 12.

Therefore, in this embodiment, the threshold value Ub used in steps S310 and S310*a* is smaller than the threshold value Ua used in steps S300 and S300*a*. Specifically, the threshold value Ub may be determined according to the reception intensity of the first wave of the reflected wave received by the ultrasonic sonars 11 and 12.

For example, the threshold value Ub may be set so that the higher the reception intensity of the first wave of the reflected wave received by the ultrasonic sonars 11 and 12, the larger the threshold value Ub, and the lower the reception intensity of the first wave of the reflected wave received by the ultrasonic sonars 11 and 12, the smaller the threshold value Ub.

In the case the ultrasonic sonars 11 and 12 receive a plane wave instead of a spherical wave, the threshold value Ub may be set so that the higher the reception intensity, the larger the threshold value Ub, and the lower the reception intensity, the smaller the threshold value Ub.

In this embodiment, the larger the distance between the corners 2*e* and 2*h* of the three-dimensional object 2, the larger the difference between the path lengths La and Ld. Therefore, the listening period Tu is set so that the longer the distance between the corners 2*e* and 2*h* of the three-dimensional object 2, the longer the listening period Tu. In other words, the larger the three-dimensional object 2, the later the end timing of the listening period Tu.

As described above, by having the listening period Tu, it is possible to prevent the ultrasonic sonars 11 and 12 from erroneously receiving noise as the second wave of the reflected wave.

In this embodiment, the larger the three-dimensional object 2, the larger the distance between the corners 2*e* and 2*h*. Therefore, the larger the three-dimensional object 2, the later the end timing of the listening period Tu. This means that the end timing of the listening period Tu can be appropriately set according to the distance between the corners 2*e* and 2*h*.

Fourteenth Embodiment

In the fourteenth embodiment, an example will be described with reference to FIGS. 34 and 35 in which the corners 2*e* and 2*h* of the three-dimensional object 2 are found without determining whether the ultrasonic sonars 11, 12, and 13 have received the first wave of the reflected wave or the second wave of the reflected wave is determined in the fourth embodiment.

Figure 34:
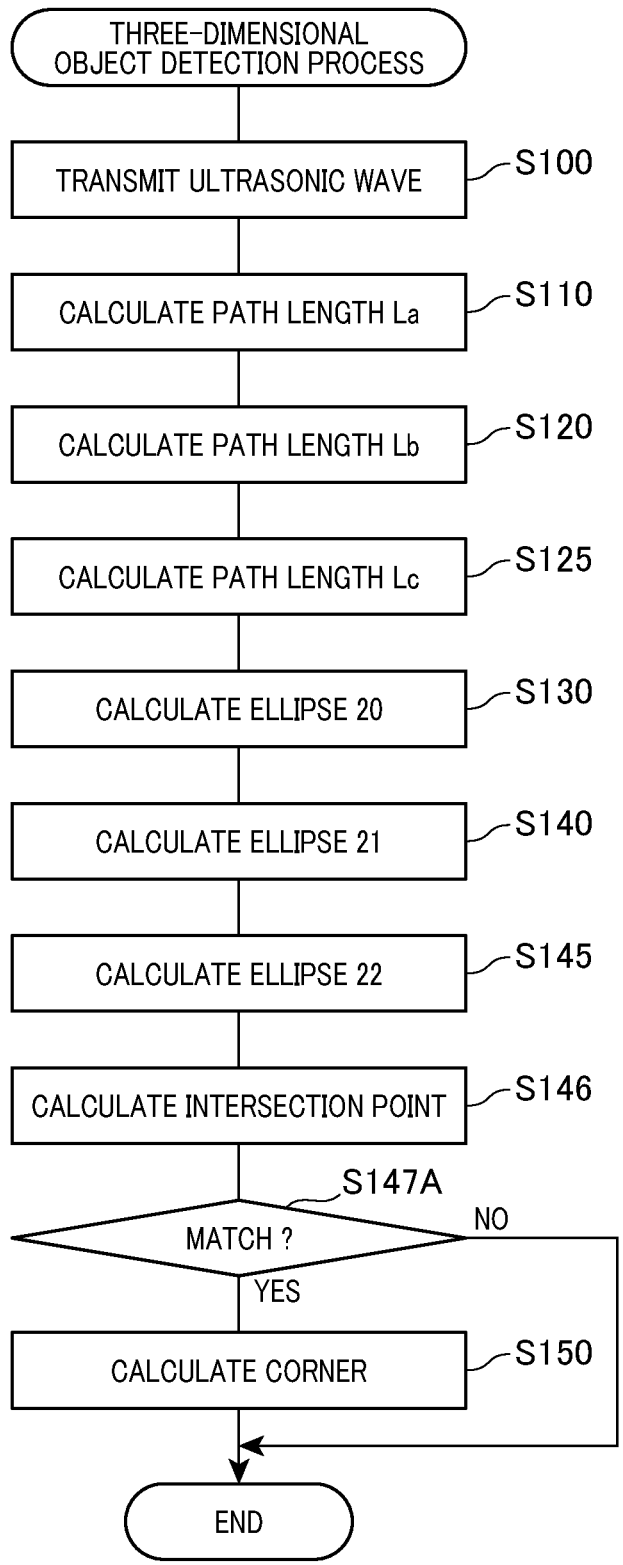
FIG. 34 is a flowchart showing in detail a three-dimensional object detection process carried out in a microprocessor of an electronic control device of a vehicle three-dimensional object detection device according to an 14th embodiment.

FIG. 34 is a flowchart showing the three-dimensional object detection process carried out in the electronic control device 18 of the present embodiment. In FIG. 34, a reference sign that is also used in FIG. 13 indicates the same step, and the description thereof is omitted. The electronic control device 18 executes the three-dimensional object detection process according to the flowchart in FIG. 33.

First, in step S100, the electronic control device 18 causes the ultrasonic sonar 10 to transmit an ultrasonic wave toward the three-dimensional object 2. The transmitted ultrasonic wave then propagates toward the three-dimensional object 2.

Figure 35:
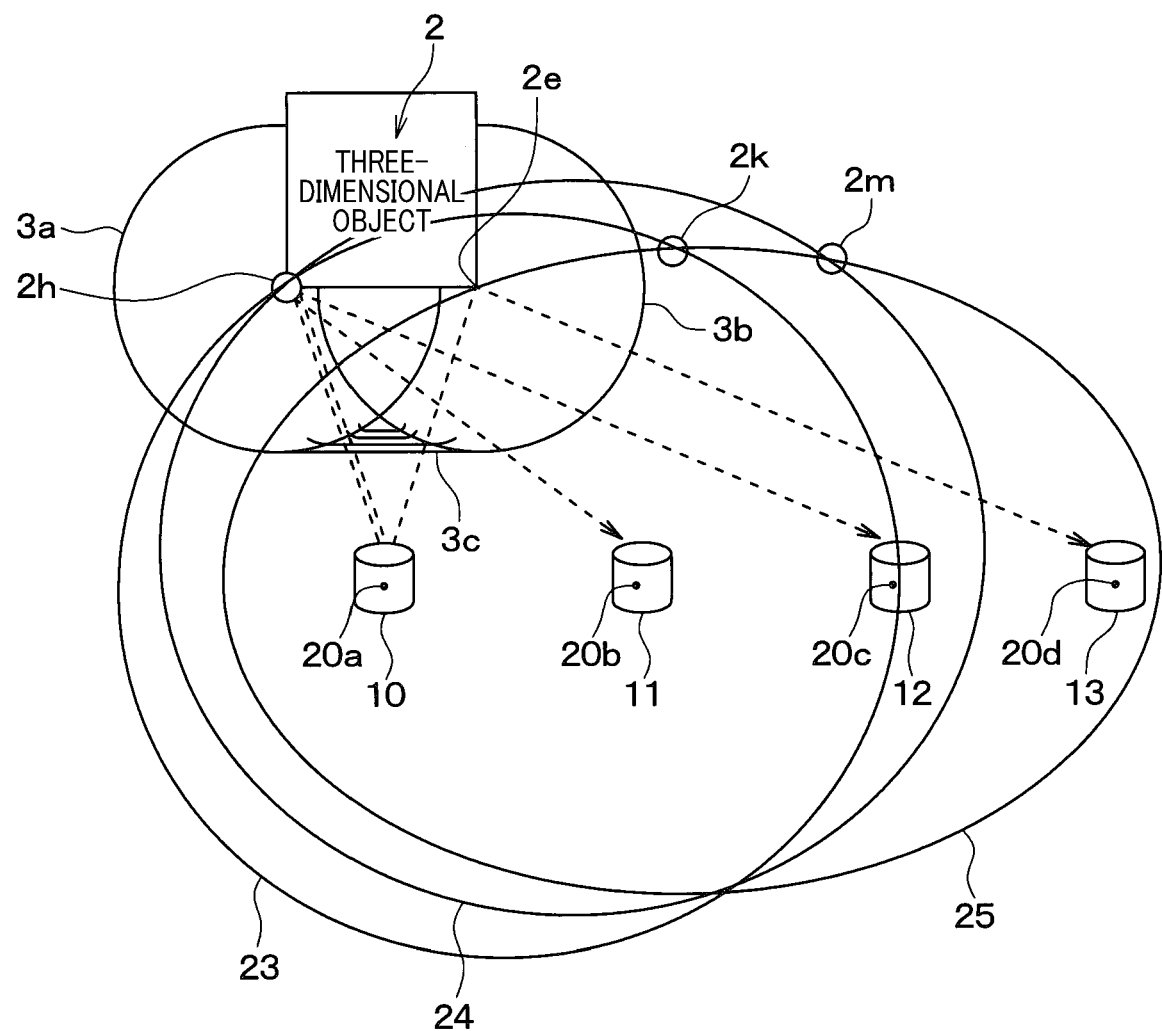
FIG. 35 is a diagram for assisting the detailed explanation of the three-dimensional object detection process of the vehicle three-dimensional object detection device according to the 14th embodiment, and it shows a state where the intersection points of the three ellipses used in the three-dimensional object detection process do not match.

As shown in FIG. 35, parts of an ultrasonic wave propagated from the ultrasonic sonar 10 that have reached the three-dimensional object 2 will be reflected. The reflected waves are propagated toward the ultrasonic sonars 11, 12, and 13.

The reflected waves are then received by the ultrasonic sonars 11, 12, and 13. Following this, the ultrasonic sonars 11, 12, and 13 each output a reception signal to the electronic control device 18.

In step S110, the electronic control device 18 determines the path length La, which is the length of the path along which an ultrasonic wave propagates after being transmitted from the ultrasonic sonar 10 until the reflected wave is received by the ultrasonic sonar 11.

In step S120, the electronic control device 18 determines the path length Lb, which is the length of the path along which an ultrasonic wave propagates after being transmitted from the ultrasonic sonar 10 until the reflected wave is received by the ultrasonic sonar 12.

In step S125, the electronic control device 18 determines the path length Lc, which is the length of the path along which an ultrasonic wave propagates after being transmitted from the ultrasonic sonar 10 until the reflected wave is received by the ultrasonic sonar 13.

In the subsequent step S130, the electronic control device 18 uses the positions of the ultrasonic sonars 10 and 11 as focal points 20*a* and 20*b* to find an ellipse 23 defined by a set of points whose distances from the ultrasonic sonars 10 and 11 add up to the path length La.

In the subsequent step S140, the electronic control device 18 uses the positions of the ultrasonic sonars 10 and 12 as focal points 20a and 20c to find an ellipse 24 defined by a set of points whose distances from the ultrasonic sonars 10 and 12 add up to the path length Lb.

In the subsequent step S145, the electronic control device 18 uses the positions of the ultrasonic sonars 10 and 13 as focal points 20a and 20d to find an ellipse 25 defined by a set of points whose distances from the ultrasonic sonars 10 and 13 add up to the path length Lc.

In step S146, the electronic control device 18 finds the intersection points of the ellipses 23, 24, and 25.

The intersection point between the ellipses 23 and 24 is referred to as a first intersection point, the intersection point between the ellipses 23 and 24 is referred to as a second intersection point, and the intersection point between the ellipses 24 and 25 intersect is referred to as a third intersection point.

In step S147A, the electronic control device 18 determines whether the first, second, and third intersection points match. As a result, whether the reflected waves received by the ultrasonic sonars 11, 12, and 13 are all reflected waves that have been reflected off one of the corners 2e and 2h of the three-dimensional object 2 is determined.

When the first, second, and third intersection points match, the electronic control device 18 determines that the answer is YES in step S147A. This means that the reflected waves received by the ultrasonic sonars 11, 12, and 13 are determined to have all been reflected off one of the corners 2e and 2h of the three-dimensional object 2.

For example, when the reflected waves received by the ultrasonic sonars 11, 12, and 13 are all reflected off the corner 2e of the three-dimensional object 2, the answer is YES in step S147A.

When the reflected waves received by the ultrasonic sonars 11, 12, and 13 are all reflected off the corner 2h of the three-dimensional object 2, the answer is YES in step S147A.

Then, in step S150, the electronic control device 18 finds the first intersection point as the corner 2e or 2h of the three-dimensional object 2.

On the other hand, when the first, second, and third intersection points do not match, the electronic control device 18 determines that the answer is NO in step S147A. This means that the reflected waves received by the ultrasonic sonars 11, 12, and 13 are not determined to have all been reflected off one of the corners 2e and 2h of the three-dimensional object 2.

As shown in FIG. 35, when the reflected waves received by the ultrasonic sonars 11 and 12 have been reflected off the corner 2h of the three-dimensional object 2, and the reflected wave received by the ultrasonic sonar 13 has been reflected off the corner 2e of the three-dimensional object 2, the answer is NO in step S147A.

For example, when the reflected waves received by the ultrasonic sonars 11 and 12 have been reflected off the corner 2e of the three-dimensional object 2, and the reflected wave received by the ultrasonic sonar 13 has been reflected off the side face 2a of the three-dimensional object 2, the answer is NO in step S147A.

According to the present embodiment described above, the electronic control device 18 can find the corner 2e or 2h of the three-dimensional object 2 when the first, second, and third intersection points, which are each an intersection point between two of the ellipses 23, 24, and 25, match.

Other Embodiments (1) In the first to fourteenth embodiments, examples in which an ultrasonic wave is used as the search wave are described. However, the present disclosure is not limited to this, and a search wave other than an ultrasonic wave may be used such as a sound wave or a light wave, or a radio wave such as a millimeter wave.

(2) In the first to fourteenth embodiments, examples are described in which the three-dimensional object detection device is mounted on a vehicle. Alternatively, it may be implemented as described in (a) or (b) below.

(a) The three-dimensional object detection device may be mounted on a moving object other than a vehicle, such as an airplane, an electric train, a train, a two-wheeled vehicle, or a drone.

(b) The three-dimensional object detection device itself may be configured as a portable type that can be carried.

(3) In the first to fourteenth embodiments, examples are described in which the corner 2e or 2h of the three-dimensional object 2 is found using two or three ellipses. Alternatively, the corner 2e or 2h of the three-dimensional object 2 may be found using four or more ellipses.

(4) In the first to fourteenth embodiments, examples are described in which the electronic control device 18 makes the second wave reception decision in step S310 when the first wave reception decision made in step S300 of FIG. 32 is YES.

However, instead of this, the execution of the second wave reception decision in step S310 may be started when a certain period of time has elapsed from when the first wave reception decision of YES has been made in step S300 of FIG. 32.

(4) In the first to fourteenth embodiments, examples are described in which the electronic control device 18 makes the second wave reception decision in step S310 when the first wave reception decision made in step S300 of FIG. 32 is YES.

However, instead of this, the execution of the second wave reception decision in step S310 may be started when a certain period of time has elapsed from when the first wave reception decision of YES has been made in step S300 of FIG. 32.

(5) In the first to fourteenth embodiments, examples are described in which the electronic control device 18 makes the second wave reception decision in step S310a when the first wave reception decision made in step S300a of FIG. 33 is YES.

However, instead of this, the execution of the second wave reception decision in step S310a may be started when a certain period of time has elapsed from when the first wave reception decision of YES has been made in step S300a of FIG. 33.

(6) In the first to fourteenth embodiments, examples are described in which the ultrasonic sonars 10, 11, 12, and 13 are arranged in a line. However, the ultrasonic sonars 10, 11, 12, and 13 may be arranged in any way as long as they are located at different positions.

(7) Note that the present disclosure is not limited to the above-described embodiments, and it can be modified as appropriate. In addition, the above embodiments are not necessarily independent of each other, and they can be appropriately combined unless the combination is clearly impossible. It is needless to say that the elements constituting the embodiments are not necessarily essential unless explicitly stated as essential or obviously considered essential in principle. In addition, when a numerical value such as the number, value, amount, or range of a component(s) of any of the above-described embodiments is mentioned, it is not limited to the particular number or value unless expressly stated otherwise or it is obviously limited to the particular number or value in principle, etc. When the shape, positional relationship, or the like of a component(s) or the like of any of the embodiments is mentioned, it is not limited to the shape, positional relationship, or the like unless explicitly stated otherwise or it is limited to the specific shape, positional relationship, or the like in principle, etc. Further, when it is described in the above embodiments that information on the external environment of the vehicle (for example, the humidity outside the vehicle) is obtained from a sensor, that sensor may be discarded and the external environment information may be acquired from a server or cloud outside the vehicle. Alternatively, it is also possible to discard the sensor, and acquire information related to the external environment information from a server or cloud outside the vehicle to estimate the external environment information from the acquired related information.

The first to fourteenth embodiments and other embodiments configured as described above may also be interpreted as follows.

That is, a transmitter and first and second receivers are arranged in a line at regular intervals. The interval between adjacent two of the transmitter and the first and second receivers is 500 mm.

The measurement error $\Delta L$ generated when measuring a distance using one of the first and second receivers and the transmitter is set at 3 cm or less.

CONCLUSION

According to a first aspect described in some or all of the first to fourteenth embodiments and other embodiments, a three-dimensional object detection device for detecting a corner of a three-dimensional object to be detected includes a transmitter for transmitting a search wave.

The three-dimensional object detection device includes a first receiver that receives a reflected wave that is part of a search wave from the transmitter reflected off a corner as a spherical wave, and a second receiver that is located at a position different from a position of the first receiver and receives the reflected wave.

The three-dimensional object detection device includes a first path-length calculator that determines a first path length, which is a length of a path along which the search wave propagates after being transmitted from the transmitter until the reflected wave is received by the first receiver.

The three-dimensional object detection device includes a first ellipse calculator that uses a position of the transmitter and the position of the first receiver as focal points to find a first ellipse defined by a set of points whose distances from the transmitter and the first receiver add up to the first path length.

The three-dimensional object detection device includes a second path-length calculator that determines a second path length, which is a length of a path along which the search wave propagates after being transmitted from the transmitter until the reflected wave is received by the second receiver.

The three-dimensional object detection device includes a second ellipse calculator that uses a position of the transmitter and the position of the second receiver as focal points to find a second ellipse defined by a set of points whose distances from the transmitter and the second receiver add up to the second path length.

The three-dimensional object detection device includes a corner calculator that finds an intersection point between the first and second ellipses as the corner.

According to a second aspect, the three-dimensional object detection device includes a plurality of search devices that each transmit a search wave and receive a reflected wave that is part of the transmitted search wave reflected off the three-dimensional object.

The three-dimensional object detection device includes a reception intensity detector, that detects, for each of the plurality of search devices, a reception intensity when the search device receives the reflected wave that is the part of the search wave from that search device itself reflected off the three-dimensional object.

The three-dimensional object detection device includes a transmitter determining unit that selects the search device that has the highest reception intensity among the plurality of search devices as the transmitter based on the reception intensities detected by the reception intensity detector.

This makes it possible to select a search device that tends to receive a plane wave as the transmitter from the plurality of search devices. As a result, it is possible to prevent search devices that tend to receive a plane wave among the plurality of search devices from being used as the first and second receivers.

According to a third aspect, the search device that has the highest reception intensity among the plurality of search devices is selected as the first search device. The three-dimensional object detection device includes a receiver determining unit that selects two of the plurality of search devices excluding the first search device as the first and second receivers based on the reception intensities detected by the reception intensity detector.

This makes it possible to prevent search devices that tend to receive a plane wave among the plurality of search devices from being used as the first and second receivers.

According to a fourth aspect, the receiver determining unit selects a second search device, which is a search device closest to the first search device among the plurality of search devices, based on the reception intensities detected by the reception intensity detector.

This makes it possible to select the second search device that tends to receive a plane wave the most among the plurality of search devices excluding the first search device. Further, the receiver determining unit selects two of the plurality of search devices excluding the first and second search devices as the first and second receivers.

This makes it possible to prevent search devices that tend to receive a plane wave among the plurality of search devices from being used as the first and second receivers.

According to a fifth aspect, the three-dimensional object detection device includes a third receiver that is located at a position different from the positions of the first and second receivers and receives the reflected wave. The three-dimensional object detection device includes a third path-length calculator that determines a third path length, which is a length of a path along which the search wave propagates after being transmitted from the transmitter until the reflected wave is received by the third receiver.

The three-dimensional object detection device includes a third ellipse calculator that uses a position of the transmitter and the position of the third receiver as focal points to find a third ellipse defined by a set of points whose distances from the transmitter and the third receiver add up to the third path length.

The three-dimensional object detection device includes an intersection point calculator that finds a first intersection point between the first and second ellipses, a second intersection point between the first and third ellipses, and a third intersection point between the second and third ellipses.

The three-dimensional object detection device includes an intersection point decision unit that determines whether the first, second, and third intersection points match, and when the intersection point decision unit determines that the first, second, and third intersection points match, the corner calculator finds the first intersection point as the corner.

This makes it possible to find the first intersection point as the corner even when the first, second, and third receivers are provided.

According to a sixth embodiment, the three-dimensional object detection device includes a selector that, when the intersection point decision unit determines that there is variation in positions of the first, second, and third intersection points, selects two of the first, second, and third receivers excluding the one closest to the transmitter.

This makes it possible to use two of the first, second, and third receivers excluding the one that is most affected by the plane wave.

The three-dimensional object detection device includes a second corner calculator that, when the corner calculator is a first corner calculator, finds an intersection point between two of the first, second, and third ellipses corresponding to the two receivers selected by the selector as the corner.

This makes it possible to prevent finding a corner using a receiver that is susceptible to the influence of the plane wave.

According to a seventh aspect, the three-dimensional object detection device includes a search device that transmits a search wave and receives a reflected wave that is part of the transmitted search wave reflected off the three-dimensional object, and a plurality of receivers that are located at different positions and each receive the reflected wave.

The three-dimensional object detection device includes a reception intensity detector that detects a reception intensity at which the reflected wave is received by the search device and a reception intensity at which the reflected wave is received by each of the plurality of receivers.

The three-dimensional object detection device includes a receiver determining unit that selects, as the first and second receivers, two of the plurality of receivers whose reception intensities are lower than the reception intensity at which the reflective wave is received by the search device based on the reception intensities detected by the reception intensity detector.

This makes it possible to select receivers that are less affected by the plane wave as the first and second receivers.

According to an eighth aspect, the three-dimensional object detection device includes a plurality of search devices that each transmit a search wave and receive a reflected wave that is part of the transmitted search wave reflected off the three-dimensional object.

The three-dimensional object detection device includes a reception intensity detector, that detects, for each of the plurality of search devices, a reception intensity when the search device receives the reflected wave that is the part of the search wave from that search device itself reflected off the three-dimensional object.

In the three-dimensional object detection device, the predetermined number determined in advance is three or more. The three-dimensional object detection device includes a first search device decision unit that determines, based on the reception intensities detected by the reception intensity detector, whether a number of search devices among the plurality of search devices whose reception intensities are equal to or higher than a first threshold value is a predetermined number or more.

As a result, the first search device decision unit determines, based on the reception intensities detected by the reception intensity detector, whether the number of search devices among the plurality of search devices that receive the plane wave is equal to or more than the predetermined number.

In the three-dimensional object detection device, a second threshold value is set that is lower than the first threshold value. The three-dimensional object detection device includes a second search device decision unit that determines, based on the reception intensities of the plurality of search devices detected by the reception intensity detector, whether a number of search devices among the plurality of search devices whose reception intensities are lower than the first threshold value and equal to or higher than the second threshold is two or more.

As a result, the second search device decision unit determines whether the number of search devices among the plurality of search devices that receive the spherical wave is two or more.

In the three-dimensional object detection device, when the first search device decision unit determines that the number of search devices whose reception intensities are equal to or higher than the first threshold value is the predetermined number or more, a corner detection processing stopper stops running the corner calculator.

As a result, the corner detection processing stopper stops running the corner calculator when the first search device decision unit determines that the number of search devices that receive a plane wave is the predetermined number or more.

Alternatively, the corner detection processing stopper stops running the corner calculator when the second search device decision unit determines that the number of search devices whose reception intensities are lower than the first threshold value and equal to or higher than the second threshold value is less than two.

As a result, the corner detection processing stopper stops running the corner calculator when the second search device decision unit determines that the number of search devices that receive a spherical wave is less than two.

On the other hand, when the first search device decision unit determines that the number of search devices whose reception intensities are equal to or higher than the first threshold value is smaller than the predetermined number, and when the second search device decision unit determines that the number of search devices whose reception intensities are lower than the first threshold value and equal to or higher than the second threshold value is two or more, the three-dimensional object detection device is configured as follows.

That is, any of the plurality of search devices function as the transmitter and the first and second receivers, respectively. In addition, the electronic control device 18 functions as the first path-length calculator, the first ellipse calculator, the second path-length calculator, the second ellipse calculator, and the corner calculator.

Therefore, when the first search device decision unit determines that the number of search devices that receive a plane wave is less than the predetermined number, and the second search device decision unit determines that the number of search devices that receive a spherical wave is two or more, the three-dimensional object detection device is configured as follows.

That is, the three-dimensional object detection device provides the functions of the transmitter, the first and second receivers, the first path-length calculator, the first ellipse calculator, the second path-length calculator, the second ellipse calculator, and the corner calculator.

According to a ninth aspect, the transmitter is a transceiver forming one of the first and second receivers.

This makes it possible to find the intersection point between the first and second ellipses, that is, the corner using the first and second receivers.

According to a 10th aspect, the transmitter transmits the search wave whose intensity changes pulse-wise with time.

According to an 11th aspect, the transmitter transmits the search wave whose intensity changes continuously over a predetermined period.

According to a 12th aspect, a three-dimensional object detection device detects a three-dimensional object to be detected having a first corner and a second corner.

The three-dimensional object detection device includes a transmitter that transmits a search wave, and a first receiver that receivers a reflected wave that is part of the search wave from the transmitter reflected off the first or second corner as a spherical wave.

The three-dimensional object detection device includes a second receiver that is located at a position different from a position of the first receiver and receives the reflected wave. The three-dimensional object detection device includes a first path-length calculator that determines a first path length, which is a length of a path along which the search wave propagates after being transmitted from the transmitter until a second wave of the reflected wave is received by the first receiver.

A first ellipse calculator uses a position of the transmitter and the position of the first receiver as focal points to find a first ellipse defined by a set of points whose distances from the transmitter and the first receiver add up to the first path length.

A second path-length calculator determines a second path length, which is a length of a path along which the search wave propagates after being transmitted from the transmitter until the second wave of the reflected wave is received by the second receiver.

A second ellipse calculator uses a position of the transmitter and the position of the second receiver as focal points to find a second ellipse defined by a set of points whose distances from the transmitter and the second receiver add up to the second path length.

A corner calculator finds an intersection point between the first and second ellipses as a farther corner, the farther corner being the one of the first and second corners located farther from the first and second receivers.

According to a 13th aspect, the three-dimensional object detection device includes a third path-length calculator that determines a third path length, which is a length of a path along which the search wave propagates after being transmitted from the transmitter until a first wave of the reflected wave is received by the first receiver.

A third ellipse calculator uses a position of the transmitter and the position of the first receiver as focal points to find a third ellipse defined by a set of points whose distances from the transmitter and the first receiver add up to the third path length.

A fourth path-length calculator determines a fourth path length, which is a length of a path along which the search wave propagates after being transmitted from the transmitter until the first wave of the reflected wave is received by the second receiver.

A fourth ellipse calculator uses a position of the transmitter and the position of the second receiver as focal points to find a fourth ellipse defined by a set of points whose distances from the transmitter and the second receiver add up to the fourth path length.

A second corner calculator that detects an intersection point between the third and fourth ellipses as a closer corner, the closer corner being the one of the first and second corners located closer to the first and second receivers.

The above makes it possible to find the corner closer to the first and second receivers.

According to a 14th aspect, a face calculator finds a face connecting the farther and closer corners of the three-dimensional object.

According to a 15th aspect, the first path length calculator includes a first reception determination unit for detection and a first calculator for detection.

The first reception determination unit for detection determines whether the first receiver has received the second wave of the reflected wave by determining whether a reception intensity at which the ultrasonic wave is received by the first receiver is equal to or higher than a threshold value after the first wave of the reflected wave is received by the first receiver.

The first calculator for detection that, when the first reception determination unit for detection determines that the first receiver has received the second wave of the reflected wave, calculates the first path length of the second wave of the reflected wave determined to have been received by the first reception determination unit for detection.

This makes it possible to accurately determine whether the first receiver has received the second wave of the reflected wave. Therefore, the first path length can be calculated with high accuracy.

According to a 16th aspect, the first path-length calculator includes a first period end decision unit that determines whether a listening period for listening for the second wave of the reflected wave by the first receiver has ended.

When the first period end decision unit determines that the listening period has not ended, and the first reception determination unit for detection determines that the reception intensity of the ultrasonic wave is lower than the threshold value, the first reception determination unit for detection determines again whether the reception intensity of the ultrasonic wave is lower than the threshold value.

When the first period end decision unit determines that the listening period has not ended, the first reception determination unit for detection determines that the first receiver has received the second wave of the reflected wave by determining that the reception intensity of the ultrasonic wave is equal to or higher than the threshold value.

As a result, by having the listening period, it is possible to prevent the first receiver from erroneously receiving noise as the second wave of the reflected wave.

According to a 17th aspect, the second path-length calculator includes a second reception determination unit for detection and a second calculator for detection.

The second reception determination unit for detection determines whether the second receiver has received the second wave of the reflected wave by determining whether a reception intensity at which the reflected wave is received by the second receiver is equal to or higher than a threshold value after the first wave of the reflected wave is received by the second receiver.

When the second reception determination unit for detection determines that the second receiver has received the second wave of the reflected wave, the second calculator for detection calculates the second path length of the second wave of the reflected wave determined to have been received by the second reception determination unit for detection.

This makes it possible to accurately determine whether the second receiver has received the second wave of the reflected wave. Therefore, the second path length can be calculated with high accuracy.

According to an 18th aspect, the second path-length calculator includes a second period end decision unit that determines whether a listening period for listening for the second wave of the reflected wave by the second receiver has ended.

When the second period end decision unit determines that the listening period has not ended, and the second period end decision unit determines that the reception intensity of the ultrasonic wave is lower than the threshold value, the second period end decision unit determines again whether the reception intensity of the ultrasonic wave is lower than the threshold value.

When the second period end decision unit determines that the listening period has not ended, the second period end decision unit determines that the second receiver has received the second wave of the reflected wave by determining that the reception intensity of the ultrasonic wave is equal to or higher than the threshold value.

As a result, by having the listening period, it is possible to prevent the second receiver from erroneously receiving noise as the second wave of the reflected wave.

According to a 19th aspect, an end timing of the listening period used by at least one of the first and second period end decision units is set to a later timing as a size of the three-dimensional object increases.

The larger the three-dimensional object, the larger the distance between the first and second corners. Therefore, by moving the ending timing to a later timing as the size of the three-dimensional object increase, the ending timing can be appropriately set according to the distance between the first and second corners.

According to a 20th aspect, the period for which the transmitter transmits a search wave is referred to as a transmission period. The transmission period is set so that the first receiver receives the first and second waves of the reflected wave at different timings, and the second receiver receives the first and second waves of the reflected wave at different timings.

According to a 21st aspect, the transmitter is a transceiver forming one of the first and second receivers.

According to a 22nd aspect, the transmitter transmits the search wave whose intensity changes pulse-wise with time.

According to a 23rd aspect, the transmitter transmits the search wave whose intensity changes continuously over a predetermined period.

What is claimed is:

1. A three-dimensional object detection device that detects a corner of a three-dimensional object to be detected, comprising:
    a transmitter that transmits a search wave;
    a first receiver that receives a reflected wave that is part of the search wave from the transmitter reflected off the corner as a spherical wave;
    a second receiver that is located at a position different from a position of the first receiver and receives the reflected wave;
    a first path-length calculator that determines a first path length, which is a length of a path along which the search wave propagates after being transmitted from the transmitter until the reflected wave is received by the first receiver;
    a first ellipse calculator that uses a position of the transmitter and the position of the first receiver as focal points to find a first ellipse defined by a set of points whose distances from the transmitter and the first receiver add up to the first path length;
    a second path-length calculator that determines a second path length, which is a length of a path along which the search wave propagates after being transmitted from the transmitter until the reflected wave is received by the second receiver;
    a second ellipse calculator that uses the position of the transmitter and the position of the second receiver as focal points to find a second ellipse defined by a set of points whose distances from the transmitter and the second receiver add up to the second path length; and
    a corner calculator that finds an intersection point between the first and second ellipses as the corner.

2. The three-dimensional object detection device according to claim 1, further comprising:
    a plurality of search devices that each transmit a search wave and receive a reflected wave that is part of the transmitted search wave reflected off the three-dimensional object;
    a reception intensity detector that detects, for each of the plurality of search devices, a reception intensity when the search device receives the reflected wave that is the part of the search wave from that search device itself reflected off the three-dimensional object; and
    a transmitter determining unit that selects a search device that has a highest reception intensity among the plurality of search devices as the transmitter based on the reception intensities detected by the reception intensity detector.

3. The three-dimensional object detection device according to claim 2, further comprising
    a receiver determining unit that selects, when the search device having the highest reception intensity among the plurality of search devices is defined as a first search device, two of the plurality of search devices excluding the first search device as the first and second receivers based on the reception intensities detected by the reception intensity detector.

4. The three-dimensional object detection device according to claim 3, wherein
    the receiver determining unit selects a second search device, which is a search device closest to the first search device among the plurality of search devices, based on the reception intensities detected by the reception intensity detector, and selects two of the plurality of search devices excluding the first and second search devices as the first and second receivers.

5. The three-dimensional object detection device according to claim 2, further comprising:
    a third receiver that is located at a position different from the positions of the first and second receivers and receives the reflected wave;
    a third path-length calculator that determines a third path length, which is a length of a path along which the search wave propagates after being transmitted from the transmitter until the reflected wave is received by the third receiver;
    a third ellipse calculator that uses a position of the transmitter and the position of the third receiver as focal points to find a third ellipse defined by a set of points whose distances from the transmitter and the third receiver add up to the third path length;
    an intersection point calculator that finds a first intersection point between the first and second ellipses, a second intersection point between the first and third ellipses, and a third intersection point between the second and third ellipses; and an intersection point decision unit that determines whether the first, second, and third intersection points match, wherein in response to the intersection point decision unit determining that the first, second, and third intersection points match, the corner calculator finds the first intersection point as the corner.

6. The three-dimensional object detection device according to claim 5, further comprising:

a selector that, in response to the intersection point decision unit determining that there is variation in positions of the first, second, and third intersection points, selects two of the first, second, and third receivers excluding the one closest to the transmitter, and a second corner calculator that, when the corner calculator is defined as a first corner calculator, finds an intersection point between two of the first, second, and third ellipses corresponding to the two receivers selected by the selector as the corner.

7. The three-dimensional object detection device according to claim 1, further comprising:

a search device that transmits a search wave and receives a reflected wave that is part of the transmitted search wave reflected off the three-dimensional object;

a plurality of receivers that are located at different positions and each receive the reflected wave;

a reception intensity detector that detects a reception intensity at which the reflected wave is received by the search device and a reception intensity at which the reflected wave is received by each of the plurality of receivers; and a receiver determining unit that selects, as the first and second receivers, two of the plurality of receivers whose reception intensities are lower than the reception intensity at which the reflective wave is received by the search device based on the reception intensities detected by the reception intensity detector.

8. The three-dimensional object detection device according to claim 1, further comprising:

a plurality of search devices that each transmit a search wave and receive a reflected wave that is part of the transmitted search wave reflected off the three-dimensional object;

a reception intensity detector that detects, for each of the plurality of search devices, a reception intensity when the search device receives the reflected wave that is the part of the search wave from that search device itself reflected off the three-dimensional object;

a first search device decision unit that determines, based on the reception intensities detected by the reception intensity detector, whether a number of search devices among the plurality of search devices whose reception intensities are equal to or higher than a first threshold value is a predetermined number or more, the predetermined number being three or more and determined in advance;

a second search device decision unit that determines, based on the reception intensities of the plurality of search devices detected by the reception intensity detector, whether a number of search devices among the plurality of search devices whose reception intensities are lower than the first threshold value and equal to or higher than a second threshold is two or more, the second threshold value being a threshold value lower than the first threshold value; and a corner detection processing stopper that, in response to the first search device decision unit determining that the number of search devices whose reception intensities are equal to or higher than the first threshold value is the predetermined number or more, or in response to the second search device decision unit determining that the number of search devices whose reception intensities are lower than the first threshold value and equal to or higher than the second threshold value is less than two, stops running the corner calculator, wherein in response to the first search device decision unit determining that the number of search devices whose reception intensities are equal to or higher than the first threshold value is smaller than the predetermined number and the second search device decision unit determining that the number of search devices whose reception intensities are lower than the first threshold value and equal to or higher than the second threshold value is two or more, any of the plurality of search devices function as the transmitter and the first and second receivers, respectively, and the first path-length calculator, the first ellipse calculator, the second path-length calculator, the second ellipse calculator, and the corner calculator function.

9. The three-dimensional object detection device according to claim 1, wherein the transmitter is a transceiver forming one of the first and second receivers.

10. The three-dimensional object detection device according to claim 1, wherein the transmitter transmits the search wave whose intensity changes pulse-wise with time.

11. The three-dimensional object detection device according to claim 1, wherein the transmitter transmits the search wave whose intensity changes continuously over a predetermined period.

12. A three-dimensional object detection device that detects a three-dimensional object to be detected having a first corner and a second corner, comprising:

a transmitter that transmits a search wave;

a first receiver that receives a reflected wave that is part of the search wave from the transmitter reflected off the first or second corner as a spherical wave;

a second receiver that is located at a position different from a position of the first receiver and receives the reflected wave;

a first path-length calculator that determines a first path length, which is a length of a path along which the search wave propagates after being transmitted from the transmitter until a second wave of the reflected wave is received by the first receiver;

a first ellipse calculator that uses a position of the transmitter and the position of the first receiver as focal points to find a first ellipse defined by a set of points whose distances from the transmitter and the first receiver add up to the first path length;

a second path-length calculator that determines a second path length, which is a length of a path along which the search wave propagates after being transmitted from the transmitter until the second wave of the reflected wave is received by the second receiver;

a second ellipse calculator that uses the position of the transmitter and the position of the second receiver as focal points to find a second ellipse defined by a set of points whose distances from the transmitter and the second receiver add up to the second path length; and a corner calculator that finds an intersection point between the first and second ellipses as a farther corner, the farther corner being the one of the first and second corners located farther from the first and second receivers.

13. The three-dimensional object detection device according to claim 12, further comprising:
a third path-length calculator that determines a third path length, which is a length of a path along which the search wave propagates after being transmitted from the transmitter until a first wave of the reflected wave is received by the first receiver;
a third ellipse calculator that uses a position of the transmitter and the position of the first receiver as focal points to find a third ellipse defined by a set of points whose distances from the transmitter and the first receiver add up to the third path length;
a fourth path-length calculator that determines a fourth path length, which is a length of a path along which the search wave propagates after being transmitted from the transmitter until the first wave of the reflected wave is received by the second receiver;
a fourth ellipse calculator that uses the position of the transmitter and the position of the second receiver as focal points to find a fourth ellipse defined by a set of points whose distances from the transmitter and the second receiver add up to the fourth path length; and
a second corner calculator that detects an intersection point between the third and fourth ellipses as a closer corner, the closer corner being the one of the first and second corners located closer to the first and second receivers.

14. The three-dimensional object detection device according to claim 13, further comprising
a face calculator that finds a face connecting the farther and closer corners of the three-dimensional object.

15. The three-dimensional object detection device according to claim 13, wherein
the first path-length calculator includes:
a first reception determination unit for detection that determines whether the first receiver has received the second wave of the reflected wave by determining whether a reception intensity at which the search wave is received by the first receiver is equal to or higher than a threshold value after the first wave of the reflected wave is received by the first receiver; and
a first calculator for detection that, in response to the first reception determination unit for detection determining that the first receiver has received the second wave of the reflected wave, calculates the first path length of the second wave of the reflected wave determined to have been received by the first reception determination unit for detection.

16. The three-dimensional object detection device according to claim 15, wherein:
the first path-length calculator includes a first period end decision unit that determines whether a listening period for listening for the second wave of the reflected wave by the first receiver has ended;
in response to the first period end decision unit determining that the listening period has not ended and the first reception determination unit for detection determining that the reception intensity of the search wave is lower than the threshold value, the first reception determination unit for detection determines again whether the reception intensity of the search wave is lower than the threshold value; and
in response to the first period end decision unit determining that the listening period has not ended, the first reception determination unit for detection determines that the first receiver has received the second wave of the reflected wave by determining that the reception intensity of the search wave is equal to or higher than the threshold value.

17. The three-dimensional object detection device according to claim 16, wherein
the second path-length calculator includes:
a second reception determination unit for detection that determines whether the second receiver has received the second wave of the reflected wave by determining whether a reception intensity at which the reflected wave is received by the second receiver is equal to or higher than a threshold value after the first wave of the reflected wave is received by the second receiver, and
a second calculator for detection that, in response to the second reception determination unit for detection determining that the second receiver has received the second wave of the reflected wave, calculates the second path length of the second wave of the reflected wave determined to have been received by the second reception determination unit for detection.

18. The three-dimensional object detection device according to claim 17, wherein:
the second path-length calculator includes a second period end decision unit that determines whether a listening period for listening for the second wave of the reflected wave by the second receiver has ended,
in response to the second period end decision unit determining that the listening period has not ended and the second reception determination unit for detection determining that the reception intensity of the search wave is lower than the threshold value, the second reception determination unit for detection determines again whether the reception intensity of the search wave is lower than the threshold value; and
in response to the second period end decision unit determining that the listening period has not ended, the second reception determination unit for detection determines that the second receiver has received the second wave of the reflected wave by determining that the reception intensity of the search wave is equal to or higher than the threshold value.

19. The three-dimensional object detection device according to claim 18, wherein
an end timing of the listening period used by at least one of the first and second period end decision units is set to a later timing as a size of the three-dimensional object increases.

20. The three-dimensional object detection device according to claim 13, wherein
a transmission period, which is a period for which the transmitter transmits the search wave, is set so that the first receiver receives the first and second waves of the reflected wave at different timings, and the second receiver receives the first and second waves of the reflected wave at different timings.

21. The three-dimensional object detection device according to claim 12, wherein
the transmitter is a transceiver forming one of the first and second receivers.

22. The three-dimensional object detection device according to claim 12, wherein
the transmitter transmits the search wave whose intensity changes pulse-wise with time.

23. The three-dimensional object detection device according to claim 12, wherein
the transmitter transmits the search wave whose intensity changes continuously over a predetermined period.

* * * * *